(12) United States Patent
Whited et al.

(10) Patent No.: US 12,686,140 B2
(45) Date of Patent: Jul. 21, 2026

(54) CAM-ACTUATED SPLIT BLADE HOUSING FOR POWER OPERATED ROTARY KNIFE

(71) Applicant: Bettcher Industries, Inc., Birmingham, OH (US)

(72) Inventors: Jeffrey A. Whited, Richfield, OH (US); Dennis R. Seguin, Jr., North Ridgeville, OH (US); Bernard J. Esarey, Lorain, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 130 days.

(21) Appl. No.: 18/827,694

(22) Filed: Sep. 7, 2024

(65) Prior Publication Data

US 2024/0424702 A1     Dec. 26, 2024

Related U.S. Application Data

(63) Continuation of application No. 18/368,963, filed on Sep. 15, 2023, now Pat. No. 12,083,695, which is a (Continued)

(51) Int. Cl.
  B26B 25/00     (2006.01)
  A22B 5/16     (2006.01)
  (Continued)

(52) U.S. Cl.
  CPC ............ B26B 25/002 (2013.01); A22B 5/165 (2013.01); A22C 17/12 (2013.01); B25F 5/02 (2013.01)

(58) Field of Classification Search
  CPC .......... A22B 5/16; B26B 25/002; A22C 17/12
  See application file for complete search history.

(56) References Cited

U.S. PATENT DOCUMENTS

| | | | |
|---|---|---|---|
| 1,220,345 | A | 3/1917 | Koster |
| 1,374,988 | A | 4/1921 | Cooper |

(Continued)

FOREIGN PATENT DOCUMENTS

| | | |
|---|---|---|
| CA | 2796222 | 10/2011 |
| CA | 2883924 | 3/2014 |

(Continued)

OTHER PUBLICATIONS

International Search Report and Written Opinion of the International Searching Authority dated Feb. 14, 2018 for PCT International Application No. PCT/US2017/064500, filed Dec. 4, 2017. PCT International Application No. PCT/US2017/064500 claims priority from U.S. Appl. No. 17/887,241, filed Aug. 12, 2023, issued as U.S. Pat. No. 10,040,211, dated Aug. 7, 2018. The present application claims priority from and is a continuation of U.S. Appl. No. 17/887,241, filed Aug. 12, 2023, issued as U.S. Pat. No. 11,759,966 on Sep. 19, 2023. (13 pages).

(Continued)

*Primary Examiner* — Sean M Michalski
(74) *Attorney, Agent, or Firm* — Watts Law LLC; George L. Pinchak, Esq.

(57)     ABSTRACT

A blade housing assembly for a power operated rotary knife including a split blade housing and a cam mechanism for changing a blade housing diameter between blade supporting and blade changing positions. The split blade housing includes an annular blade support section, a mounting section and a split extending through the mounting section and an inner wall of the blade support section and defining a split distance between first and second circumferential ends of the inner wall. The split includes a radial split section and an angled split section adjacent the inner wall. The mounting section includes first and second body portions on opposite sides of the split. The cam mechanism includes a cam plate (Continued)

bridging the first and second body portions and a cam member rotatably supported by the cam plate. The cam member is rotatable between closed and open positions to change the blade housing diameter.

33 Claims, 37 Drawing Sheets

Related U.S. Application Data continuation of application No. 17/887,241, filed on Aug. 12, 2022, now Pat. No. 11,759,966, which is a continuation of application No. 17/180,168, filed on Feb. 19, 2021, now Pat. No. 11,413,778, which is a continuation of application No. 16/662,833, filed on Oct. 24, 2019, now Pat. No. 10,926,427, which is a continuation of application No. 16/013,565, filed on Jun. 20, 2018, now Pat. No. 10,471,614, which is a continuation-in-part of application No. 15/822,914, filed on Nov. 27, 2017, now Pat. No. 10,124,500, which is a continuation-in-part of application No. 15/374,207, filed on Dec. 9, 2016, now Pat. No. 10,040,211.

(51) Int. Cl.

| | |
|---|---|
| *A22C 17/12* | (2006.01) |
| *B25F 5/02* | (2006.01) |

(56) References Cited

U.S. PATENT DOCUMENTS

| | | | |
|---|---|---|---|
| 1,476,345 | A | 12/1923 | McGee |
| 1,966,266 | A | 7/1934 | Skelly |
| 2,656,012 | A | 10/1953 | Thorpe |
| 2,827,657 | A | 3/1958 | Bettcher |
| 3,024,532 | A | 3/1962 | Bettcher |
| 3,150,409 | A | 9/1964 | Wilcox |
| RE25,947 | E | 12/1965 | Bettcher |
| 3,269,010 | A | 8/1966 | Bettcher |
| 3,349,485 | A | 10/1967 | Bettcher |
| 3,461,557 | A | 8/1969 | Behring |
| 3,512,519 | A | 5/1970 | Ha |
| 3,592,519 | A | 7/1971 | Martin |
| 3,688,403 | A | 9/1972 | Bettcher |
| 3,816,875 | A | 6/1974 | Duncan et al. |
| 3,852,882 | A | 12/1974 | Bettcher |
| 3,897,998 | A | 8/1975 | Someya |
| 4,082,232 | A | 4/1978 | Brewer |
| 4,170,063 | A | 10/1979 | Bettcher |
| 4,178,683 | A | 12/1979 | Bettcher |
| 4,198,750 | A | 4/1980 | Bettcher |
| 4,236,531 | A | 12/1980 | McCullough |
| 4,267,759 | A | 5/1981 | Sullivan et al. |
| 4,326,361 | A | 4/1982 | McGill |
| 4,336,651 | A | 6/1982 | Caro |
| 4,363,170 | A | 12/1982 | McCullough |
| 4,418,591 | A | 12/1983 | Astle |
| 4,439,924 | A | 4/1984 | Bettcher |
| 4,492,027 | A | 1/1985 | Bettcher |
| 4,494,311 | A | 1/1985 | McCullough |
| 4,509,261 | A | 4/1985 | Bettcher |
| 4,516,323 | A | 5/1985 | Bettcher |
| 4,575,937 | A | 3/1986 | McCullough |
| 4,575,938 | A | 3/1986 | McCullough |
| 4,590,576 | A | 5/1986 | Elpiner |
| 4,590,676 | A | 5/1986 | Bettcher |
| 4,609,227 | A | 9/1986 | Wild et al. |
| 4,619,047 | A | 10/1986 | Heckman |
| 4,637,140 | A | 1/1987 | Bettcher |
| 4,829,860 | A | 5/1989 | VanderPol |
| 4,854,046 | A | 8/1989 | Decker et al. |
| 4,858,321 | A | 8/1989 | McCullough |
| 4,865,473 | A | 9/1989 | De Vito |
| 4,909,640 | A | 3/1990 | Nakanishi |
| 4,942,665 | A | 7/1990 | McCullough |
| 5,031,323 | A | 7/1991 | Honsa et al. |
| 5,033,876 | A | 7/1991 | Kraus |
| 5,071,264 | A | 12/1991 | Franke et al. |
| 5,078,024 | A | 1/1992 | Cicotte et al. |
| 5,099,721 | A | 3/1992 | Decker et al. |
| 5,230,154 | A | 7/1993 | Decker et al. |
| 5,331,877 | A | 7/1994 | Ishii |
| 5,419,619 | A | 5/1995 | Lew |
| 5,484,331 | A | 1/1996 | Buhlke |
| 5,499,492 | A | 3/1996 | Jameson |
| 5,522,142 | A | 6/1996 | Whited |
| 5,529,532 | A | 6/1996 | Desrosiers |
| 5,582,041 | A | 12/1996 | Spiess |
| 5,664,332 | A | 9/1997 | Whited |
| 5,692,307 | A | 12/1997 | Whited et al. |
| 5,743,659 | A | 4/1998 | Stewart |
| 5,749,661 | A | 5/1998 | Moller |
| 5,761,817 | A | 6/1998 | Whited et al. |
| 5,940,972 | A | 8/1999 | Baris et al. |
| 5,971,413 | A | 10/1999 | El-Kassouf |
| 6,247,847 | B1 | 6/2001 | Lob |
| 6,354,949 | B1 | 3/2002 | Baris et al. |
| 6,364,086 | B1 | 4/2002 | Blaurock |
| 6,604,288 | B2 | 8/2003 | Whited et al. |
| 6,615,494 | B2 | 9/2003 | Long et al. |
| 6,634,257 | B2 | 10/2003 | Long et al. |
| 6,655,033 | B2 | 12/2003 | Hermann et al. |
| 6,662,452 | B2 | 12/2003 | Whited |
| 6,665,940 | B2 | 12/2003 | Sanders et al. |
| 6,694,649 | B2 | 2/2004 | Whited et al. |
| 6,751,872 | B1 | 6/2004 | Whited et al. |
| 6,769,184 | B1 | 8/2004 | Whited |
| 6,857,191 | B2 | 2/2005 | Whited |
| 6,938,348 | B2 | 9/2005 | Roncaglia |
| 6,978,548 | B2 | 12/2005 | Whited et al. |
| 7,000,325 | B2 | 2/2006 | Whited |
| 7,107,887 | B2 | 9/2006 | Whited |
| 7,207,114 | B2 | 4/2007 | Rosu et al. |
| 7,340,840 | B2 | 3/2008 | Whited |
| 8,074,363 | B2 | 12/2011 | Whited |
| 8,448,340 | B2 | 5/2013 | Whited |
| 8,505,207 | B2 | 8/2013 | Thien |
| 8,661,692 | B2 | 3/2014 | Whited et al. |
| 8,671,580 | B2 | 3/2014 | Whited |
| 8,695,222 | B2 | 4/2014 | Whited et al. |
| 8,726,524 | B2 | 5/2014 | Whited et al. |
| 8,739,416 | B2 | 6/2014 | Mascari et al. |
| 8,745,881 | B2 | 6/2014 | Thompson et al. |
| 8,806,761 | B2 | 8/2014 | Whited et al. |
| 8,893,391 | B2 | 11/2014 | Levsen |
| 8,950,076 | B2 | 2/2015 | Whited et al. |
| 8,968,107 | B2 | 3/2015 | Rapp et al. |
| 9,089,980 | B2 | 7/2015 | Whited et al. |
| 9,121,438 | B2 | 9/2015 | Mascari |
| 9,186,171 | B2 | 11/2015 | Esarey et al. |
| 9,211,650 | B2 | 12/2015 | Mascari et al. |
| 9,221,183 | B2 | 12/2015 | Whited et al. |
| 9,227,332 | B2 | 1/2016 | Thompson et al. |
| 9,265,263 | B2 | 2/2016 | Whited et al. |
| 9,364,962 | B2 | 6/2016 | Whited |
| 9,452,541 | B2 | 9/2016 | Mascari et al. |
| 9,475,203 | B2 | 10/2016 | Whited et al. |
| 9,522,473 | B2 | 12/2016 | Mascari et al. |
| 9,573,283 | B2 | 2/2017 | Thompson et al. |
| 9,579,810 | B2 | 2/2017 | Mascari |
| 9,592,076 | B2 | 3/2017 | Esarey et al. |
| 9,623,577 | B2 | 4/2017 | Whited et al. |
| 9,833,919 | B2 | 12/2017 | Mascari et al. |
| 10,040,211 | B2 | 8/2018 | Whited |
| 10,124,500 | B2 | 11/2018 | Whited et al. |
| 11,759,966 | B2 | 9/2023 | Whited et al. |
| 2002/0096027 | A1 | 7/2002 | Whited et al. |
| 2003/0070301 | A1 | 4/2003 | Hermann et al. |
| 2003/0084576 | A1 | 5/2003 | Whited et al. |
| 2003/0131482 | A1 | 7/2003 | Long et al. |
| 2003/0196333 | A1 | 10/2003 | Whited |

(56) References Cited

U.S. PATENT DOCUMENTS

| | | |
|---|---|---|
| 2004/0134326 A1 | 7/2004 | Long et al. |
| 2005/0126015 A1 | 6/2005 | Whited |
| 2005/0178009 A1 | 8/2005 | Whited |
| 2005/0217119 A1 | 10/2005 | Rapp |
| 2006/0037200 A1 | 2/2006 | Rosu et al. |
| 2006/0137193 A1 | 6/2006 | Whited |
| 2006/0211966 A1 | 9/2006 | Halton et al. |
| 2007/0283573 A1 | 12/2007 | Levsen |
| 2007/0283574 A1 | 12/2007 | Levsen |
| 2008/0022537 A1 | 1/2008 | Clarke et al. |
| 2008/0078158 A1 | 4/2008 | Reist |
| 2008/0098605 A1 | 5/2008 | Whited et al. |
| 2009/0227192 A1 | 9/2009 | Luthi et al. |
| 2010/0101097 A1 | 4/2010 | Thien |
| 2010/0111460 A1 | 5/2010 | Albrecht et al. |
| 2010/0170097 A1 | 7/2010 | Levsen |
| 2011/0185580 A1 | 8/2011 | Whited |
| 2011/0247220 A1 | 10/2011 | Whited et al. |
| 2012/0011980 A1 | 1/2012 | Kroger |
| 2012/0030952 A1 | 2/2012 | Levsen |
| 2013/0025134 A1 | 1/2013 | Mascari et al. |
| 2013/0025136 A1 | 1/2013 | Whited et al. |
| 2013/0025138 A1 | 1/2013 | Whited et al. |
| 2013/0025139 A1 | 1/2013 | Whited et al. |
| 2013/0056324 A1 | 3/2013 | Freund |
| 2013/0104404 A1 | 5/2013 | Levsen |
| 2013/0185944 A1 | 7/2013 | Thompson et al. |
| 2013/0205572 A1 | 8/2013 | Mascari |
| 2013/0243358 A1 | 9/2013 | Stork et al. |
| 2013/0266250 A1 | 10/2013 | Brown |
| 2013/0326886 A1 | 12/2013 | Levsen |
| 2014/0074118 A1 | 3/2014 | Esarey et al. |
| 2014/0074120 A1 | 3/2014 | Esarey et al. |
| 2015/0377289 A1 | 12/2015 | Scheidel et al. |
| 2016/0082612 A1 | 3/2016 | Mascari et al. |
| 2016/0279818 A1 | 9/2016 | Whited |
| 2016/0345996 A1 | 12/2016 | Esarey et al. |
| 2018/0162001 A1 | 6/2018 | Whited |
| 2018/0162002 A1 | 6/2018 | Whited et al. |
| 2019/0049042 A1 | 2/2019 | Wentworth |

FOREIGN PATENT DOCUMENTS

| | | |
|---|---|---|
| DE | 19958802 | 7/2001 |
| EP | 0689905 | 1/1996 |
| EP | 0816026 | 1/1998 |
| EP | 1226907 | 7/2002 |
| EP | 1356902 | 10/2003 |
| EP | 1403012 | 3/2004 |
| EP | 1527853 | 5/2005 |
| EP | 1527854 | 5/2005 |
| EP | 1916075 | 4/2008 |
| EP | 2353805 | 8/2011 |
| EP | 2497366 | 9/2012 |
| EP | 2557935 | 6/2016 |
| EP | 2736684 | 1/2017 |
| FR | 1216947 | 4/1960 |
| JP | 2000-52293 | 2/2000 |
| WO | WO 2001/024977 | 4/2001 |
| WO | WO 2001/41980 | 6/2001 |
| WO | WO 2008/107490 | 9/2008 |
| WO | WO 2011/130057 | 10/2011 |
| WO | WO 2013/016019 | 1/2013 |
| WO | WO 2013/016020 | 1/2013 |
| WO | WO 2013/016021 | 1/2013 |
| WO | WO 2013/016022 | 1/2013 |
| WO | WO 2013/016024 | 1/2013 |
| WO | WO 2013/016344 | 1/2013 |
| WO | WO 2014/039601 | 3/2014 |
| WO | WO 2014/039609 | 3/2014 |
| WO | WO 2014/159349 | 10/2014 |
| WO | WO 2014/160043 | 10/2014 |

OTHER PUBLICATIONS

Oct. 3, 2011 Decision and Opinion of the United States Court of Appeals for the Federal Circuit (Appeal No. 2011-1038,-1046) regarding the case styled *Bettcher Industries, Inc. v. Bunzl USA, Inc. and Bunzi Processor Distribution, LLC*, Case No. 3:08 cv 2423, U.S. District Court for the Northern District of Ohio, Judge Zouhary. The Decision and Opinion relates to U.S. Pat. No. 7,000,325, owned by the assignee of the present application. (47 pages).

International Search Report and Written Opinion of the International Searching Authority dated Jul. 13, 2018 for PCT International Application No. PCT/US2018/036498, filed Jun. 7, 2018. PCT International Application No. PCT/US2018/036498 corresponds to and claims priority from U.S. Appl. No. 15/822,914, issued as U.S. Pat. No. 10,124,500 dated Nov. 13, 2018. The present application claims priority from U.S. Appl. No. 15/822,914. (6 pages).

International Search Report and Written Opinion of the International Searching Authority dated Apr. 26, 2019 for PCT International Application No. PCT/US2018/062042, filed Nov. 20, 2018. PCT International Application No. PCT/US2018/062042 corresponds to and claims priority from U.S. Appl. No. 15/822,914, issued as U.S. Pat. No. 10,471,614 dated Nov. 12, 2019, and from U.S. Appl. No. 15/822,914, issued as U.S. Pat. No. 10,124,500, dated Nov. 13, 2018. The present application claims priority from U.S. Appl. No. 16/013,565 and from U.S. Appl. No. 15/822,914 (9 pages).

Extended European Search Report dated Jul. 23, 2021 for European Application No. 18881690.4, filed Jun. 23, 2020. European Application No. 18881690.4 is a regional phase application of PCT International Application No. PCT/US2018/062042, filed Nov. 20, 2018. PCT International Application No. PCT/US2018/062042 claims priority from U.S. Appl. No. 15/822,914, issued as U.S. Pat. No. 10,471,614 dated Nov. 13, 2019. The present application claims priority from U.S. Appl. No. 15/822,914 and from U.S. Appl. No. 15/822,914. (5 pages).

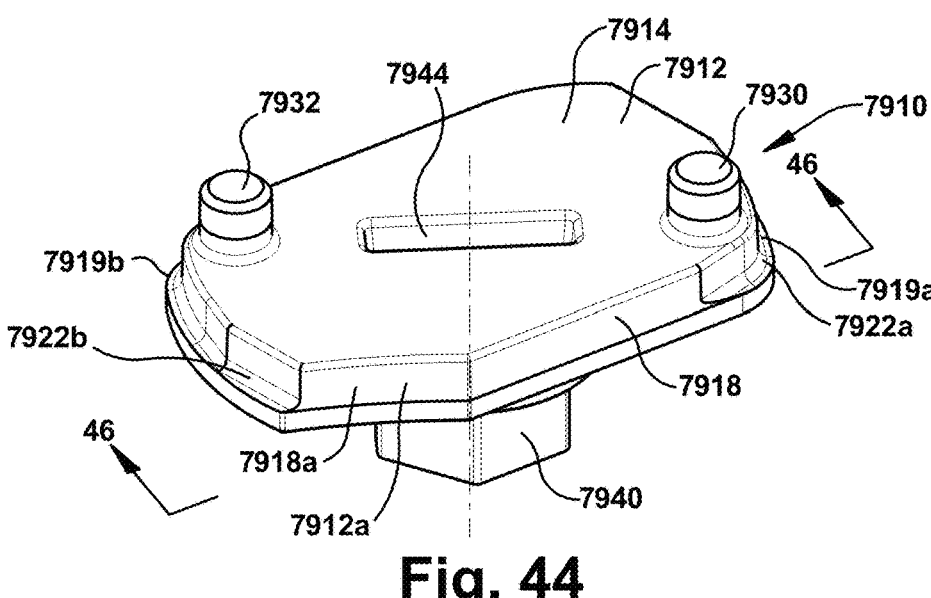
Fig. 44
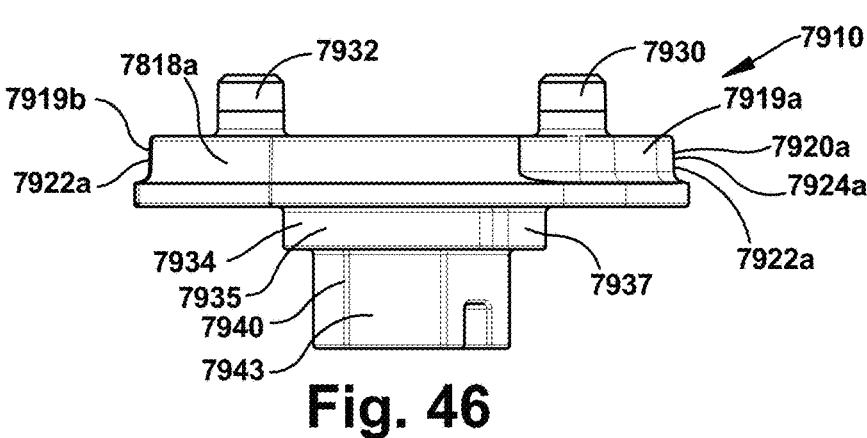
Fig. 45
Fig. 46

CAM-ACTUATED SPLIT BLADE HOUSING FOR POWER OPERATED ROTARY KNIFE

CROSS-REFERENCE TO RELATED APPLICATIONS

The present application claims priority under 35 USC 120 as a continuation application of co-pending U.S. application Ser. No. 18/368,963, filed Sep. 15, 2024, published as US-2024-0001572-A1 on Jan. 4, 2024, which issued as U.S. Pat. No. 12,083,695 on Sep. 15, 2024, which is continuation of U.S. application Ser. No. 17/877,241, filed Aug. 12, 2022, published as U.S. Pub. No. US-2022-0379510-A1 on Dec. 1, 2022, which issued as U.S. Pat. No. 11,759,966 on Sep. 19, 2023, which is a continuation of U.S. application Ser. No. 17/180,168, filed Feb. 19, 2021, published as U.S. Pub. No. US-2021-0197414-A1 on Jul. 1, 2021, which issued as U.S. Pat. No. 11,413,778 on Aug. 16, 2022, which is a continuation of U.S. application Ser. No. 16/662,833, filed Oct. 24, 2019, published as U.S. Pub. No. US-2020-0055208-A1 on Feb. 20, 2020, which issued as U.S. Pat. No. 10,926,427 on Feb. 23, 2021, which is a continuation of U.S. application Ser. No. 16/013,565, filed Jun. 20, 2018, published as U.S. Pub. No. US-2018-0345514-A1 on Dec. 6, 2018, which issued as U.S. Pat. No. 10,471,614 on Nov. 12, 2019, which is a continuation-in-part of U.S. application Ser. No. 15/822, 914, filed Nov. 27, 2017, published as U.S. Pub. No. US-2018-0162002-A1 on Jun. 14, 2018, which issued as U.S. Pat. No. 10,124,500 on Nov. 13, 2018, which is a continuation-in-part of U.S. application Ser. No. 15/374, 207, filed Dec. 9, 2016, published as U.S. Pub. No. US-2018-0162001-A1 on Jun. 14, 2018, which issued as U.S. Pat. No. 10,040,211 on Aug. 7, 2018. The respective entire contents of the above-identified U.S. application Ser. Nos. 18/368,963, 17/887,241, 17/180,168, 16/662,833, 16/013,565, 15/815,914, and 15/374,207, U.S. Publication Nos. US-2024-0001572-A1, US-2022-0379510-A1, US-2021-0197414-A1, US-2020-0055208-A1, US-2018-0345514-A1, US-2018-0162002-A1, and US-2018-0162001-A1, and U.S. Pat. Nos. 12,083,695, 11,759,966, 11,413,778, 10,926,427, 10,471,614, 10,124,500, 10,124, 500, and 10,040,211 are incorporated by reference herein their respective entireties for any and all purposes.

TECHNICAL FIELD

The present disclosure relates to a power operated rotary knife and, more specifically, to a split blade housing assembly for a power operated rotary knife that includes a split blade housing and a two-position cam mechanism that, in a first, closed position of the cam mechanism, holds or secures the split blade housing in a first, blade-supporting position, and, in a second, open position of the cam mechanism, secures the split blade housing in a second, blade changing position.

BACKGROUND

Hand held, power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as tissue harvesting or recovery, debriding/removal of skin tissue, bone tissue, tendon/ligament harvesting from human or animal tissue donors for medical purposes. Power operated rotary knives may also be used for taxidermy and for cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft which is driven by an electric motor. Alternatively, the pinion gear may be driven by a pneumatic motor mounted within the handle assembly. Gear teeth of the pinion gear engage mating gear teeth formed on an upper surface of the rotary knife blade.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Power operated rotary knives are disclosed in U.S. Pat. No. 6,354,949 to Baris et al., U.S. Pat. No. 6,751,872 to Whited et al., U.S. Pat. No. 6,769,184 to Whited, U.S. Pat. No. 6,978,548 to Whited et al., U.S. Pat. No. 8,448,340 to Whited, and U.S. Pat. No. 8,726,524 to Whited et al., all of which are assigned to the assignee of the present invention and all of which are incorporated herein in their respective entireties by reference.

SUMMARY

In one aspect, the present disclosure relates to a blade housing assembly for supporting an annular rotary knife blade of a power operated rotary knife for rotation about a central axis of rotation, the blade housing assembly comprising: a split blade housing including: an annular blade support section centered about a blade housing center line and including an inner wall; a mounting section extending from the blade support section; and a split extending through the mounting section and the inner wall of the blade support section and defining a split distance between first and second circumferential ends of the inner wall; the mounting section including a first body portion and a second body portion on opposite sides of the split, the first body portion including a first cam slot having a first end portion and a spaced apart second end portion; and a cam mechanism including: a cam plate bridging the first and second body portions of the mounting section of the split blade housing; and a cam member rotatably supported by the cam plate, the cam member rotatable between a first, closed position and a second, open position and including a first cam pin received in the first cam slot of the first body portion of the mounting section of the split blade housing, in the first, closed position of the cam member, the first cam pin is positioned nearer the first end portion of the first cam slot and the split distance between the first and second circumferential ends of the inner wall being a first value, in the second, open position of the cam member, the first cam pin is positioned nearer the second end portion of the first cam slot and the split distance between the first and second circumferential ends of the inner wall being a second value.

In another aspect, the present disclosure relates to a blade housing assembly for supporting an annular rotary knife blade of a power operated rotary knife for rotation about a central axis of rotation, the blade housing assembly comprising: a split blade housing including: an annular blade support section centered about a blade housing center line, an inner wall of the blade support section defining a blade bearing region; a mounting section extending from the blade support section; and a split extending through the mounting section and the inner wall of the blade support section and defining a split distance between first and second circumferential ends of the inner wall; the mounting section including a first body portion and a second body portion on opposite sides of the split, the first body portion including a first cam slot having a first end portion and a spaced apart second end portion and the second body portion including a second cam slot having a first end portion and a spaced apart second end portion; and a cam mechanism including: a cam plate bridging the first and second body portions of the mounting section of the split blade housing; and a cam member rotatably supported by the cam plate, the cam member rotatable between a first, closed position and a second, open position and including a first cam pin received in the first cam slot of the first body portion of the mounting section of the split blade housing and a second cam pin received in the second cam slot of the second body portion of the mounting section of the split blade housing, in the first, closed position of the cam member, the first cam pin is positioned nearer the first end portion of the first cam slot, the second cam pin is positioned nearer the first end portion of the second cam slot and the split distance between the first and second circumferential ends of the inner wall being a first value, in the second, open position of the cam member, the first cam pin is positioned nearer the second end portion of the first cam slot, the second cam pin is positioned nearer the second end portion of the second cam slot and the split distance between the first and second circumferential ends of the inner wall being a second value.

In another aspect, the present invention relates to a power operated rotary knife comprising: power operated rotary knife comprising: an annular rotary knife blade supported for rotation about a central axis of rotation; an elongated handle assembly extending along a longitudinal axis; a frame body coupled to a distal end of the elongated handle assembly, the frame body including a mounting pedestal; and a blade housing assembly coupled to the frame body and supporting the annular rotary knife blade for rotation about the central axis of rotation, the blade housing assembly including: a split blade housing including: an annular blade support section centered about a blade housing center line and including an inner wall; a mounting section extending from the blade support section; and a split extending through the mounting section and the inner wall of the blade support section and defining a split distance between first and second circumferential ends of the inner wall; the mounting section including a first body portion and a second body portion on opposite sides of the split, the first body portion including a first cam slot having a first end portion and a spaced apart second end portion; and a cam mechanism including: a cam plate bridging the first and second body portions of the mounting section of the split blade housing; and a cam member rotatably supported by the cam plate, the cam member rotatable between a first, closed position and a second, open position and including a first cam pin received in the first cam slot of the first body portion of the mounting section of the split blade housing, in the first, closed position of the cam member, the first cam pin is positioned nearer the first end portion of the first cam slot and the split distance between the first and second circumferential ends of the inner wall being a first value, in the second, open position of the cam member, the first cam pin is positioned nearer the second end portion of the first cam slot and the split distance between the first and second circumferential ends of the inner wall being a second value, the cam mechanism securing the mounting section of the split blade housing to the mounting pedestal of the frame body.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 44 is a schematic top, front perspective view of a cam member of the cam mechanism of the blade housing assembly of the power operated rotary knife of FIG. 26;

FIG. 45 is a schematic bottom, front perspective view of the cam member of FIG. 44;

FIG. 46 is a schematic front elevation view of the cam member of FIG. 44 as seen from a plane indicated by the line 46-46 in FIG. 40;

DETAILED DESCRIPTION

The descriptions and disclosures, including drawings, relating to hand held, power operated rotary knives 100, 1000, 2000 and 3000, of the first, second, third and fourth exemplary embodiments, and components and assemblies thereof, and the rotary knife blade-blade housing assembly 4500 of the fifth exemplary embodiment, and components thereof, as disclosed in parent U.S. application Ser. No. 15/374,207 (hereinafter "the '207 application"), filed Dec. 9, 2016 and entitled POWER OPERATED ROTARY KNIFE, assigned to the assignee of the present application, are hereby fully incorporated herein by reference in their respective entireties by reference. For brevity, the descriptions of the power operated rotary knives will not be repeated herein.

Sixth Embodiment—Power Operated Rotary Knife 6000

A sixth exemplary embodiment of a power operated rotary knife of the present disclosure is shown generally at 6000 in FIGS. 1-9. The power operated rotary knife 6000 extends between a distal or forward end 6001 and a proximal or rearward end 6002 of the power operated rotary knife 6000. The power operated rotary knife 6000 includes an elongated handle assembly 6110, a head assembly, which is releasably secured to a front or distal end 6112 of the handle assembly 6110, and a drive mechanism 6600, including a gear train 6604. The handle assembly 6110 includes a central throughbore 6115 that extends along a central longitudinal axis LA of the handle assembly 6110. The head assembly 6200 extends from the handle assembly 6110 along the central longitudinal axis LA in a forward or distal direction FW. The throughbore 6115 of the handle assembly 6110 receives a distal portion of a flexible drive shaft assembly (similar to the flexible drive shaft assembly 700 of the first exemplary embodiment) which rotates the drive mechanism 6600, as described in the first exemplary embodiment of the '207 application. As used herein, the forward direction FW will be a direction extending generally along or parallel to the handle assembly longitudinal axis toward the distal end 6001 of the power operated rotary knife 6000 and a rearward direction RW will be a direction extending generally along or parallel to the handle assembly longitudinal axis toward the proximal end 6002 of the power operated rotary knife 6000.

Figure 8:
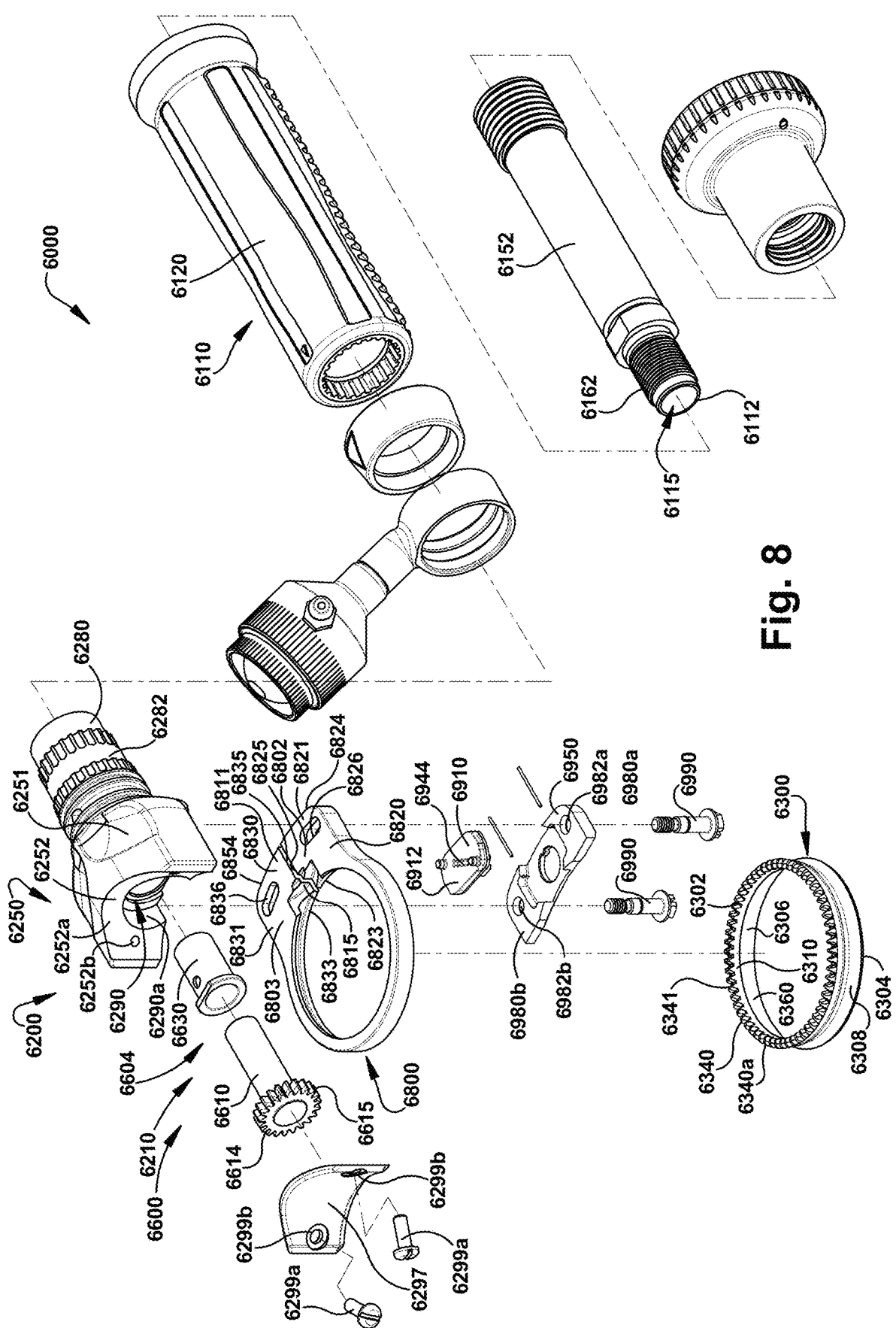
FIG. 8 is a schematic exploded, top, front perspective view of the power operated rotary knife of FIG. 1.
Figure 9:
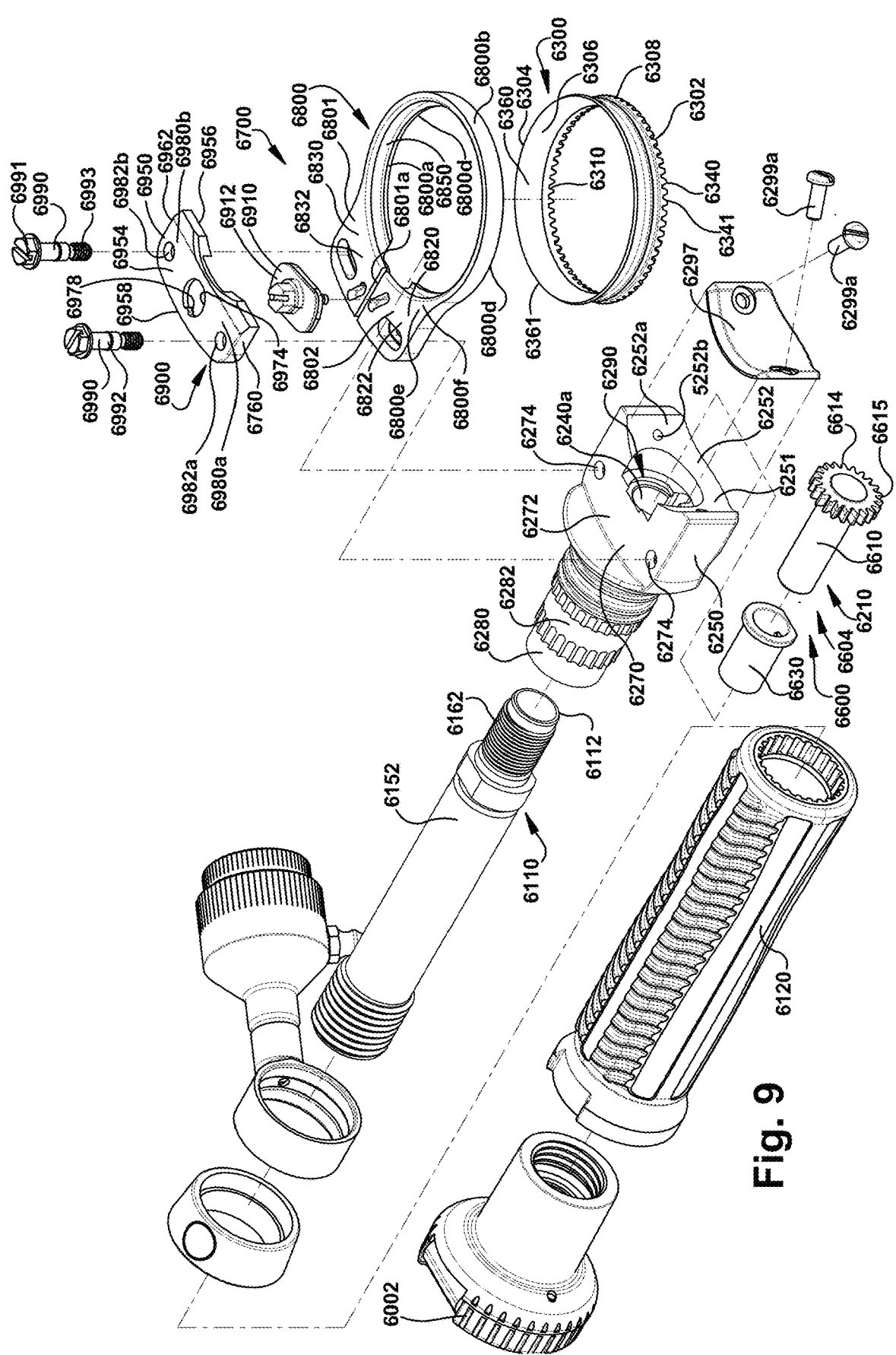
FIG. 9 is a schematic exploded, bottom, front perspective view of the power operated rotary knife of FIG. 1.

As best seen in FIGS. 8 and 9, the head assembly 6200 includes a frame body 6250 including a forward portion 6251 and a rearward portion 6280. The rearward portion 6280 of the frame body 6250 includes an annular boss 6282 that defines a mounting structure that receives and engages the front end 6112 of the handle assembly 6110 to secure the head assembly 6200 to the handle assembly 6110. The head assembly 6200 further includes an annular rotary knife blade 6300, substantially similar to the annular rotary knife blade 2300 of the power operated rotary knife 2000 of the third exemplary embodiment of the '207 application, and a blade housing assembly 6700 including a split blade housing 6800 which supports the annular rotary knife blade 6300 for rotation about a central axis of rotation R. The annular rotary knife blade 6300 includes an upper body 6310 and a lower blade section 6360 extending from the body 6310. The annular rotary knife blade 6300 is rotatably driven by the drive mechanism 6600, as previously described. The forward portion 6251 of the frame body 6250 supports the drive mechanism 6600 and positions a gear head 6614 of a pinion gear 6610 of the gear train 6604 of the drive mechanism 6600 to interface with a driven gear 6340 of the body 6310 of the rotary knife blade 6300 to thereby rotate the blade 6300 about its central axis of rotation R.

Figure 1:
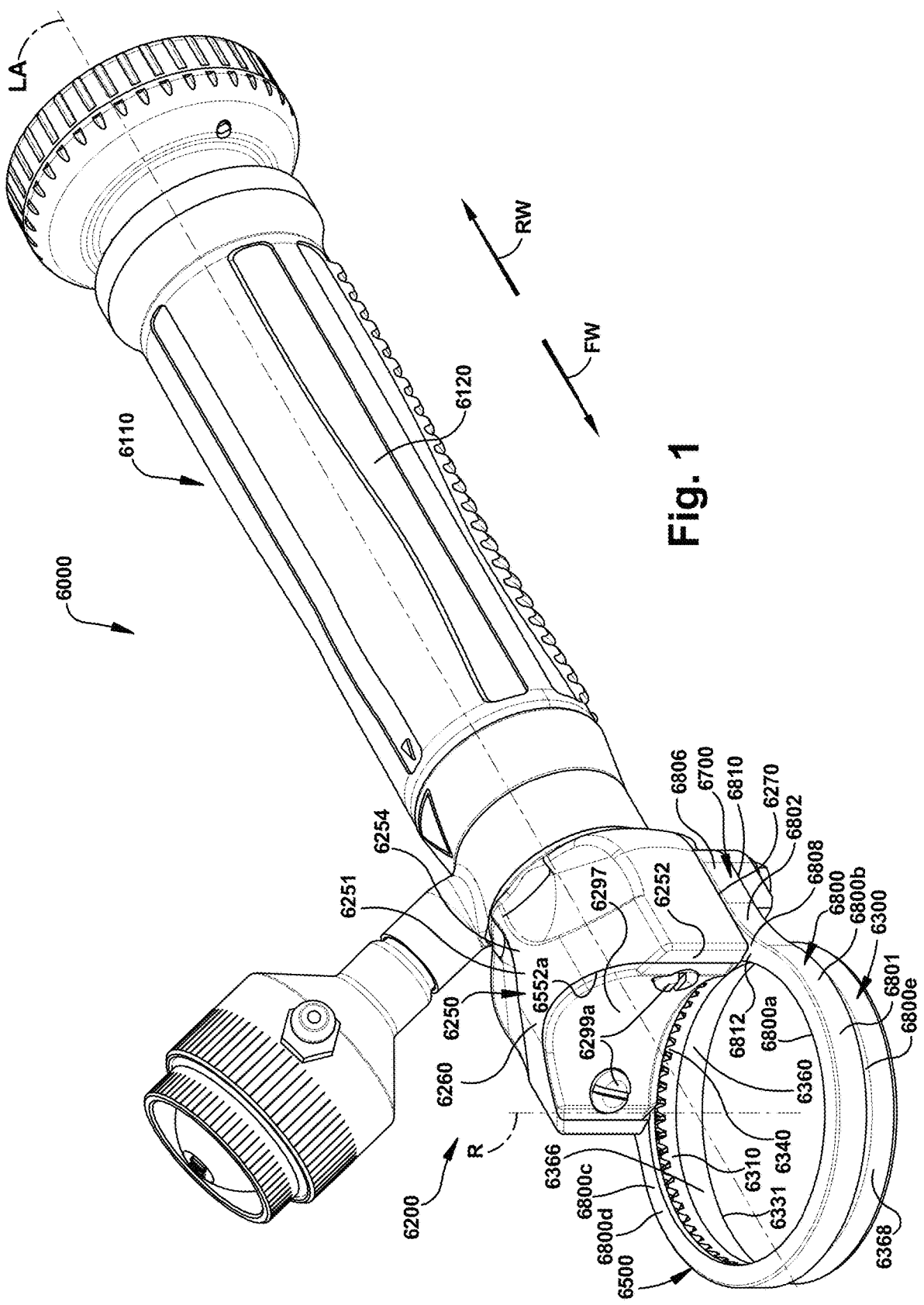
FIG. 1 is a schematic top, front perspective section view of a sixth exemplary embodiment of a power operated rotary knife of the present disclosure, including a head assembly, a handle assembly and a drive mechanism, the head assembly including a frame body, an annular rotary knife blade and a blade housing assembly supporting the annular rotary knife blade for rotation, the blade housing assembly including an annular split ring blade housing and a cam mechanism coupled to the blade housing to selectively move the blade housing between a first, blade supporting position and a second, blade changing position.
Figure 2:
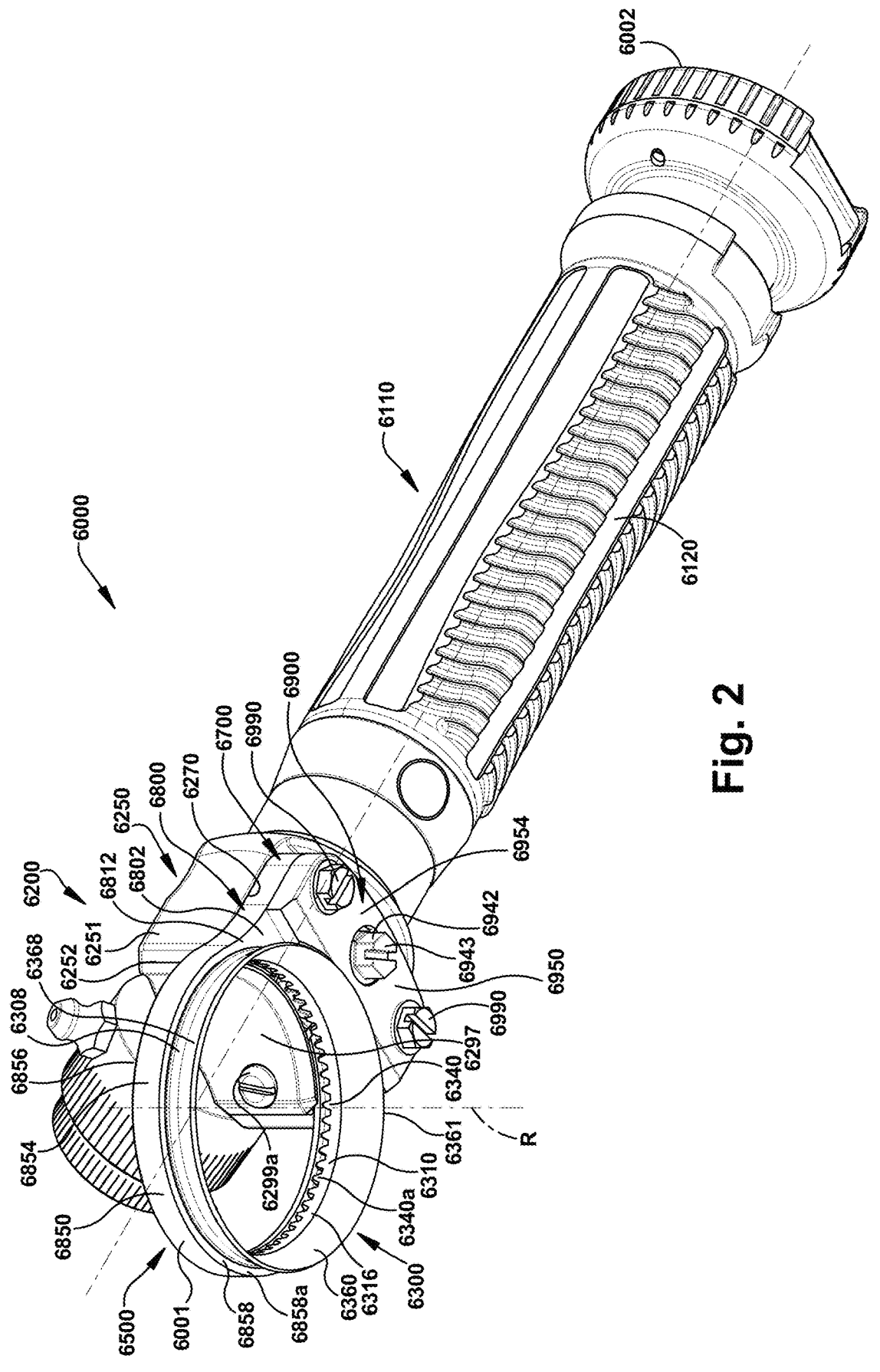
FIG. 2 is a schematic bottom, front perspective view of the power operated rotary knife of FIG. 1.
Figure 3:
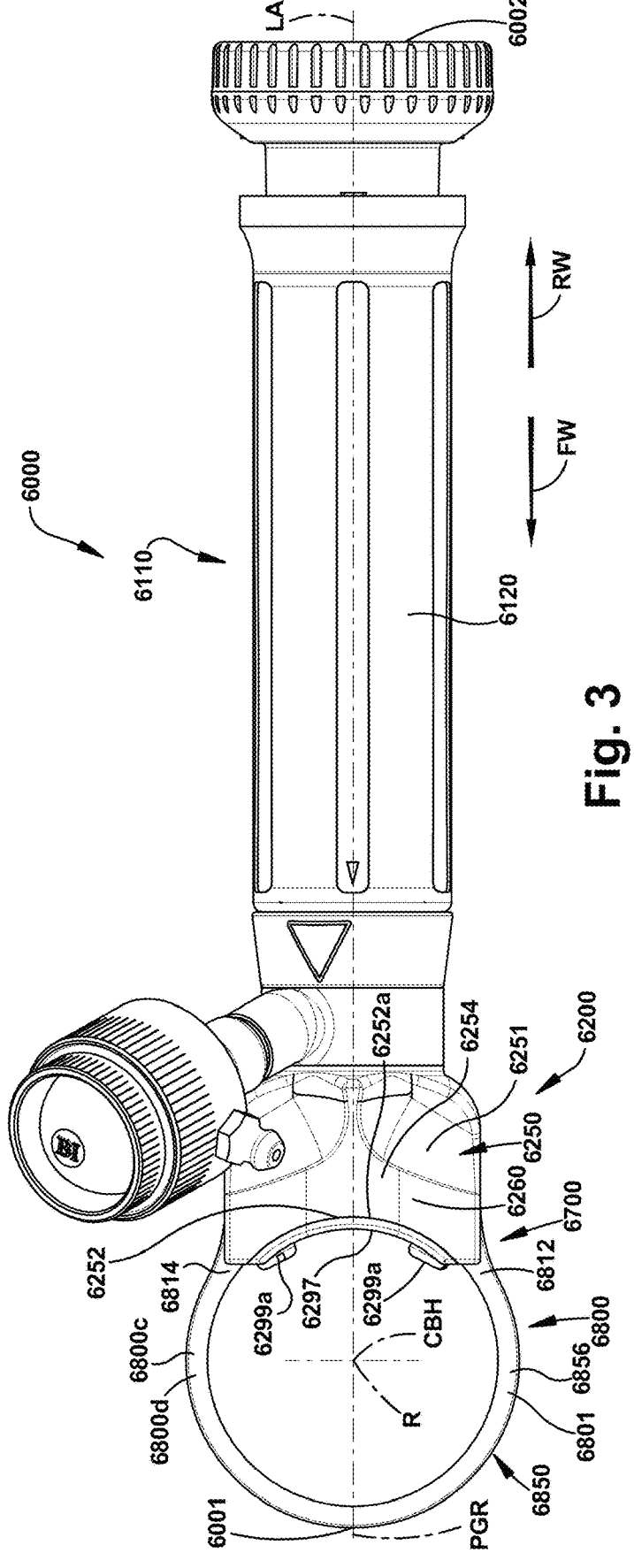
FIG. 3 is a schematic top plan view of the power operated rotary knife of FIG. 1.
Figure 4:
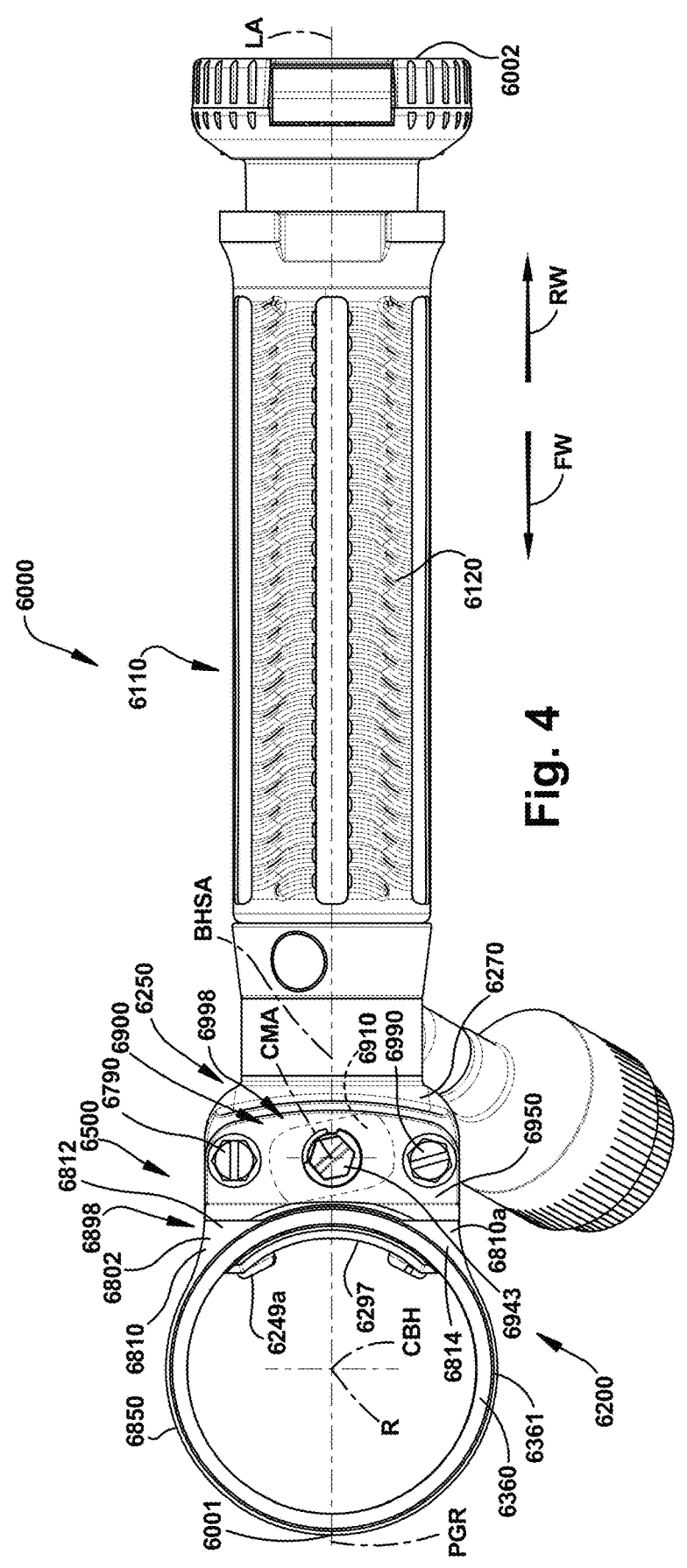
FIG. 4 is a schematic bottom plan view of the power operated rotary knife of FIG. 1.
Figure 5:
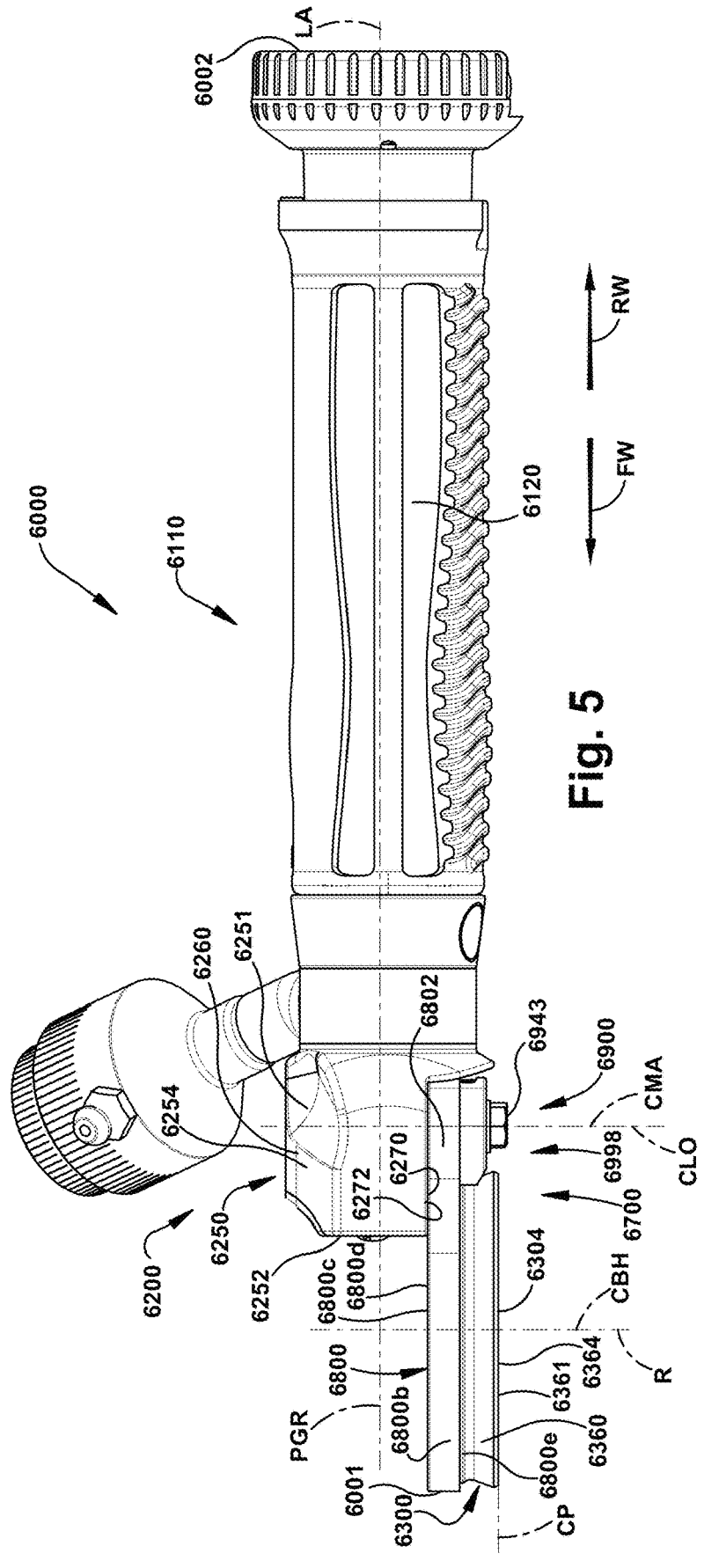
FIG. 5 is a schematic side elevation view of the power operated rotary knife of FIG. 1.
Figure 6:
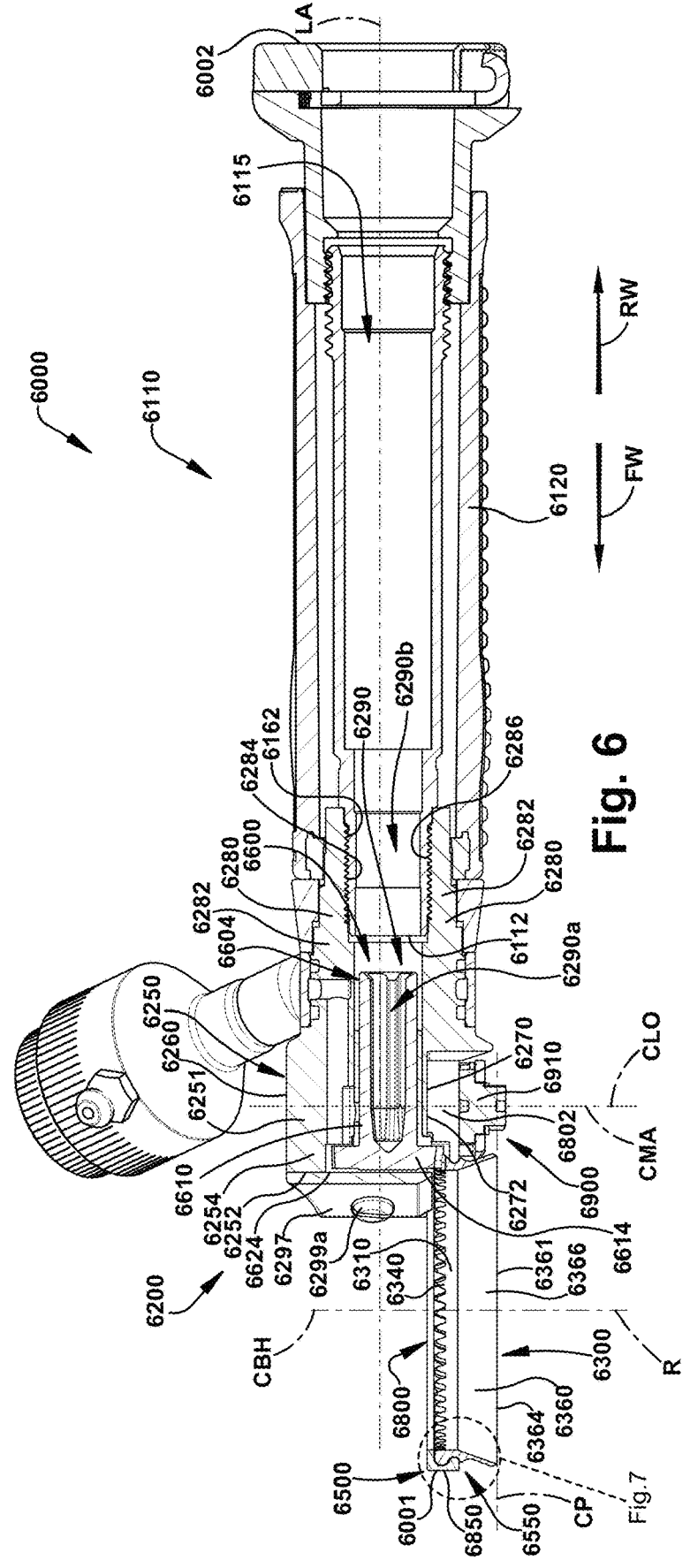
FIG. 6 is a schematic vertical section view taken along a longitudinal axis of the handle assembly of the power operated rotary knife of FIG. 1.
Figure 7:
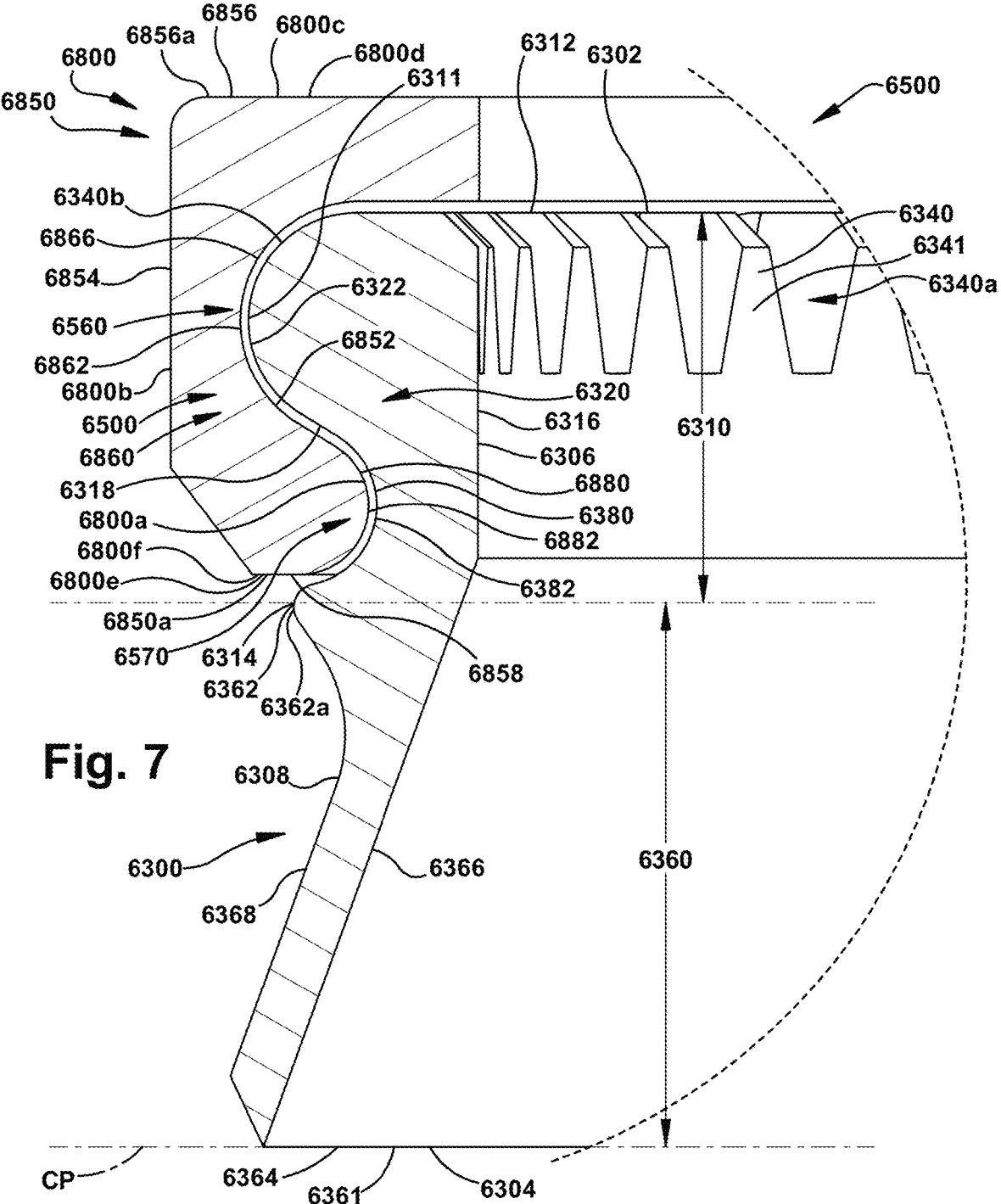
FIG. 7 is a schematic enlarged vertical section view of the power operated rotary knife of FIG. 1 which is within a circle labeled FIG. 7 in FIG. 6.

As best seen in FIGS. 6 and 7, an assembled blade-blade housing combination 6500 includes the annular rotary knife blade 6300 and the split blade housing 6800 supporting the rotary knife blade 6300 for rotation about the annular rotary knife blade's central axis of rotation R. The assembled blade-blade housing combination 6500 includes a blade-blade housing bearing structure 6550, similar to the blade-blade housing bearing structure 2550 of the assembled blade-blade housing combination 2500 of the third exemplary embodiment of the '207 application. More specifically, the blade-blade housing bearing structure 6550 includes two axially spaced apart bearing structures, namely, a first blade-blade housing bearing structure 6560 and a second blade-blade housing bearing structure 6570.

Various components and assemblies of the power operated rotary knife 6000 are substantially similar in structure and/or function to corresponding components and assemblies of the power operated rotary knife 2000 of the third exemplary embodiment of the '207 application. In the interest of brevity, components and assemblies of the power operated rotary knife 6000 that are similar to the corresponding components and assemblies of the power operated rotary knife 2000 of the third exemplary embodiment in structure and/or function will not be fully described herein. Instead, reference is made to the description of such components and assemblies set forth above in connection with the power operated rotary knife 2000 and/or the power operated rotary knife 100 of the first exemplary embodiment and/or the power operated rotary knife 1000 of the second exemplary embodiment and/or the power operated rotary knife 3000 of the fourth exemplary embodiment and/or the blade-blade housing combination 4500 of the fifth exemplary embodiment, as set forth in the '207 application. Materials/fabrication of components and assemblies of the power operated rotary knife 6000 are similar to materials/fabrication of corresponding components and assemblies of the power operated rotary knives 100, 1000, 2000, 3000 and the blade-blade housing combination 4500, as described in the '207 application. Such descriptions of components and assemblies of the power operated rotary knives 100, 1000, 2000, 3000 and the blade-blade housing combination 4500 are hereby incorporated by reference from the '207 application in the following description of the power operated rotary knife 6000 of the sixth exemplary embodiment. Identification of axes, lines, planes and directions for the power operated rotary knife 6000, as set forth herein, will be the same as used for the description of the power operated rotary knives 100, 1000, 2000, 3000 in the '207 application.

Figure 23:
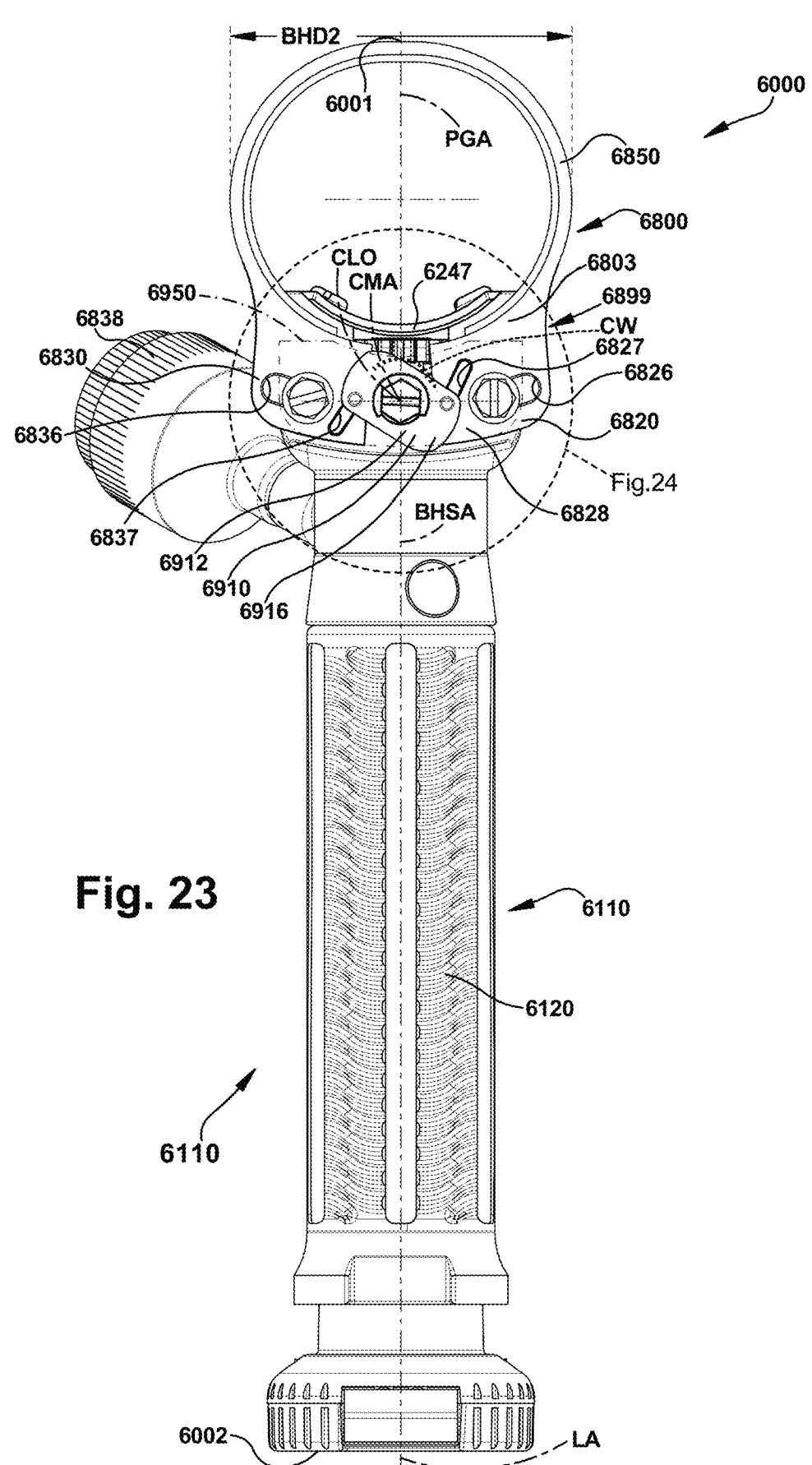
FIG. 23 is a schematic bottom plan view of the power operated rotary knife of FIG. 31 with the annular rotary knife blade removed and a cam plate of the cam mechanism of the blade housing assembly removed and with the cam mechanism in a second, open position and the annular split blade housing in the second, blade changing position.
Figure 24:
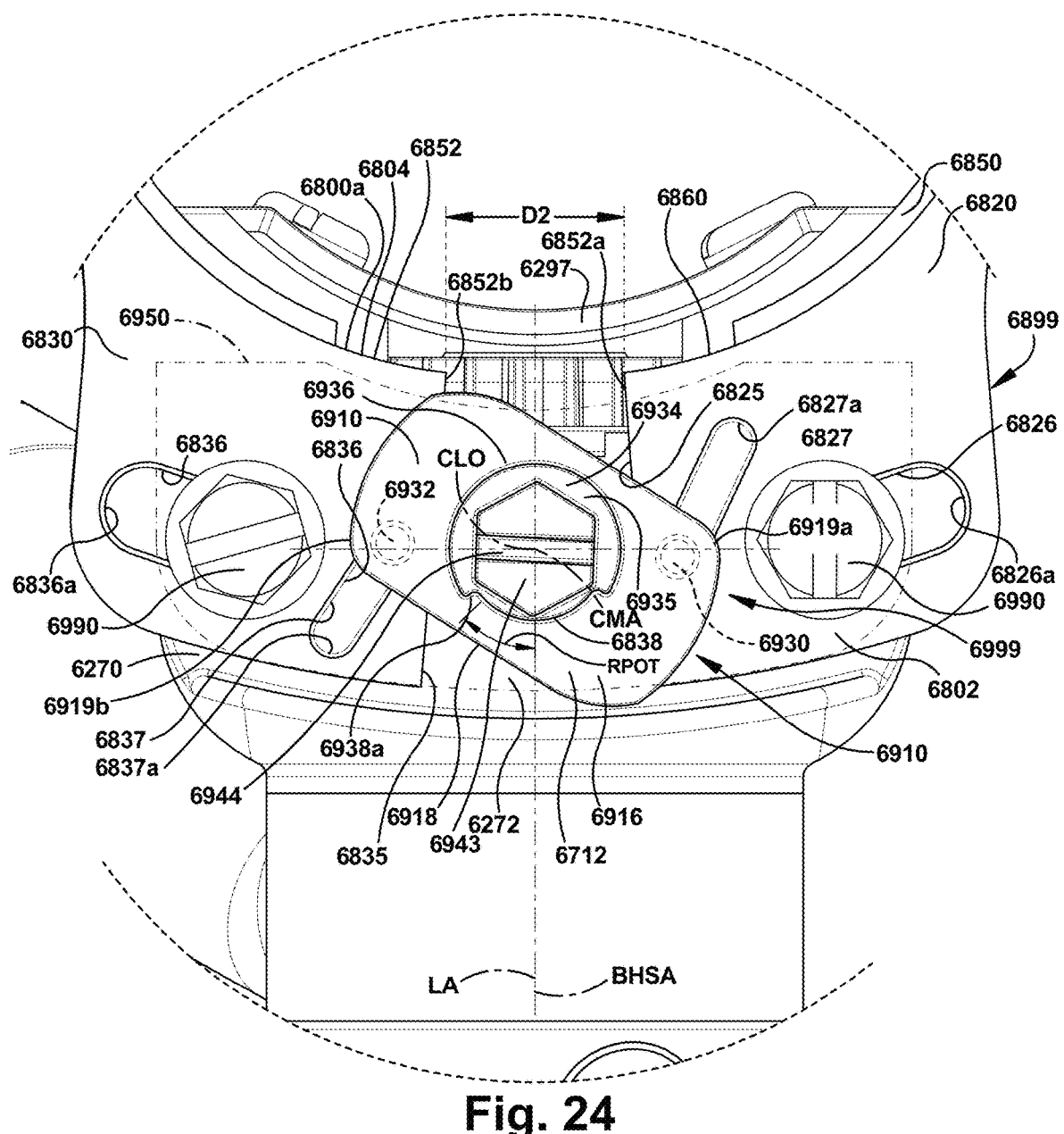
FIG. 24 is a schematic enlarged bottom plan view of a portion of the power operated rotary knife of FIG. 1 which is within a circle labeled FIG. 24 in FIG. 23 and with the cam mechanism in the second, open position and the annular split blade housing in the second, blade changing position.

Unique to the sixth exemplary embodiment of the power operated rotary knife 6000 is a blade housing assembly 6700 of the head assembly 6200 which functions to secure the rotary knife blade 6300 for rotation about the central axis of rotation R. As best seen in FIGS. 21-24, the blade housing assembly 6700 includes the split blade housing 6800 and a cam mechanism or cam assembly 6900 affixed to the split blade housing 6800 which, in a first, closed, locked or home position 6998 of the cam mechanism 6900, secures the blade housing 6800 in a first, blade supporting position 6898, characterized by a first, unexpanded or blade supporting blade housing diameter BHD1 (depicted schematically in FIG. 21), and, in a second, open, unlocked or expanded position 6999 of the cam mechanism 6900, secures the blade housing 6800 in a second, blade changing position 6899, characterized by a second, expanded blade housing diameter BHD2 (FIG. 23). The blade housing 6800 includes an annular blade support section 6850 which supports the rotary knife blade 6300 for rotation and a mounting section 6802, which may be considered as a tongue or projection extending radially outwardly and in a generally rearward direction RW from the annular blade support section 6850.

The first and second blade housing diameters BHD1, BHD2 are measured with respect to the outer diameter of the annular blade support section 6850 in a direction generally orthogonal to the handle assembly longitudinal axis LA. It is to be understood, of course, that the second blade housing diameter BHD2 is larger than the first blade housing diameter BHD1 to facilitate removal of the annular rotary knife blade 6300 from the split blade housing 6800 when the blade housing 6800 is in the second, blade changing position 6899. It being further understood that the bearing interface between a blade bearing region 6320 of the annular rotary knife blade 6300 and a blade housing bearing region 6860 of the blade support section 6850 of the blade housing 6800 together comprising the blade-blade housing structure 6550 of the power operated rotary knife 6000 support the blade 6300 for rotation about its central axis of rotation R. When the blade housing diameter moves from the first, unexpanded blade housing diameter BHD1 to the second, expanded blade housing diameter BHD2, a diameter of a bearing region 6860 of the blade support section 6850 of the blade housing 6800 expands proportionately with the outer diameter of the blade housing 6800 as the diameter changes from BHD1 to BHD2, thus, the diameter of the bearing region 6860 of the blade support section 6850 of the blade housing 6800 expands sufficiently to allow removal of the annular rotary knife blade 6300 from the blade support section 6850 of the blade housing 6800. Stated another way, since the diameter of the bearing region 6860 of the blade support region 6850 of the blade housing 6800 is directly proportional to the outer diameters BHD1, BHD2 of the blade support section 6850, the blade housing outer diameters BHD1, BHD2 may be used as a convenient surrogate for the respective first, unexpanded diameter and second, expanded diameter of the blade housing bearing region 6860 as the blade housing 6800 moves from the first, blade supporting position 6898 to the second, open or expanded position 6899. Thus, for the specific parameters of the bearing interface or structure 6550 between the respective diameters of blade and blade housing bearing regions 6320, 6860, the second blade housing diameter BHD2 is sized to be a magnitude that is sufficiently large such that the annular rotary knife blade 6300 drops downwardly out of or is easily removed from the blade housing blade support section 6850 when the blade housing 6800 has been moved to the second, blade changing position 6899.

Advantageously, the cam mechanism 6900 functions both to: a) secure the assembled blade-blade housing combination 6500 to the frame body 6250; and b) as desired, allows an operator or maintenance person to selectively change the diameter of the blade support section 6850 of the blade housing 6800 between the first, unexpanded blade housing diameter BHD1 (for purposes of supporting the rotary knife blade 6300 for rotation about the central axis of rotation during use of the power operated rotary knife 6000) and the second, expanded blade housing diameter BHD2 (for purposes of removing the rotary knife blade 6300 from the blade housing 6800 for purposes of sharpening, blade changing, cleaning and/or maintenance of the power operated rotary knife 6000). That is, in the first, closed position 6998 of the cam mechanism 6900, the cam mechanism 6900 holds or secures the split blade housing 6800 in the first, blade supporting position 6898 wherein the annular rotary knife blade 6300 is supported for rotation about its central axis of rotation R, and, in the second closed position 6999 of the cam mechanism 6900, the cam mechanism 6900 secures the split ring blade housing 6800 in the second, blade changing position 6899 wherein the diameter of the blade support section 6850 is increased from BHD1 to BHD2 to allow for removal of the annular rotary knife blade 6300 from the split ring blade housing 6800 to allow for sharpening or replacement of the rotary knife blade 6300 and/or cleaning of the components of the head assembly 6200 of the power operated rotary knife 6000. The blade housing diameter in the first, blade supporting position 6898 is blade housing diameter BHD1 corresponding to the first, closed position 6998 of the cam mechanism 6900, is blade housing diameter BHD1 and the blade housing inner diameter in the second, blade changing position 6899, corresponding to the second, open position 6998 of the cam mechanism 6900, is blade housing diameter BHD2.

As can best be seen in FIGS. 8-11, the split blade housing 6800 comprises a split ring 6801 and includes a radial split 6801a extending through a diameter of the blade housing 6800 in the region of the blade housing mounting section 6802 to allow for expansion of a circumference of the annular blade support section 6850 for purposes of removing the annular rotary knife blade 6300 from the annular blade support section 6850 and inserting a new or resharpened annular rotary knife blade 6300 into the annular blade support section 6850. With respect to the mounting section 6802, the radially extending split 6801a bisects a planar central region 6811 of the mounting section 6802 defining a first body section or portion 6820 on one side of the split 6801a and a second body section or portion 6830 on an opposite side of the split 6801a. Advantageously, as can best be seen in FIGS. 2, 4, 21-24, the cam mechanism 6900 is mounted to the central region 6811 of the mounting section 6802 and bridges the first and second body portions 6820, 6830. The radially extending split 6801a defines a radially extending split axis BHSA of the blade housing mounting section 6802. The blade housing split axis BHSA is substantially orthogonal to and intersects a center line or central axis CBH of the blade housing 6800. The blade housing center line CBH is substantially coincident with the central axis of rotation R of the rotary knife blade 6300.

Figure 10:
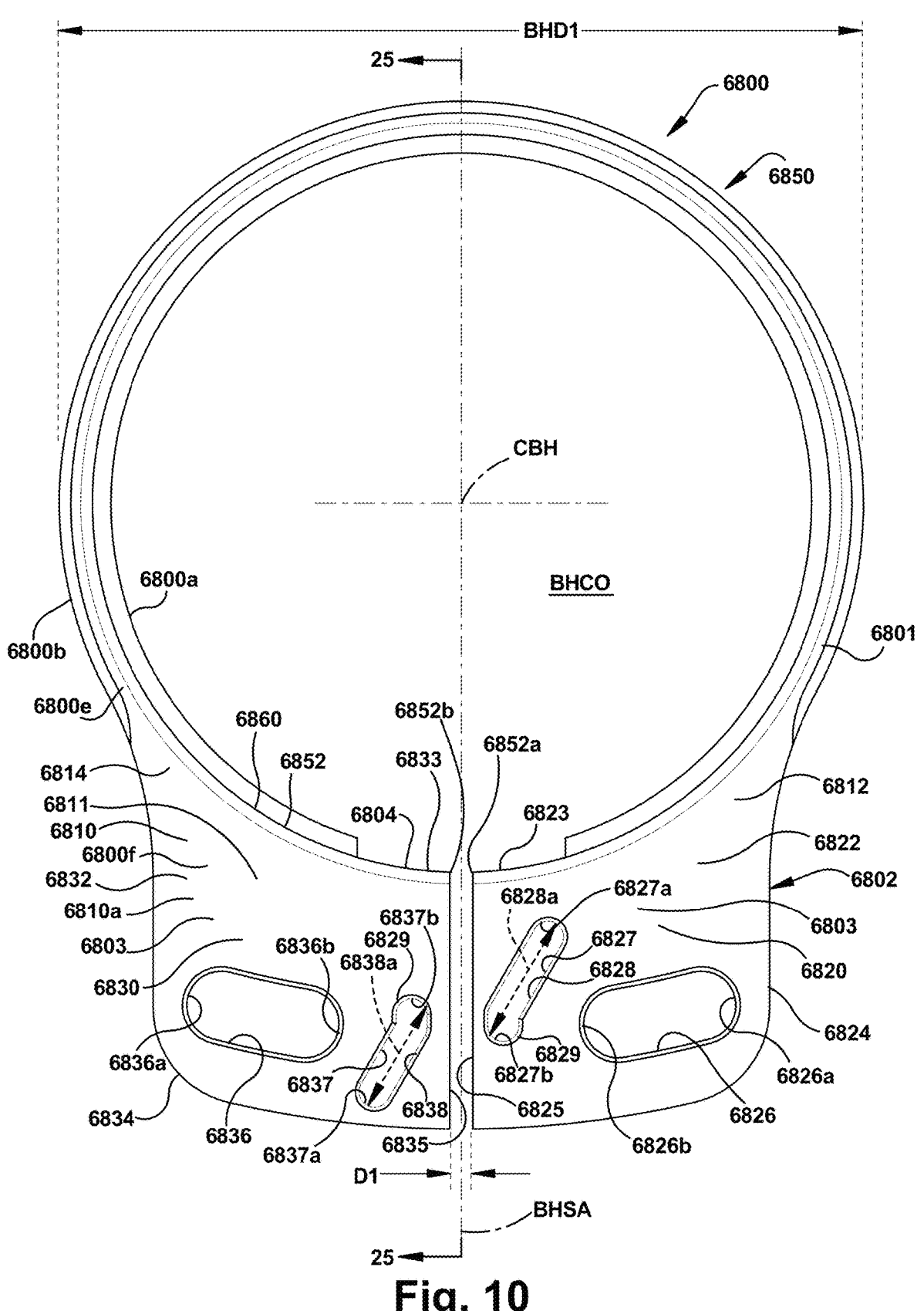
FIG. 10 is a schematic bottom plan view of the annular split ring blade housing of the power operated rotary knife of FIG. 1.
Figure 11:
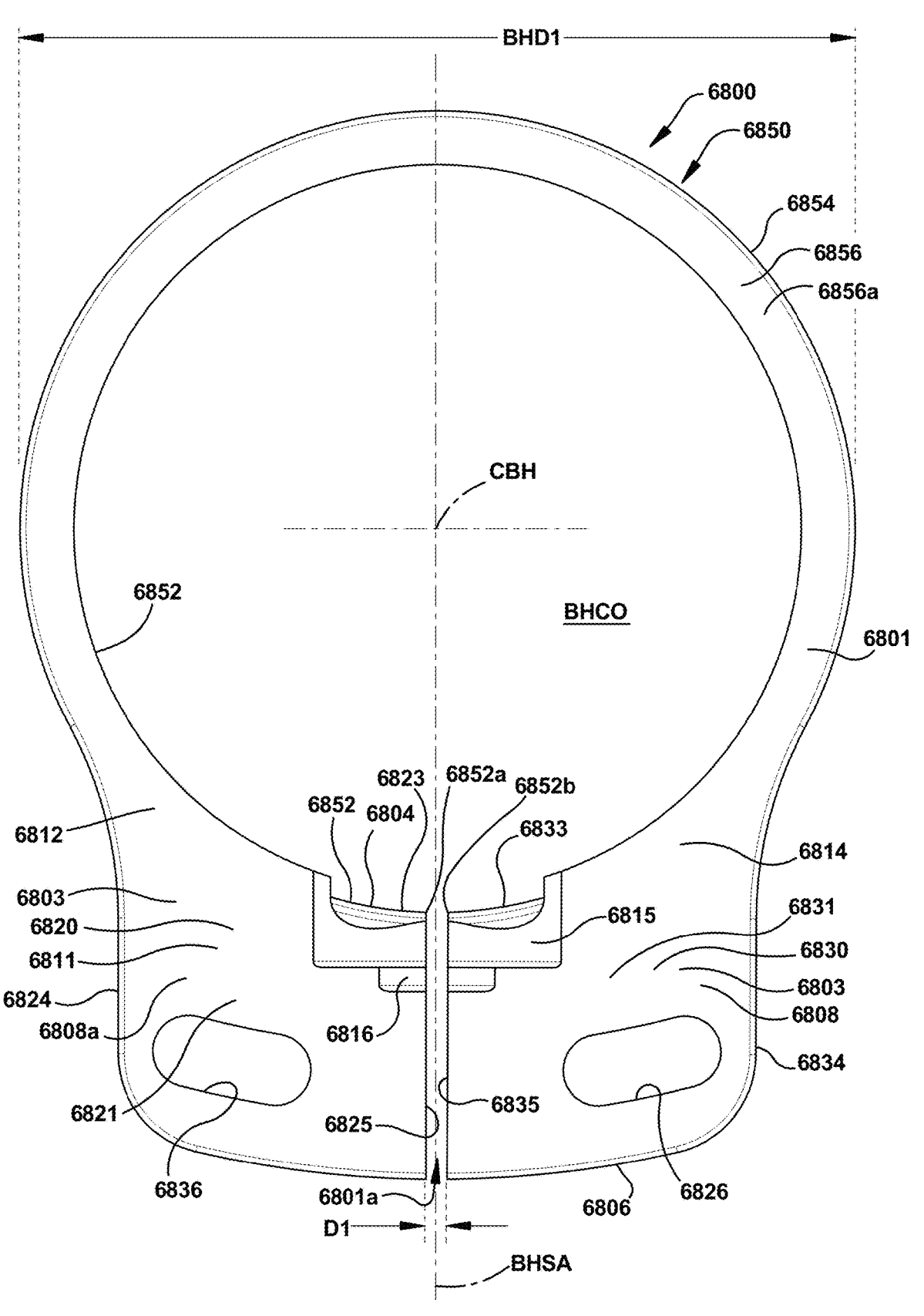
FIG. 11 is a schematic top plan view of the annular split ring blade housing of FIG. 10.
Figure 12:
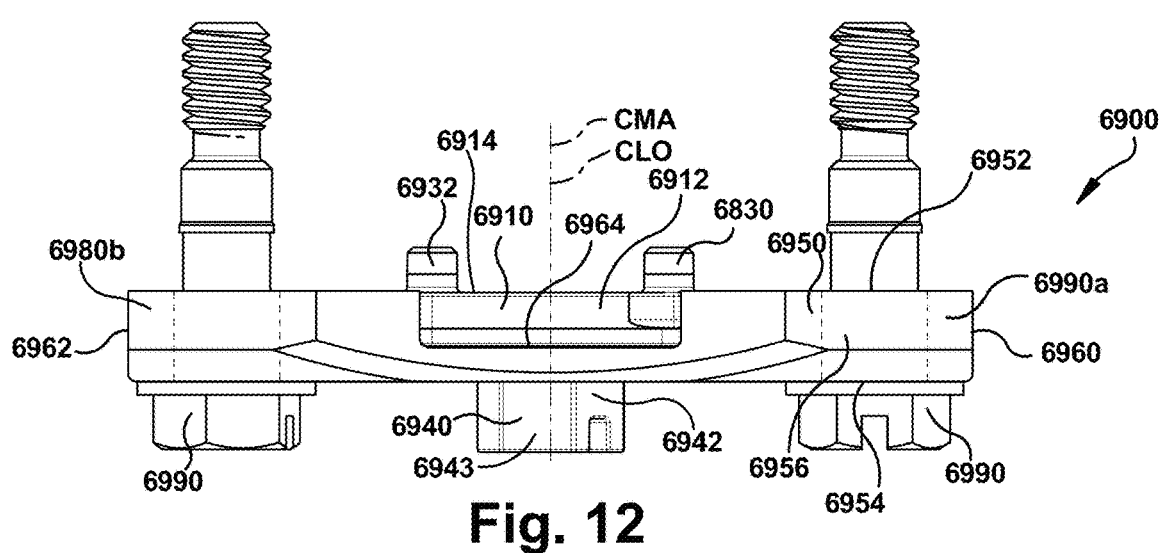
FIG. 12 is a schematic front elevation view of the cam mechanism of the power operated rotary knife of FIG. 1.
Figure 13:
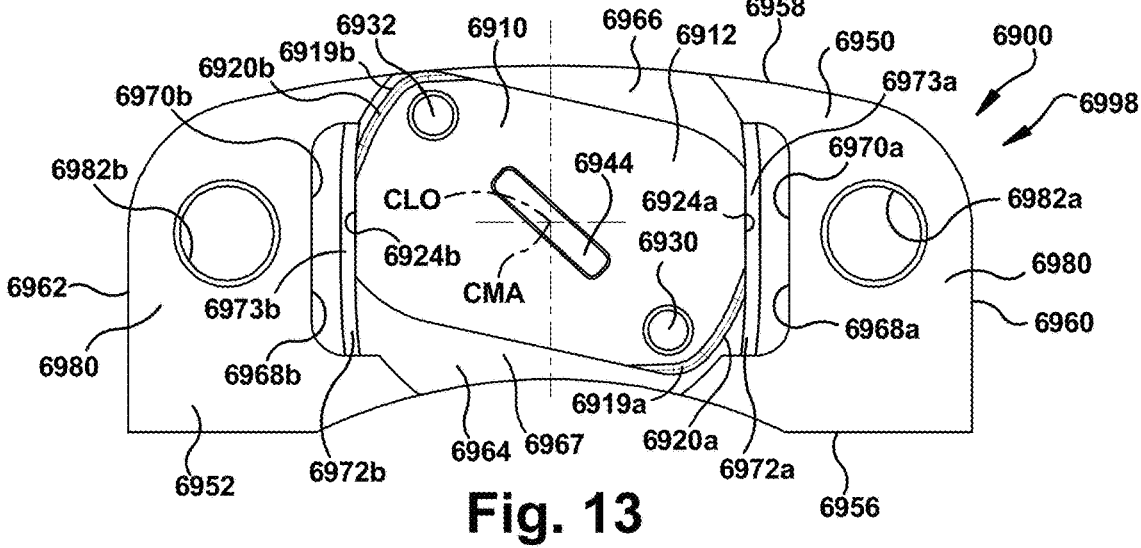
FIG. 13 is a schematic top plan view of the cam mechanism of FIG. 12.
Figure 14:
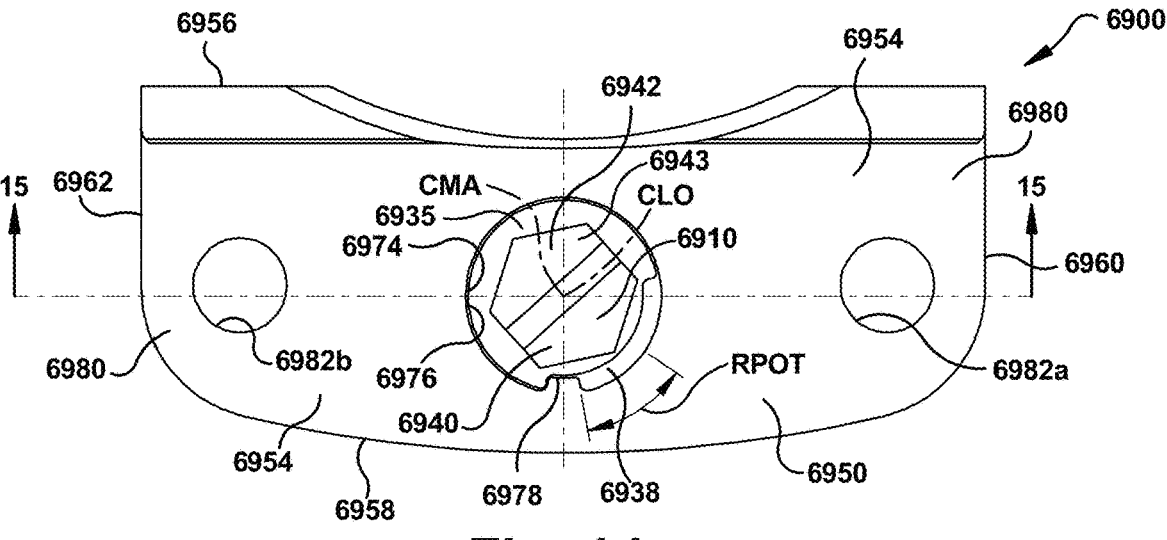
FIG. 14 is a schematic bottom plan view of the cam mechanism of FIG. 12.
Figures 15, 16, 17:
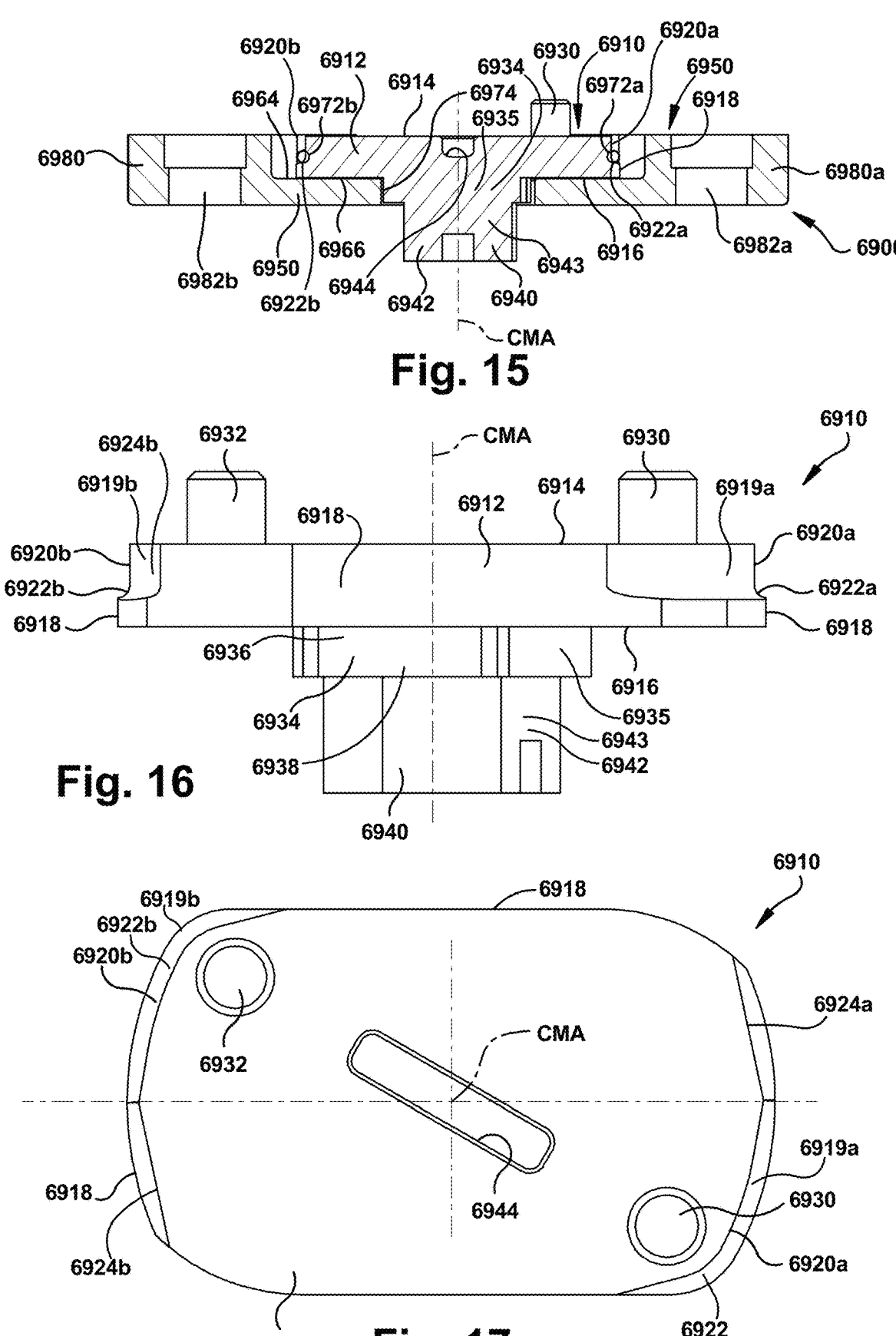
FIG. 15 is a schematic vertical section view of the cam mechanism of FIG. 12 as seen from a plane indicated by the line 15-15 in FIG. 14.
FIG. 16 is a schematic front elevation view of a cam member of the cam mechanism of FIG. 12.
FIG. 17 is a schematic top plan view of the cam member of FIG. 16.
Figure 18:
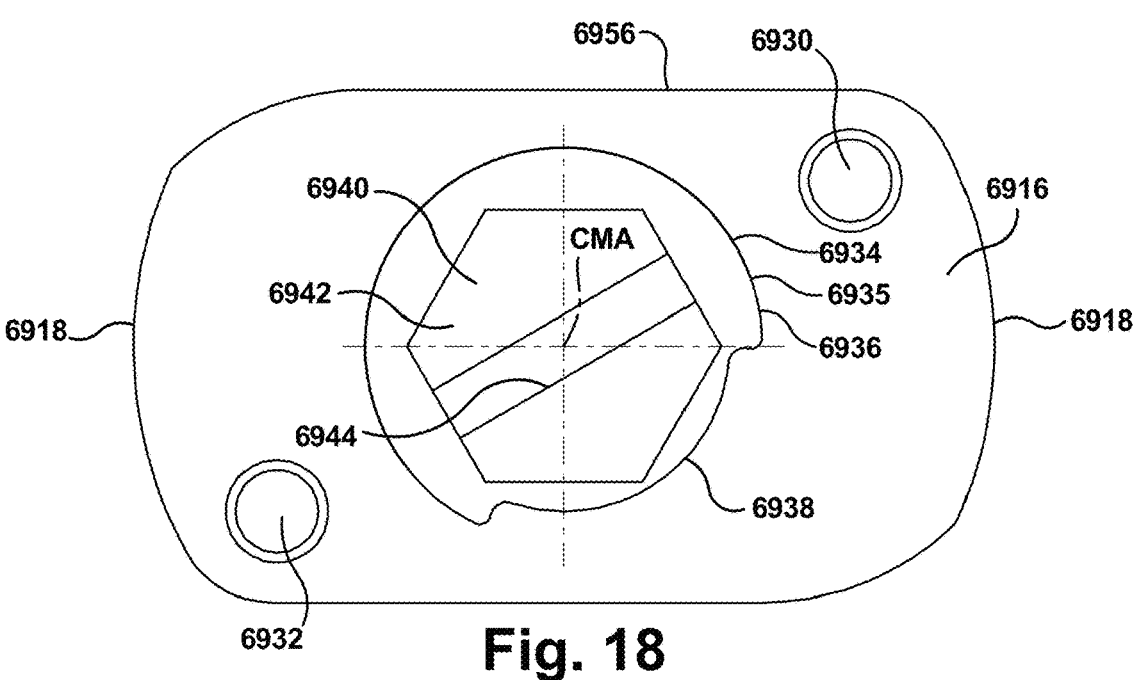
FIG. 18 is a schematic bottom plan view of the cam member of FIG. 16.
Figure 25:
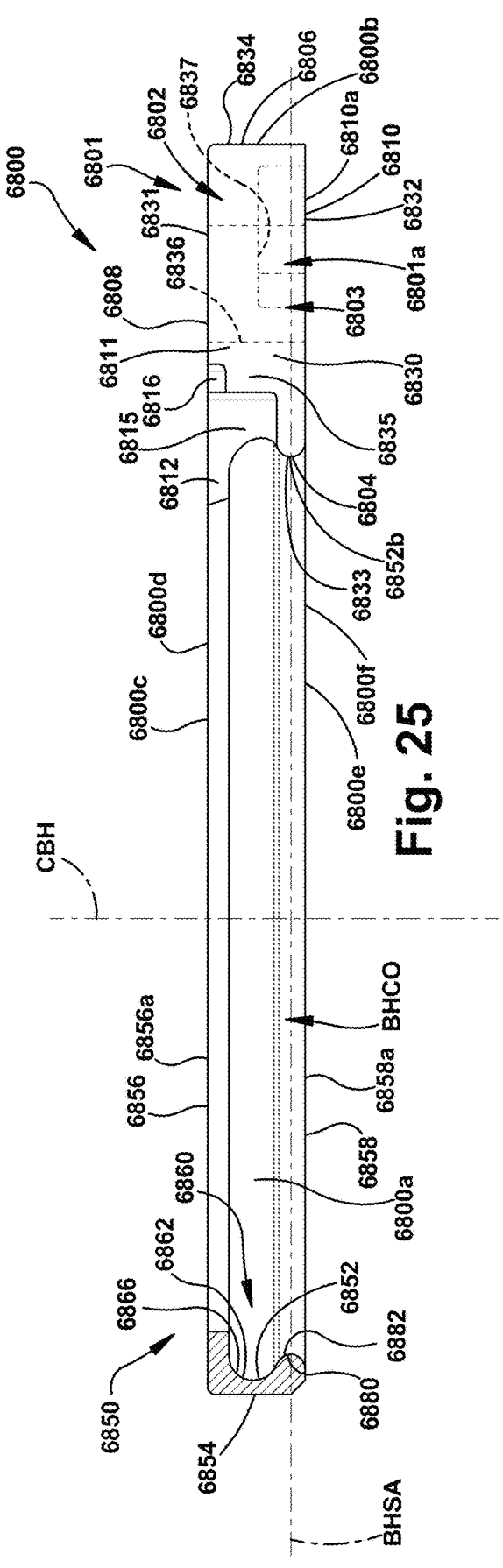
FIG. 25 is a schematic section view the annular split ring blade housing of FIG. 10 as seen from a plane indicated by the line 25-25 in FIG. 10.
Figure 26:
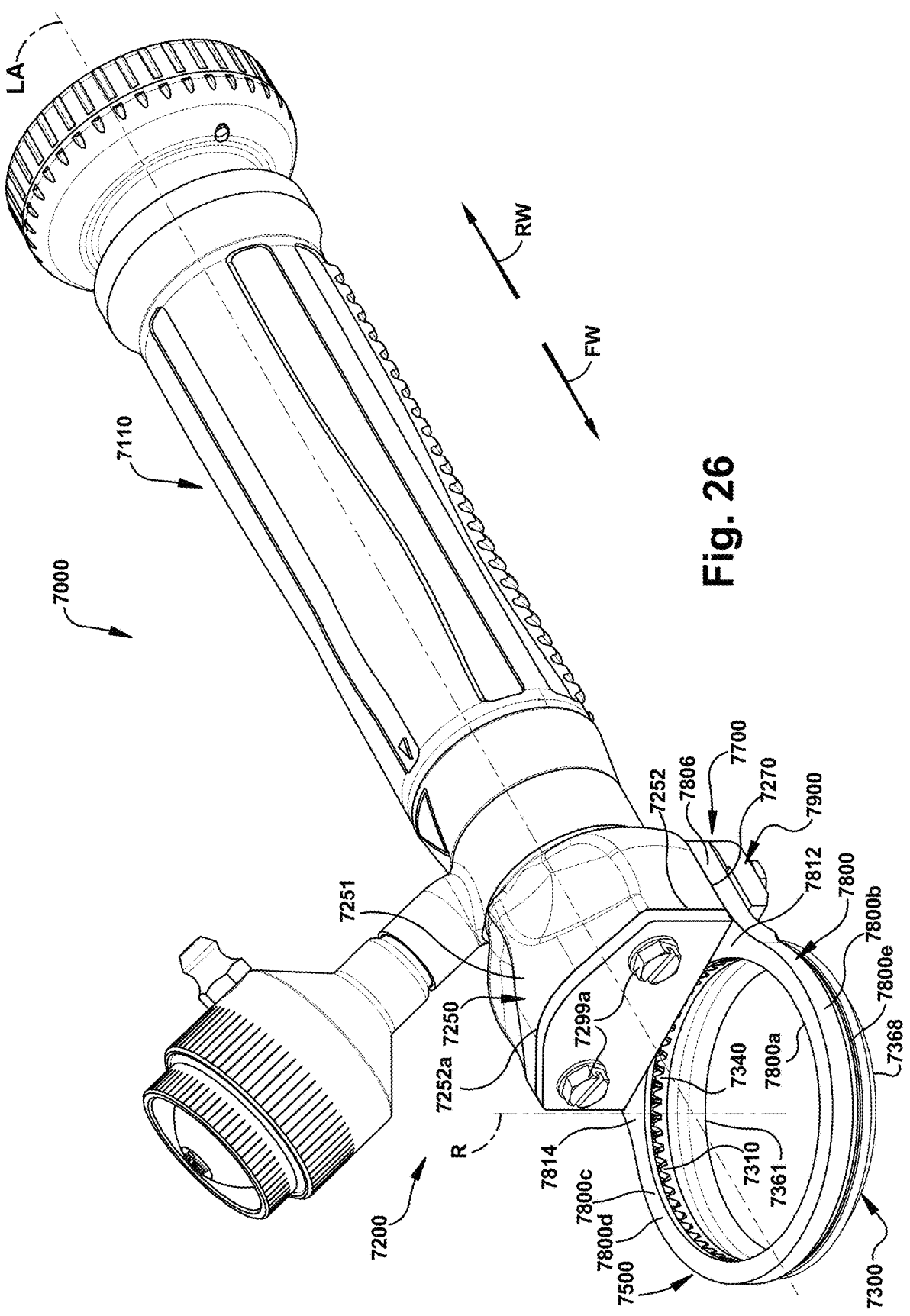
FIG. 26 is a schematic top, front perspective section view of a seventh exemplary embodiment of a power operated rotary knife of the present disclosure, including a head assembly, a handle assembly and a drive mechanism, the head assembly including a frame body, an annular rotary knife blade and a blade housing assembly supporting the annular rotary knife blade for rotation, the blade housing assembly including an annular split ring blade housing and a cam mechanism coupled to the blade housing to selectively move the blade housing between a first, blade supporting position and a second, blade changing position.

As best seen in FIGS. 10, 11 and 25, the blade housing split 6801a extends through both the annular blade support section 6850 and the mounting section 6802 extending from the blade support section 6850. In reality, the blade housing split axis BHSA is a plane (as opposed to a line) that extends between opposing faces 6825, 6835 of the first and second body portions 6820, 6830 of the blade housing mounting section 6802. However, for sake of simplicity, the blade housing split plane will be referred to the blade housing split axis BHSA. The cam mechanism 6900 of the blade housing assembly 6700 includes a cam member 6910 rotatably supported by a cam plate 6950. The cam member 6910 rotates about an axis of rotation CMA that is offset from, but substantially parallel to the central axis of rotation R of the rotary knife blade 6300. The cam member axis of rotation CMA is substantially orthogonal to and intersects the longitudinal axis LA of the handle assembly 6110 and is substantially orthogonal to and intersects the split axis BHSA defined by the blade housing split 6801a. Changing or rotating the cam mechanism 6900 from the first, closed position 6998 (corresponding to the blade supporting position 6898 of the blade housing 6800) to the second, open position 6999 (corresponding to the blade changing position 6899 of the blade housing 6800) increases a width of the split 6801a, that is, the split width or split distance of a gap between opposing faces 6825, 6835 of the first and second body portions 6820, 6840. In the first closed position 6998 of the cam mechanism 6900 (corresponding to the first, blade supporting position 6898 of the blade housing 6800), the gap or split distance between the opposing faces 6825, 6835 is a first blade housing split width or split distance D1 and in the second open position 6999 of the cam mechanism 6900 (corresponding to the second, blade changing position 6899 of the blade housing 6800), the gap or split distance between the opposing faces 6830, 6850 is a second blade housing split width or split distance D2.

The blade housing split distances D1, D2 are measured orthogonally to a radial direction of the split 6801a, that is, orthogonally to the blade housing split axis BHSA and parallel to a cutting plane CP of the rotary knife blade 6300 at an inner wall 6852 of the blade support section 6850 of the blade housing 6800. The blade housing split distances D1, D2 for a particular blade housing, of course, will vary depending on the specific characteristics of the cam mechanism 6900 and the position and length of the corresponding cam slots 6827, 6837 of the blade housing mounting section 6802. Specifically, as can be seen in FIGS. 10-11, 22 and 24, the blade housing split distances D1, D2 are measured between circumferentially spaced apart ends 6852*a*, 6852*b* of the inner wall 6852 of the blade support section 6850 of the blade housing 6800 adjacent the split 6801*a*. In one exemplary embodiment, the blade housing split distance D1 corresponding to the first, blade supporting position 6898 of the blade housing 6800 is approximately 0.06 in., while the blade housing split distance D2 corresponding to the second, blade changing position 6899 of the blade housing 6800 is approximately 0.36 in. In one exemplary embodiment, the blade housing outer diameter BHD1 corresponding to the first, blade supporting position 6898 of the blade housing 6800 is approximately 1.85 in., while the blade housing outer diameter BHD2 corresponding to the second, blade changing position 6899 of the blade housing is approximately 1.95 in. It being understood, of course, that the dimensions of the split blade housing 6800 and the cam mechanism 6900 and the required blade housing split distances D1, D2 and blade housing diameters BHD1, BHD2 will necessarily change based on a number of parameters of the power operated rotary knife including: a) the diameter or size of the rotary knife blade to be supported by the blade housing; b) the dimensions and configuration of the blade-blade housing bearing structure; and c) the specific style, configuration, dimensions, characteristics and parameters of the rotary knife blade and/or the blade housing and/or other components of the power operated rotary knife 6000. The dimensions set forth herein are merely illustratory or representative of one exemplary embodiment of the blade-blade housing combination 6500 and the power operated rotary knife 6000.

As can best be seen in FIG. 7, due to the fact that the assembled blade-blade housing combination 6500 includes the double axial blade-blade housing bearing structure 6550 having two axially spaced apart bearing structures, namely, a first blade-blade housing bearing structure 6560, and a second blade-blade housing bearing structure 6570, the extent of radial overlap between the blade bearing region 6320 and the blade housing bearing region 6860 is defined by an overlap of a portion of an outer wall 6318 of the body of annular rotary knife blade 6300 and a portion of the inner wall 6852 of the blade support section 6850 of the blade housing 6800. Advantageously, the cam mechanism 6900 is designed to provide for sufficient difference or delta between the blade housing split distances D1, D2 and between the blade housing diameters BHD1, BHD2 to allow for removal of the rotary knife blade 6300 from the blade housing 6800 when the cam mechanism 6900 is in the second, open position 6999. The cam mechanism 6900 advantageously provides for: a) a simple, durable and repeatable mechanical assembly allowing an operator or maintenance person to increase in the diameter of the blade support section 6850 to a predetermined, desired blade housing diameter BHD2 corresponding to the blade housing blade changing configuration 6899 that is sufficiently large for blade removal purposes; and, b) equally important, a simple, durable and repeatable mechanical assembly allowing the operator or maintenance person to return in the diameter of the blade support section 6850 back to a predetermined, desired blade housing diameter BHD1 corresponding to the blade housing blade support configuration 6898 having a proper, desired operating or running clearance for the rotary knife blade 6300, without the need for further operator or maintenance person adjustment of the blade housing diameter. That is, after the cam mechanism 6900 is actuated to move or rotate the cam member 6950 of the cam mechanism 6900 to the first, closed position 6999, the power operated rotary knife 6000 is ready for use by the operator without further adjustment to the blade housing 6880 to change the operating or running clearance. The cam mechanism 6900 of the blade housing assembly 6700 is advantageous compared to the conventional technique of blade removal in a power operated rotary knife taught, for example, in U.S. Pat. No. 6,978,548 to Whited et al. The '548 patent discloses a blade housing structure including an expansion slot formed in the outer periphery of the blade housing. Upon loosening one of the two clamping fasteners securing the assembled blade-blade housing combination to a frame body of the head assembly, a screwdriver may be inserted into the blade housing expansion slot and levered against the frame body to expand the blade housing diameter and thereby remove the rotary knife blade from the blade housing. The cam mechanism 6900 of the present disclosure eliminates the need for such an expansion slot and prying with a screwdriver, providing, instead, a more secure and consistent mechanism for blade housing expansion that provides for a reproducible and consistent expansion of the blade housing diameter between the first blade supporting position 6898 and the second blade changing position 6899 wherein the blade housing split distance D2 in the second blade changing position 6899 is sufficient to easily remove the rotary knife blade 6300 from the blade housing 6800.

Additionally, the assembled blade-blade housing combination 6500 includes the blade-blade housing bearing structure 6550 which has all of the advantages of extended useful life with respect to bearing and component wear, as described with respect to the blade-blade housing bearing structure 2550 of the assembled blade-blade housing combination 2500 of the power operated rotary knife 2000 of the third exemplary embodiment of the '207 application. Accordingly and advantageously, when a sharpened, cleaned or new annular rotary knife blade 6300 is installed in the blade housing 6800 and the cam mechanism 6900 is moved to its first closed position 6998, the diameter of the blade support section 6850 of the blade housing 6800 is set to a predetermined, consistent, desired diameter. Thus, because the diameter of the blade support section 6850 is set at a predetermined, desired diameter, a desired operating or running clearance between the blade 6300 and the blade housing 6800 in their respective bearing regions 6320, 6860 is correspondingly set and maintained by the cam mechanism 6900. Because of the advantageous wear characteristics of the respective bearing regions 6320, 6860 of the rotary knife blade 6300 and blade housing 6800 due to the two axially spaced apart bearing structures, namely, the a first blade-blade housing bearing structure 6560 and the second blade-blade housing bearing structure 6570, under proper cutting conditions and with proper maintenance, there may advantageously be no need for the operator of the power operated rotary knife 6000 to make any adjustment to the blade housing diameter to account for changes in the operating clearance of the assembled blade-blade housing combination 6500 during the course of a work shift. That is, due to the improved wear characteristics of the bearing structure 6560 of the assembled blade-blade housing combination 6500 of the power operated rotary knife 6000, the operator may not have to make any adjustments to operating clearance during a work shift to account for increasing looseness of the rotary blade within the blade housing as the contacting bearing surfaces wear over time during cutting or trimming operations. Such operator adjustment to the blade housing diameter to compensate for perceived looseness of the rotating blade within the blade housing (too much operating clearance) or perceived tightness of the rotating blade within the blade housing (too little operating clearance) are undesirable for a number of reasons. First, the time required for adjustment of the operating clearance is necessarily down time from cutting and trimming operations. Second, an inexperienced operator may perceive a need for adjustment and bounce between blade housing diameter positions where the operating clearance is less than optimal with the blade running too loosely within the blade housing causing vibration and excessive component wear, to blade housing diameter position where operating clearance is more than optimal with the blade being too tightly held within the blade housing causing excess heat generation and excessive component wear.

Thus, the cam mechanism 6900 of the present disclosure by advantageously providing for a single predetermined, consistent, desired operating or running clearance when the cam mechanism 6900 is set to the first, closed position 6998 may provide for a full shift operation of the power operated rotary knife 6000 without requiring any need for the operator to change the blade housing diameter from the preset blade housing diameter BHD1 for operating clearance adjustment purposes. Additionally, the cam mechanism 6900 consistently sets the blade housing diameter to the single, reproducible diameter, namely, the blade housing diameter BHD1, when the cam mechanism 6900 is in the first closed position 6999. Therefore, even if the annular rotary knife blade 6300 must be removed during the course of a work shift for replacement, sharpening, or cleaning purposes, upon reassembly and movement of the cam mechanism 6900 to the first, closed position 6998, blade housing diameter is reset the predetermined, desired diameter and, thus, the operating clearance between the rotary knife blade 6300 and the blade housing 6800 is returned to the predetermined, desired operating clearance. Under certain conditions, the cam mechanism 6900, in conjunction with the extended wear capability of the double axial blade-blade housing bearing structure 6550 of the assembled blade-blade housing combination 6500 allows for a "set it and forget it" mode of operation of the power operated rotary knife 6000, allowing for greater operator efficiency and less operator downtime during a work shift by avoidance of operator adjustments to operating clearance.

Because of the sliding blade-blade housing bearing interface 6550 between the rotary knife blade 6300 and the split blade housing 6800 in the assembled combination 6500 of the power operated rotary knife 6000, as would be recognized by one of skill in the art, running or operating clearance between the rotary knife blade 6300 and the blade housing 6800 must be provided to allow the rotary knife blade 6300 to rotate relatively freely within the annular blade support section 6850 of the split blade housing 6800. Actual running clearance will depend on a number of factors including the cutting or trimming application, the amount of time of use and the degree of wear of various components of the power operated rotary knife 6000 include the rotary knife blade 6300 and the blade housing 6800, the extent and type of lubrication provided in the blade-blade housing bearing interface region. However, running clearance typically is on the order of a 0.005-0.010 in. radial clearance or gap between the rotary knife blade 6300 and the blade housing 6800.

Handle Assembly 6110

As best seen in FIGS. 1-6 and 8-9, the handle assembly 6110 is similar in structure and function to the handle assembly 110 of the power operated rotary knife 100 of the first exemplary embodiment, as described in the '207 application. The handle assembly 6110 extends longitudinally from the head assembly 6200 in the rearward direction RW along the handle assembly central longitudinal axis LA. The handle assembly 6110 includes the central throughbore 6115 that extends from and through a proximal end of the handle assembly 6110 to the distal end 6112 of the handle assembly 6110. The throughbore 6115 is centered about the central longitudinal axis LA of the handle assembly 6110. The handle assembly 6110 includes a central core 6152 that defines a portion of the throughbore 6115. The central core 6152 supports an overlying hand piece 6120 that defines a gripping surface for the operator of the power operated rotary knife 6000. A threaded outer surface 6162 of a forward portion of the central core 6152 threads into a mating threaded proximal portion 6286 of an inner surface 6284 of a cylindrical annular boss 6280 of the frame body 6250 to secure the handle assembly 6110 to the frame body 6250 of the head assembly 6250.

Frame Body 6250

As best seen in FIGS. 1-6 and 8-9, the frame body 6250 includes the forward or distal portion 6251, which supports the blade housing assembly 6700, and the rearward or proximal portion 6280, extending in the rearward direction RW toward the handle assembly 6110. The rearward portion 6280 of the frame body 6250 includes the cylindrical annular boss 6282. As noted above, the cylindrical annular boss 6282 includes the inner surface 6284 having the threaded proximal portion 6286 which receives the threaded outer surface 6162 of the forward portion of the handle assembly central core 6152 to secure the head assembly 6200 to the handle assembly 6110. The rearward portion 6280 of the frame body 6250 is similar in function and structure to the rearward portion 280 of the frame body 250 of the power operated rotary knife 100 of the first exemplary embodiment, as described in the '207 application.

The frame body 6250 includes a throughbore 6290 which is generally aligned with the central throughbore 6115 of the handle assembly 6110 and extends along the handle assembly longitudinal axis LA. The rearward portion 6280 includes the cylindrical annular boss 6282 having the threaded proximal portion 6286 of an inner surface 6284 which receives a threaded outer surface 6162 of the central core 6152 of the handle assembly 6112. The forward portion 6251 of the frame body 6250 receives and removably supports both a pinion gear shield 6297 and the blade-blade housing combination 6500, including the cam mechanism 6900 which is part of the blade housing assembly 6700. The pinion gear shield 6297 helps locate a drive gear assembly 6210 of a drive mechanism 6600 (similar to the drive gear assembly 210 of the drive mechanism 600 of the first exemplary embodiment of the '207 application), including a pinion gear 6610 and a sleeve bushing 6630. In this way, the frame body 6250 releasably and operatively couples the drive gear assembly 6210 to the assembled blade-blade housing combination 6500 such that the pinion gear 6610 of the gear train 6604 of the drive gear assembly 6210 operatively engages the driven gear 6340 of the annular rotary knife blade 6300 to rotate the knife blade 6300 with respect to the blade housing 6800 about the axis of rotation R.

The forward portion 6251 of the frame body 6250 includes a central cylindrical region 6254, an upper surface 6260 and a planar lower surface 6270. The planar lower surface 6270, best seen in FIG. 9, defines a planar mounting pedestal 6272 for affixing the assembled blade-blade housing combination 6500 to the frame body 6250. The throughbore 6290 of the frame body 6250 includes a forward cylindrical cavity 6290a defined by the central cylindrical region 6254 of the forward portion 6251 of the frame body 6250 and a rearward cylindrical opening 6290b defined by the cylindrical annular boss 6282 of the rearward portion 6280. The forward wall 6252 of the forward portion 6251 of the frame body 6250 defines an arcuate mounting surface 6252a. A pair of threaded openings 6252b positioned on opposite sides of the forward cylindrical cavity 6290a of the throughbore 6290 extends into the forward wall arcuate mounting surface 6252a. A pair of threaded fasteners 6299a pass through respective openings 6299b in the pinion gear shield 6297 to secure the pinion gear shield 6297 to the forward wall 6252 of the frame body 6250.

The planar lower surface 6270 of the forward portion 6251 of the frame body 6250 is substantially parallel to and offset below the handle assembly longitudinal axis LA. The planar lower surface 6270 includes a pair of threaded openings 6274, which are part of the planar mounting pedestal 6272 defined by the lower surface 6270. The threaded openings 6274 which are orthogonal in direction to the general extent of the planar lower surface 6270, receive a pair of threaded fasteners 6990. The fasteners 6990 include enlarged head portions 6991, unthreaded shaft portions 6992, and threaded end portions 6993. The threaded end portions 6993 of the fasteners 6990 are received in the threaded openings 6274 of the planar lower surface 6270 to secure assembled blade-blade housing combination 6500 to the frame body 6250. As the threaded fasteners 6990 of the cam mechanism 6900 are tightened into the threaded openings 6274 of the planar mounting pedestal 6272 of the frame body 6250, the respective heads 6991 of the threaded fasteners 6990 bear against the cam plate 6950 of the cam mechanism 6900, which, in turn, bears against a planar lower surface 6810a of the mounting section 6802 of the blade housing 6800. Thus, tightening of the threaded fasteners 6990 sandwiches and affixes the mounting section 6802 of the blade housing 6800 to the frame body 6250. That is, as best seen in FIGS. 2 and 4-6, when the threaded fasteners 6990 are tightened into the threaded openings 6274 of the planar mounting pedestal 6272, a planar upper surface 6808a of the blade housing mounting section 6802 is in bearing contact with and secured to the planar mounting pedestal 6272 of the lower surface 6270 of the frame body 6250. The mounting plate 6950 of the cam mechanism 6900, in turn, bears against the planar lower surface 6810a of the mounting section 6802 of the blade housing 6800 and is coupled to the planar mounting pedestal 6272 of the lower surface 6270 of the frame body 6250. This securing of the blade housing assembly 6700 to the frame body 6250 also secures the assembled blade-blade housing combination 6500, including the rotary knife blade 6300, to the frame body 6250 and properly positions the rotary knife blade 6300 to be rotatably driven about the central axis of rotation R by the gear train 6604 of the drive mechanism 6600 of the power operated rotary knife 6000.

Advantageously, because the unthreaded shaft portion 6992 of the pair of threaded fasteners 6990 pass through generally oval shaped first and second mounting slots 6826, 6836 (FIGS. 10, 22, and 24) which are larger in extent than the respective diameters of the shaft portions 6992 of the threaded fasteners 6990, the blade housing 6800, even though secured to the frame body lower surface 6270, is sufficiently free to move circumferentially such that the blade housing diameter is changed between the first blade housing diameter BHD1 when the cam mechanism 6900 is in the first, closed position 6998 (corresponding to the first, blade supporting position 6898 of the blade housing 6800)

and the second blade housing diameter BHD2 when the cam mechanism 6900 is in the second, open position 6999 (corresponding to the second, blade changing position 6898 of the blade housing 6800). Since the pair of threaded fasteners 6990 tread into the threaded openings 6274 of the planar lower surface 6270 of the frame body 6250, the fasteners 6990 (and the cam mechanism mounting plate 6950) are fixed with respect to the frame body 6250 and thus are stationary with respect to the blade housing 6800. Under action of the cam member 6210 of the cam mechanism 6900 moving from the first, closed position 6998 (FIGS. 21 and 22) to the second, open position 6999 (FIGS. 23 and 24), the blade housing 6800 is moved circumferentially from the first blade housing diameter BHD1 when the cam mechanism 6900 is in the first, closed position 6998 to the second blade housing diameter BHD2 when the cam mechanism 6900 is in the second, open position 6999. The fact that the oval shaped first and second mounting slots 6826, 6836 are larger in extent than the respective diameters of the shaft portions 6992 of the threaded fasteners 6990 allows this circumferential movement of the blade housing 6800 between the first blade housing diameter BHD1 and the second blade housing diameter BHD2 while the blade housing 6800 remains secured to the frame body 6250. Specifically, in the first, closed position 6998 of the cam mechanism 6900, the blade housing mounting slots 6826, 6836 are positioned with respect to the pair of fasteners 6990 such that the unthreaded shaft portions 6992 of the pair of fasteners 6990 are adjacent respective first ends 6826a, 6836a of the blade housing mounting slots 6826, 6836, corresponding to the blade housing 6800 being in the unexpanded blade housing diameter BHD1. By contrast, in the first, open position 6998 of the cam mechanism 6900, the blade housing mounting slots 6826, 6836 are positioned with respect to the pair of fasteners 6990 such that the unthreaded shaft portions 6992 of the pair of fasteners 6990 are adjacent respective second ends 6826b, 6836b of the blade housing mounting slots 6826, 6836, corresponding to the blade housing 6800 being in the expanded blade housing diameter BHD2.

As can best be seen in FIGS. 6 and 8-9, the frame body throughbore 6290 receives and supports the drive gear assembly 6210 of the head assembly 6200, which is part of the drive mechanism 6600 of the power operated rotary knife 6000. Specifically, the drive gear assembly 6210 includes the sleeve bushing 6630 which is received in the forward cylindrical cavity 6290a of the central cylindrical region 6254 of the forward portion 6251 of the frame body 6250. In turn, the pinion gear 6610 of the drive gear assembly 6210 is rotatably supported by the sleeve bushing 6630 such that the pinion gear 6610, when driven by the drive fitting of the flexible shaft drive assembly (not shown, but similar to the flexible shaft drive assembly 700 of the first exemplary embodiment of the '207 application) rotates about the pinion gear axis of rotation PGR, which is substantially coincident with the handle assembly longitudinal axis LA. A gear head 6614 of the pinion gear 6610 is operatively connected to the rotary knife blade driven gear 6340 such that a plurality of gear teeth 6615 of the gear head 6614 of the pinion gear 6610 mesh with and rotationally drive a mating plurality of gear teeth 6341 of the driven gear 6340 of the rotary knife blade 6300 to rotate the rotary knife blade 6300 about its central axis of rotation R.

Annular Rotary Knife Blade 6300

As can best be seen in FIGS. 6-9, the annular rotary knife blade 6300 is generally similar in structure and function to the annular rotary knife blade 2300 of the power operated rotary knife 2000 of the third exemplary embodiment of the '207 application including the blade bearing region 6320 of the annular blade body 6310 which is similar in structure and function to the blade bearing region 2320 of the annular blade body 2310 of the rotary knife blade 2300 of the third exemplary embodiment of the '207 application.

The blade style of the rotary knife blade 6300 is referred to as a straight blade style. Generally, differences in blade style (e.g., straight blade style, flat blade style, hook blade style and variations and combinations thereof) relate to the structure of the respective lower blade sections. While the exemplary rotary knife blade 6300 of the sixth exemplary embodiment is a straight blade style rotary knife blade, numerous other blade styles, including, but not limited to, hook and flat style blades and combinations of blade styles may be utilized, with an appropriate blade housing assembly 6700, in the power operated rotary knife 6000 of the present disclosure, as would be understood by one of skill in the art. It is the intent of the present disclosure to cover all such rotary knife blade styles and sizes and the corresponding blade housings, that may be used in the power operated rotary knife 6000.

The annular rotary knife blade 6300 of the power operated rotary knife 6000 includes the annular upper body or body section 6310 and the lower blade section 6360 extending from the body 6310. The rotary knife blade 6300 is supported for rotation about the central axis of rotation R by the blade housing 6800 and a cutting edge 6361 of the blade section 6360 defines the cutting plane CP (FIGS. 6 and 7) of the rotary knife blade 6300. The cutting plane CP is substantially orthogonal to the central axis of rotation R.

The annular rotary knife blade 6300 includes an upper end or first end 6302 and an axially spaced apart lower end or second end 6304, defining the cutting edge 6361 of the blade 6300, and an inner wall 6306 and a radially spaced apart outer wall 6308. The blade section 6360 of the rotary knife blade 6300 includes an upper end 6362, defined by a discontinuity or knee 6362*a* in an outer wall 6368 of the blade section 6360, and a lower end 6364, which is coincident with the blade cutting edge 6361, the cutting plane CP and the lower end 6304 of the rotary knife blade 6300. The blade section 6360 also includes the inner wall 6366 and the radially spaced apart outer wall 6368.

Turning to the annular body 6310 of the annular rotary knife blade 6300, the body 6310 includes the driven gear 6340, similar to the driven gear 2340 of the rotary knife blade 2300 of the third exemplary embodiment of the '207 application, defining a driven gear region 6340*a* of the annular and the bearing region 6320, similar to the bearing region 2320 of the rotary knife blade 2300 of the third exemplary embodiment. As best seen in FIG. 7, the body 6310 includes an upper end 6312 and an axially spaced apart lower end 6314 and an inner wall 6316 and a radially spaced apart outer wall 6318. The bearing region 6320 of the annular rotary knife blade 6300 includes a first bearing surface 6322 and an axially spaced second bearing surface 6382. The first and second bearing surfaces 6322, 6382 are both part of the outer wall 6318 of the annular rotary knife blade body 6310. The first bearing surface 6322 is defined by an upper bearing bead 6311 of the body 6310 and at least a portion of the first bearing surface 6322 is defined by an outer surface 6340*b* of the driven gear 6340. The second bearing surface 6382 is defined by a radially inwardly extending bearing race 6380.

Like the rotary knife blade 2300 and the annular blade housing 2400 of the assembled combination 2500 of the power operated rotary knife 2000 of the third exemplary embodiment of the '207 application, the assembled combination 6500 of the rotary knife blade 6300 and the annular blade housing 6800 comprises the blade-blade housing bearing structure 6550 that includes the first blade-blade housing bearing structure 6560 and the second blade-blade housing bearing structure 6570. In the power operated rotary knife 2000 of the third exemplary embodiment, the first blade-blade housing bearing structure 2560 included the first arcuate bearing surface 2322 of the bearing region 2320 of the rotary knife blade 2300 engaging and bearing against the first arcuate bearing surface 2462 of the bearing region 2460 of the blade support section 2450 of the annular blade housing 2400. The first blade-blade housing bearing structure 6560 of the power operated rotary knife 6000 has substantially the same structure, namely, the first blade-blade housing bearing structure 6560 includes the first arcuate bearing surface 6322 of the bearing region 6320 of the rotary knife blade 6300 which engages and bears against a first arcuate bearing surface 6862, defined by a bearing race 6866, of a bearing region 6860 of a blade support section 6850 of the annular blade housing 6800. In the power operated rotary knife 2000 of the third exemplary embodiment, the second blade-blade housing bearing structure 2570 included the second bearing surface 2382 of the bearing region 2320, defined by the bearing race 2380, of the rotary knife blade 2300 engaging and bearing against the second bearing surface 2482, defined by the bearing bead 2480, of the blade support section 2450 of the annular blade housing 2400. Similarly, the second blade-blade housing bearing structure 6570 of the power operated rotary knife 6000 has substantially the same structure, namely, a second bearing surface 6382 of the bearing region 6320, defined by the bearing race 6380, of the rotary knife blade 6300 engages and bears against a second bearing surface 6882 of a bearing region 6880, defined by a bearing bead 6880, of the blade support section 6850 of the annular blade housing 6800.

Blade Housing Assembly 6700

The blade housing assembly 6700 includes the annular split ring blade housing 6800 (FIGS. 10, 11 and 25) and the cam mechanism 6900 (FIGS. 12-15). As explained above, and as schematically depicted in FIGS. 11-14, rotation of the cam member 6910 of the cam mechanism 6900 about its axis of rotation CMA from the first, closed position 6998 to the second, open position 6999 of the cam mechanism 6900 increases the width of the split 6801*a* from the first blade housing gap or split distance D1 to the second blade housing split distance D2 between opposing faces 6825, 6835 of the first and second body portions 6820, 6840 of the blade housing mounting section 6802 and thereby moves the blade housing 6800 from the first, blade supporting position 6898 of the blade housing 6800 to the second, blade changing position 6899 of the blade housing 6800. Conversely, rotation of the cam member 6910 of the cam mechanism 6900 about its axis of rotation CMA from the second, open position 6999 to the first, closed position 6999 decreases the width of the split 6801*a* from the second blade housing gap or split distance D2 to the first blade housing split distance D1 between opposing faces 6825, 6835 of the first and second body portions 6820, 6840 of the blade housing mounting section 6802 and thereby moves the blade housing 6800 from the second, blade changing position 6899 of the blade housing 6800 to the first, blade supporting position 6898 of the blade housing 6800. As noted previously and as can be seen in FIGS. 10-11, 22 and 24, for purposes of uniformity, the blade housing split distances D1, D2 are measured between circumferentially spaced apart ends

6852*a*, 6852*b* of the inner wall 6852 of the blade support section 6850 of the blade housing 6800 adjacent the split 6801*a*.

Split Ring Blade Housing 6800

As best seen in FIGS. 7, 10, 11 and 25, the blade housing 6800 comprises the annular split ring 6801 including the split 6801*a* that extends radially through the annular blade support section 6850 and the mounting section 6802, that is, extending radially through a blade housing outer wall 6800*b* and a blade housing inner wall 6800*a*. The annular blade support section 6850 supports the annular rotary knife blade 6300 for rotation about the blade central axis of rotation R. The mounting section 6802 overlaps and extends radially outwardly from the blade support section 6850 and includes a generally planar mounting platform 6803 which is secured to the frame body 6250 by being sandwiched between an upper surface 6952 of the cam plate 6950 of the cam mechanism 6900 and the planar mounting pedestal 6272 defined by the lower surface 6370 of the forward portion 6251 of the frame body 6250. Specifically, the planar mounting platform 6803 is secured to the frame body 6250 by a pair of threaded fasteners 6990 of the cam mechanism 6900. The pair of threaded fasteners 6990 extending through aligned openings 6982*a*, 6982*b* of the cam plate 6950 and aligned slots 6826, 6836 of the blade housing mounting section 6802 and thread into a pair of threaded openings 6274 formed in the lower surface 6370 of the forward portion 6251 of the frame body 6250. As the pair of threaded fasteners 6990 are tightened, the planar mounting platform 6803 is sandwiched between the cam plate 6950 of the cam mechanism 6900 and the planar mounting pedestal 6272 of the frame body 6250 and thereby secured to the frame body 6250.

The annular split blade housing 6800 includes the inner wall 6800*a* and the radially spaced apart outer wall 6800*b* and an upper end 6800*c* and an axially spaced apart lower end 6800*c*. The upper end 6800*c* of the blade housing 6800, which includes respective upper surfaces 6808*a*, 6856*a* of both the radially extending mounting section 6802 and the annular blade support section 6850, defines a generally planar upper surface 6808*a* of the blade housing 6800. The lower end 6800*c* of the blade housing 6800, which includes respective lower surfaces 6810*a*, 6858*a* of both the mounting section 6802 and the blade support section 6850, defines a generally planar lower surface 6800*f* of the blade housing 6800. The annular blade support section 6850 of the blade housing 6800 is similar to the annular blade support section 2450 of the blade housing 2400 of the third exemplary embodiment and reference is made to the description of the blade support section 2450 in the '207 application for additional details of the structure and function of the blade support section 6850. The blade support section 6850 includes an inner wall 6852, which comprises and corresponds to the inner wall 6800*a* of the blade housing 6800, and a radially spaced apart outer wall 6854, which defines a portion of the outer wall 6800*b* of the blade housing 6800, and the upper end 6856, which defines a portion of the upper end 6800*c* of the blade housing 6800, and the axially spaced apart lower end, which defines a portion of the lower end 6800*c* of the blade housing 6800.

As can best be seen in FIG. 7, the inner wall 6852 of the blade support section 6850 defines the bearing region 6860 of the blade housing 6800, which is similar in structure and function to the bearing region 2460 of the blade support section 2450 of the blade housing 2400 of the third exemplary embodiment. The bearing region 6860 of the blade support section 6850 includes a bearing race 6866 comprising the arcuate first bearing surface 6862 and a bearing bead 6880 comprising a second bearing surface 6882 of the bearing region 6860. The bearing region 6860 of the blade housing 6800 engages a bearing region 6320 of the body 6310 of the rotary knife blade 6300 to support the blade 6300 for rotation about the central axis of rotation R. The inner wall 6852 of the blade support section 6850 defines a blade housing central opening BHCO (FIGS. 9 and 10) and is centered about and defines the blade housing center line CBH. The blade housing center line CBH, in the first, blade supporting position 6898 of the blade housing 6800, is substantially coincident with the blade central axis of rotation R. A circumference defined by the outer wall 6854 of the blade support section 6850 plus the split width or split distance D1 defines the blade housing diameter BHD1 in the first, blade supporting position 6898 of the blade housing 6800, while a circumference defined by the outer wall 6854 plus the split width or split distance D2 defines the blade housing diameter BHD2 in the second, blade changing position 6899 of the blade housing 6800. In the second, blade changing position 6899 of the blade housing 6800, the inner wall 6852 of the blade support section 6850 takes on a very slight oval or egg-shaped configuration because of the larger split width D2.

As can best be seen in FIGS. 10 and 11, the mounting section 6802 of the blade housing 6800 includes an inner wall 6804, which overlaps and is coincident with the inner wall 6852 of the blade support section 6850 and comprises and corresponds to a portion of the inner wall 6800*a* of the blade housing 6800, and a radially spaced apart outer wall 6806, which defines a portion of the outer wall 6800*b* of the blade housing 6800, and an upper end 6808, which defines a portion of the upper end 6800*c* of the blade housing 6800, and an axially spaced apart lower end 6810, which defines a portion of the lower end 6800*c* of the blade housing 6800. The upper end 6808 of the mounting section 6802 defines the generally planar upper surface 6808*a*. The upper end 6856 (defining the upper planar surface 6856*a*) of the blade support section 6850 and the upper end 6808 (defining the upper planar surface 6808*a*) of the mounting section 6802 are advantageously coplanar with and together form the planar upper surface 6800*d* of the blade housing 6800. A first arcuate recess 6815 is formed in the planar upper surface 6808*a* of the upper end 6808 adjacent the inner wall 6800*a* of the blade housing 6800. The first arcuate recess 6815 provides clearance for the gear head 6624 of the pinion gear 6610 such that the pinion gear head 6624 is positioned to engage the mating driven gear 6340 of the rotary knife blade 6300. A second, shallower arcuate recess 6816 formed in the planar upper surface 6808*a* of the upper end 6808 adjacent the inner wall 6800*a* of the blade housing 6800 is positioned radially outwardly from and aligned with the first arcuate recess 6815 and provides clearance for the sleeve bushing 6630 that supports the pinion gear 6610 for rotation about its pinion gear axis of rotation PGR. The first arcuate recess 6815 circumferentially interrupts the arcuate first bearing surface 6862 of the bearing region 6860 of the blade housing blade support section 6850. The first and second arcuate recesses 6815, 6816, in turn, are bisected by the radially extending blade housing split 6801*a* which extends through the inner wall 6800*a* of the blade housing 6800.

The lower end 6810 of the mounting section 6802 defines the generally planar lower surface 6810*a* and the lower end 6858 (defining the lower planar surface 6858*a*) are advantageously coplanar with and together form the planar lower surface 6800*f* of the blade housing 6800. That is, as can best be seen in FIG. 55, the upper and lower surfaces 6800*d*, 6800*f* define parallel planes providing the blade housing with a smooth profile having substantially parallel upper and lower planar surfaces and uniform thickness in both the blade support section 6850 and the mounting section 6802 of the blade housing 6800. That is, the planar mounting platform 6803 of the mounting section 6202 is substantially the same thickness as the thickness of the blade support section 6850 as measured axially, that is, in a direction, substantially orthogonal to the blade housing split axis BHSA and substantially parallel to the blade housing center line CBH.

Extending between circumferentially spaced apart first and second ends 6812, 6814 of the mounting section 6802 is the central region 6811 of the mounting section 6802. The split 6801*a* of the blade housing 6800 divides or bisects the central region 6811 defining the first body portion 6820 and the second body portion 6830 separated along the blade housing split axis BHSA by the split distance, which, as measured at the inner wall 6852 of the blade support section 6850, in the first, blade supporting position 6898 of the blade housing 6800 is split distance D1 and, in the second, blade changing position 6899 of the blade housing 6800 is split distance D2. The first body portion 6820 of the blade housing central region 6811 includes a generally planar upper surface 6821, an axially spaced apart, generally planar lower surface 6822. The first body portion 6820 also includes an inner surface 6823 forming part of: a) the inner wall 6800*a* of the blade housing 6800; b) the inner wall 6804 of the mounting section 6802; and c) the coincident inner wall 6852 of the blade support section 6850, and an outer surface 6824 forming part of: a) the outer wall 6800*b* of the blade housing 6800; and b) the outer wall 6806 of the mounting section 6802. The second body portion 6830 of the blade housing central region 6811 includes a generally planar upper surface 6831, an axially spaced apart, generally planar lower surface 6832. The second body portion 6830 also includes an inner surface 6833 forming part of: a) the inner wall 6800*a* of the blade housing 6800; b) the inner wall 6804 of the mounting section 6802; and c) the coincident inner wall 6852 of the blade support section 6850, and an outer surface 6834 forming part of: a) the outer wall 6800*b* of the blade housing 6800; and b) the outer wall 6806 of the mounting section 6802.

Opposing facing surfaces 6825, 6835 of the first and second body portions 6820, 6830 define the blade housing split 6801*a*. The first body portion 6820 includes the generally oval shaped first mounting slot 6826 extending between and through the upper and lower surfaces 6821, 6822, while the second body portion 6830 includes the generally oval second mounting slot 6836 extending between and through the upper and lower surfaces 6831, 6832. The unthreaded shaft portions 6992 of the pair of threaded fasteners 6990 of the cam mechanism 6900 pass through the respective mounting slots 6826, 6836 of first and second body portions 6820, 6830 of the central region 6811 of the mounting section 6802 of the blade housing 6800. The unthreaded shaft portions 6992 of pair of threaded fasteners 6990 are captured in respective cam plate openings 6982*a*, 6892*b* of the cam plate 6950 and the enlarged heads 6991 of the pair of fasteners 6990 bear against the cam plate 6950. The unthreaded shaft portions 6992 of the pair of threaded fasteners 6990 pass through the respective mounting slots 6826, 6836 of first and second body portions 6820, 6830 and the threaded end portions 6993 of the pair of fasteners 6990 then thread into respective threaded openings 6274 of the planar mount pedestal 6272 of the lower surface 6270 of the fame body 6250 to secure the blade housing 6800 to the frame body 6250. An upper surface 6952 of the cam plate

6950 bears against the planar lower surface 6810*a* of the blade housing mounting section 6802, specifically, the planar lower surfaces 6822, 6832 of the first and second body portions 6820, 6830 of the blade housing mounting section 6802, to urge the planar upper surface 6808*a* of the mounting section 6802 against the planar mounting pedestal 6272 of the lower surface 6270 of the fame body 6250 and secure the blade housing 6800 to the frame body 6250.

The lower surface 6822 of the first body portion 6820 includes a first cam slot 6827 which receives and constrains a first cam pin 6930 of the cam member 6910 of the cam mechanism 6900. The first cam slot 6827 includes a first end portion 6827*a* and a second end portion 6827*b* that is closer to the split 6801*a*. The first cam slot 6827 includes a linear portion 6828 defining a linear path of travel 6828*a* for the first cam pin 6930 and an offset catch portion 6829. The first cam slot 6827 is transverse to the blade housing split axis BHSA and, if extended along the linear path of travel 6828*a*, would intersect the blade housing split 6801*a*. The lower surface 6832 of the second body portion 6830 includes a second cam slot 6837 which receives and constrains a second cam pin 6932 of the cam member 6910 of the cam mechanism 6900. The second cam slot 6837 includes a first end portion 6837*a* and a second end portion 6837*b* that is closer to the split 6801*a*. The second cam slot 6837 includes a linear portion 6838 defining a linear path of travel 6838*a* for the first cam pin 6930 and an offset catch portion 6829. The second cam slot 6827 is transverse to the blade housing split axis BHSA and, if extended along the linear path of travel 6838*a*, would intersect the blade housing split 6801*a*.

In the first, closed position 6998 of the cam mechanism 6900, the first cam pin 6930 is positioned or located nearer the first end portion 6827*a* of the first cam slot 6827 and the second cam pin 6932 is positioned or located nearer the first end portion 6837*a* of the second cam slot 6837. In one exemplary embodiment, the first cam pin 6930 is positioned at the first end portion 6827*a* of the first cam slot 6827 and the second cam pin 6932 is positioned at the first end portion 6837*a* of the second cam slot 6837. Also, in the first, closed position 6998 of the cam mechanism 6900, the unthreaded shaft portions 6992 of the pair of fasteners 6990 are positioned in proximity to or adjacent respective first ends 6826*a*, 6836*a* of the blade housing mounting slots 6826, 6836. As the cam member 6910 is rotated to the second, open position 6999, the first and second cam pins 6930, 6932 move or translate within their respective first and second cam slots 6827, 6837 along the respective linear paths of travel 6928*a*, 6938*a* to positions or locations nearer the respective second end portions 6827*b*, 6837*b* of the cam slots 6827, 6837, coming to rest in the respective offset catch portions 6829, 6839. This movement or translation of the first and second cam pins 6930, 6932 within their respective first and second cam slots 6827, 6837 from the respective first end portions 6827*a*, 6837*a* to the respective second end portions 6827*b*, 6837*b* forces, by camming action, an expansion of the blade housing diameter from the unexpanded blade housing diameter BHD1, corresponding to the first, blade supporting position 6898 of the blade housing 6800, to the expanded blade housing diameter BHD2, corresponding to the second, blade changing position 6899 of the blade housing 6800, allowing for easy removal of the annular rotary knife blade 6300 from the blade housing blade support section 6850. Further, as the first and second body portions 6820, 6830 of the blade housing mounting section 6802 move apart or spread circumferentially along the blade housing split 6801*a* such that the blade housing diameter moves from the unexpanded blade housing diameter BHD1 to the expanded blade housing diameter BHD2, the unthreaded shaft portions 6992 of the pair of fasteners 6990 are now in proximity to or adjacent respective second ends 6826*b*, 6836*b* of the blade housing mounting slots 6826, 6836.

Conversely, as the cam member 6910 is rotated from the second, open position 6999 to the first, closed position 6998, the first and second cam pins 6930, 6932 move or translate within their respective first and second cam slots 6827, 6837 along the respective linear paths of travel 6928*a*, 6938*a* to positions nearer the respective first end portions 6827*a*, 6837*a*. This movement or translation of the first and second cam pins 6930, 6932 within their respective first and second cam slots 6827, 6837 from the respective second end portions 6827*b*, 6837*b* to the respective first end portions 6827*a*, 6837*a* allows the blade housing 6800, which is resiliently deformable and has the unexpanded blade housing diameter BHD1 as its natural, undeformed condition, by camming action, to return from the expanded blade housing diameter BHD2 to the unexpanded blade housing diameter BHD1. Further, as the blade housing mounting section 6802 moves circumferentially to return to its unexpanded blade housing diameter BHD1, the unthreaded shaft portions 6992 of the pair of fasteners 6990 are once again in proximity to or adjacent respective first ends 6826*a*, 6836*a* of the blade housing mounting slots 6826, 6836.

In one exemplary embodiment, the thickness or depth of the blade housing 6800 is substantially uniform (ignoring the pinion gear and sleeve bushing recesses 6815, 6816 and the first and second cam slots 6827, 6837) along the entirety of the blade housing 6800 and is approximately 0.21 in. In one exemplary embodiment, a length of each of the facing surfaces of the first and second body portions 6820, 6830, as measured along the blade housing split axis BHSA, is approximately 0.63 in. A total width of the central region of the mounting section 6802, in the blade supporting position 6898 of the blade housing 6800, in one exemplary embodiment, is approximately 1.59 in. In one exemplary embodiment, the first and second oval mounting slots 6826, 6836 define an opening, as measured along the principal axis of the slots, of approximately 0.40 in. As can best be seen in FIG. 10, with respect to the linear portions 6828, 6838 of the first and second cam slots 6827, 6837, the linear portion 6828 of the first cam slot 6827, as measured along the linear path of travel 6828*a*, is approximately 0.36 in., while the linear portion 6838 the second cam slot 6837, as measured along the linear path of travel 6838*a*, is approximately 0.32 in. As noted previously, it is understood, that these dimensions will necessarily change based on the size and configuration, characteristics and parameters of the rotary knife blade to be supported by the blade housing, the blade-blade housing bearing structure, and other parameters and characteristics of the power operated rotary knife 6000 and components thereof.

Cam Mechanism 6900

As best seen in FIGS. 12-15, the cam mechanism 6900 includes the cam member 6910 supported for rotation about the cam member axis of rotation CMA by the cam plate 6950. The cam member 6910 rotates between the first, closed or locked position 6999 causing the blade housing 6800 to be in the first, blade supporting position 6898 and the second, open or unlocked position 6999 causing the blade housing 6800 to be in the second, blade changing position 6899 having an increased diameter of the blade support section 6850 for the purpose of allowing the rotary knife blade 6300 to be released from the blade housing 6800.

Figure 19:
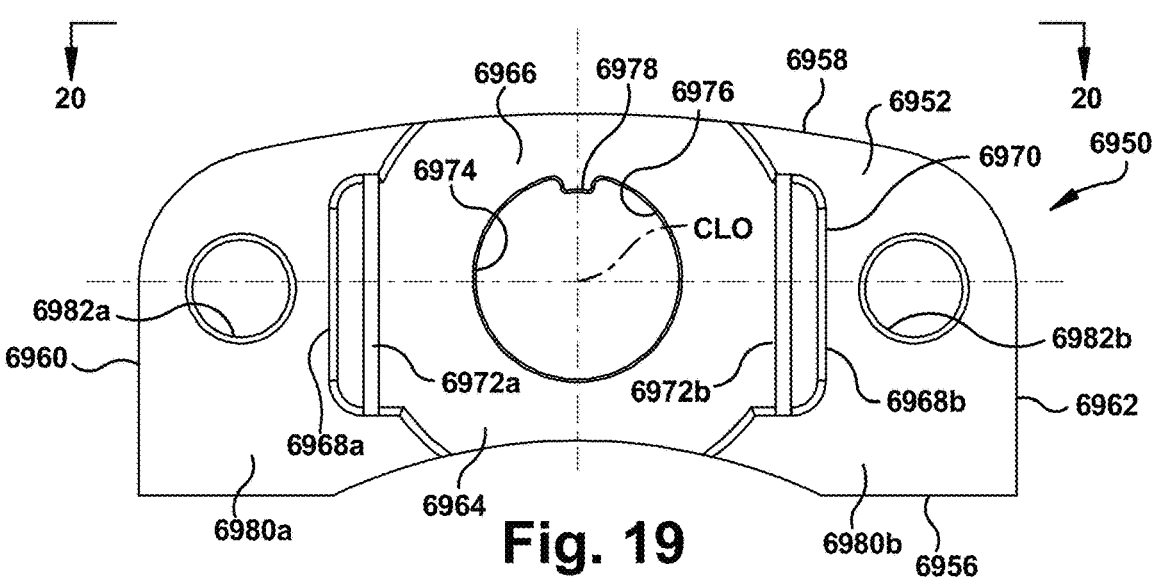
FIG. 19 is a schematic top plan view of a cam plate of the cam mechanism of FIG. 12.
Figure 20:
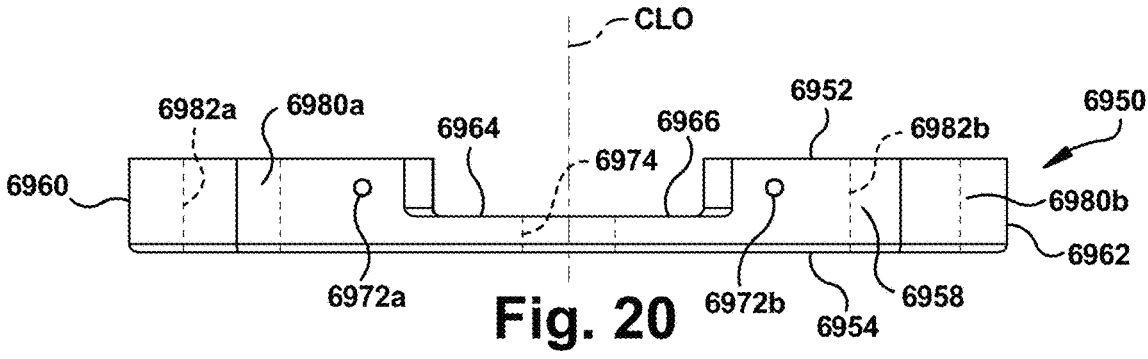
FIG. 20 is a schematic rear elevation view of the cam plate of FIG. 19.
Figure 21:
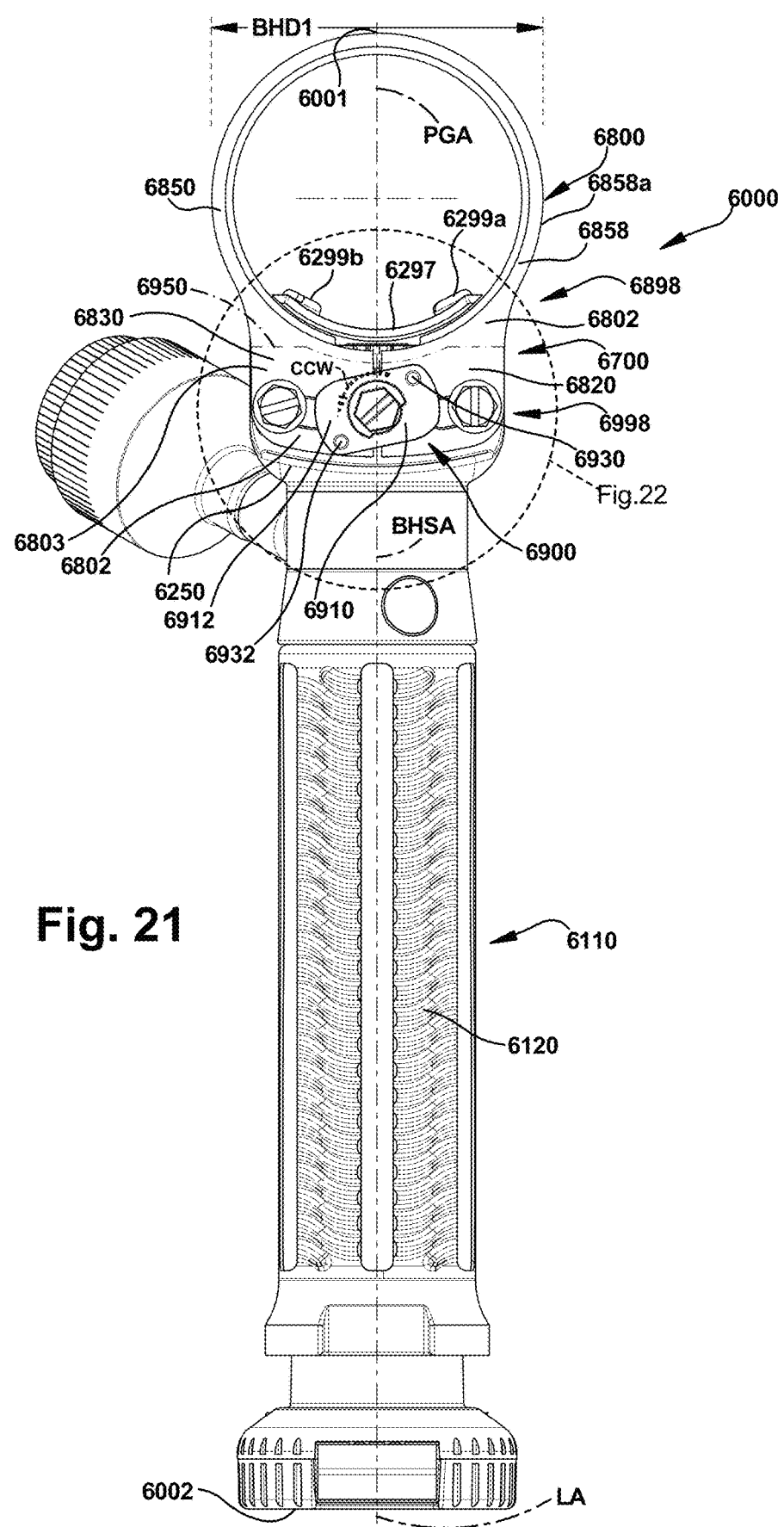
FIG. 21 is a schematic bottom plan view of the power operated rotary knife of FIG. 1 with the annular rotary knife blade removed and a cam plate of the cam mechanism of the blade housing assembly removed and with the cam mechanism in a first, closed position and the annular split blade housing in the first, blade supporting position.
Figure 22:
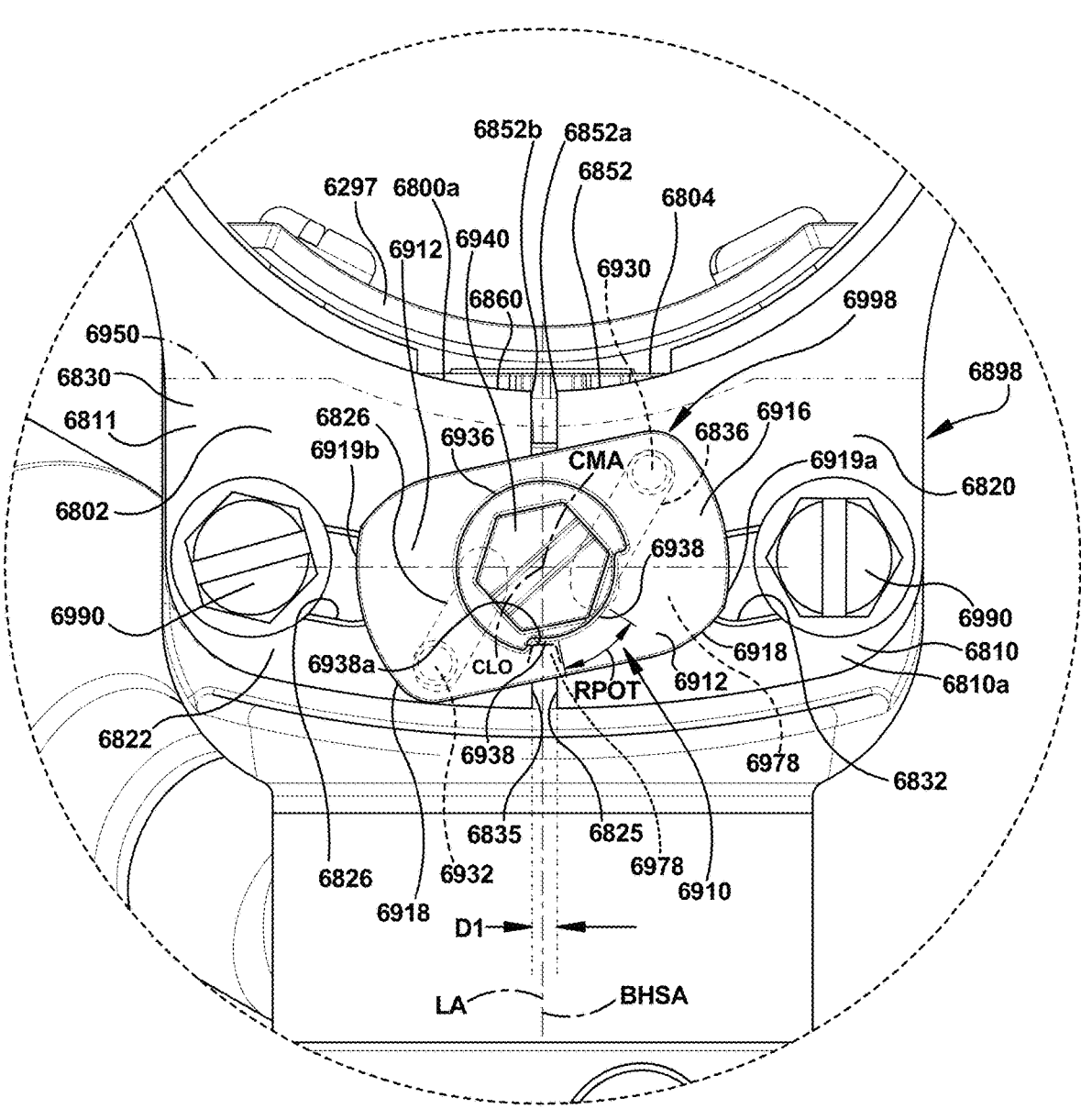
FIG. 22 is a schematic enlarged bottom plan view of a portion of the power operated rotary knife of FIG. 1 which is within a circle labeled FIG. 22 in FIG. 21, with the cam mechanism in the first, closed position and the annular split blade housing in the first, blade supporting position.

As best seen in FIGS. 19 and 20, the cam plate 6950 of the cam mechanism 6900 is generally rectangular in plan view and includes an upper surface 6952 and a spaced apart generally planar lower surface 6954. The upper and lower surfaces 6952, 6954 are spaced apart by a front side 6956, facing toward the annular rotary knife blade 6300, and a back side 6958, facing toward the handle assembly 6110. Extending between the front and back sides 6956, 6958 of the cam plate 6950 are first and second lateral sides 6960, 6962. The upper surface 6952 of the cam plate 6950 includes generally rectangular recess 6964 that receives and supports the cam member 6910. Positioned on either side of the recess 6964 are flanking portions 6980 of the cam plate 6950 that extend a full width or distance between the upper and lower surfaces 6952, 6954. The upper surface recess 6964 defines a seating region 6966 for the cam member 6910. The recess 6964 extends through the front and back sides 6956, 6958 of the cam plate 6950. The recess 6964 is defined by a planar lower wall 6967 and two side walls 6968*a*, 6968*b* that extend from the front side 6956 to the back side 6958 of the cam plate 6950. The planar lower wall 6967 of the recess 6964 is generally parallel to and intermediate between the upper and lower surfaces 6952, 6954 of the cam plate. A centrally located opening 6974 extends through lower surface 6954 of the cam plate 6950 and intersects the recess 6964, passing though the planar lower wall 6967 of the recess 6964. The central opening 6974 receives an upper cylindrical portion 6936 of a downwardly extending boss 6934 of the cam member 6910. A center line CLO through the central opening 6974 defines and is coincident with the cam member axis of rotation CMA. An inner wall 6976 defines the central opening 6974 and includes a radially inwardly extending rotation limitation tab 6978 of the central opening 6974.

Advantageously, the rotation limitation tab 6978 is received in a cut out or arcuate notch 6938 in a side wall 6936 of the upper cylindrical portion 6935 of the downwardly extending boss 6934 of the cam member 6910 to limit rotation of the cam member 6910 with respect to the cam plate 6950. That is, because the tab 6978 of the cam plate 6950 extends into the arcuate notch 6938 of the cam member boss 6934, an arcuate or rotational path of travel RPOT of the cam member 6910 with respect to the cam plate 6950 is necessarily limited by the arcuate or circumferential extent of the arcuate notch 6938. When viewed in bottom plan view as shown, for example, in FIGS. 21-24, rotation of the cam member 6910 in the counterclockwise direction CCW (FIG. 21) (which would be a clockwise direction if viewed in top plan view, e.g., FIG. 3) is limited by the abutment of the first end 6938*a* of the arcuate notch 6938 of the cam member 6910 and the protruding tab 6978 of the cam plate 6950 (the tab 6978 schematically shown in dashed line in FIG. 22). Accordingly, in rotating the cam member 6910 from the second, open position 6999 to the first, closed position 6998, the engagement of the tab 6978 and the first end 6938*a* of the arcuate notch 6938 prevents over rotation of the cam member 6910. Rotation of the cam member 6910 in the clockwise direction CW (FIG. 23) from the first, closed position 6998 to the second, open position 6999 is limited by: a) the engagement of the first and second cam pins 6930, 6932 within the respective offset catch portions 6829, 6839 of the first and second cam slots 6827, 6837 of the first and second body portions 6920, 6930 of the blade housing mounting section 6802; and b) the abutment of the first and second fasteners 6990 of the cam mechanism 6900 with the second end portions 6826*b*, 6836*b* of the blade housing mounting slots 6826, 6836. During assembly of the cam member 6910 to the cam plate 6910 or disassembly of the cam member 6910 from the cam plate 6910, the abutment of the opposite or second end of the notch 6938 of the cam member 6910 and the protruding tab 6978 of the cam plate 6950 advantageously prevent over rotation of the cam member 6910 in the clockwise direction CW. Over rotation of the cam member 6910 with respect to the cam plate 6950 in the clockwise direction CW during assembly could result in the cam member rectangular base 6912 pushing against and permanently bending or deforming a pair of retainer springs 6972a, 6972b of the cam plate 6950. In one exemplary embodiment, the rotational path of travel RPOT of the cam member 6930 in moving between the first, closed position 6998 and the second, open position 6999 is approximately 45°.

The side walls 6968a, 6968b of the recess 6964 in the upper surface 6952 of the cam plate 6950 includes respective outwardly bowed portions 6970a, 6970b, that is, outwardly bowed with respect to the center line CLO through the central opening 6974. Respective first and second retainer springs 6972a, 6972b spaced from and extending substantially parallel to the planar lower wall 6967 of the upper surface recess 6964 bridge the pair of outwardly bowed portions 6970a, 6970b of the side walls 6968a, 6968b. As can best be seen in FIGS. 13 and 15, the pair of retainer springs 6972a, 6972b bear against respective ledges 6922a, 6922b formed in recessed regions 6920a, 6920b of the side wall 6928 of a rectangular base 6912 of the cam member 6910 to maintain the cam member 6910 within the recess 6964 as the cam member 6910 is rotated between its first and second positions 6998, 6999. Additionally, in the first, closed or locked position 6998 of the cam member 6910, central portions 6973a, 6973b of the pair of retainer springs 6972a, 6972b bear against respective planar or flat areas 6924a, 6924b (best seen in FIGS. 13 and 17) of the recessed regions 6920a, 6920b of the side wall 6918 of the cam member base 6912, to reproducibly, consistently and precisely set the rotational position of the cam member 6910 in the first, closed position 6998 of the cam member and thereby reproducibly, consistently and precisely set the blade housing diameter BHD1 and the split distance D1 between opposing faces 6825, 6835 of the first and second body portions 6820, 6830 of the blade housing mounting section 6802 in the first, blade supporting position 6898 of the blade housing 6800, as further explained below.

The retainer springs 6972a, 6972b are disposed in respective horizontal openings in the cam plate 6950. The cam plate 6950 is staked to displace material over the horizontal openings to maintain the retainer springs 6972a, 6972b permanently in place. The flanking portions 6980a, 6980b of the cam plate 6950 includes respective ones of a pair of openings 6982a, 6982b. The pair of openings 6982a, 6982b each receive a respective one of a pair of threaded fasteners 6990. Each of the pair of threaded fasteners 6990 have a shank terminating in a threaded distal end portion. The respective shanks of the pair of threaded fasteners 6990 each include differing diameter portions between the threaded distal portions and a hexagonal head of the fasteners 6990 such that the fasteners 6990 are captured in and do not fall out of their respective openings 6982a, 6982b. The pair of fasteners 6990 function to secure the blade housing assembly 6700, including the blade housing 6800 and the cam mechanism 6800 to the frame body 6250 of the head assembly 6200. Specifically, the threaded fasteners 6990 pass through the respective cam plate openings 6982a, 6982b and also pass through respective mounting slots 6826, 6836 of first and second body portions 6820, 6830 of the central region 6811 of the mounting section 6802 of the blade housing 6800 and then thread into respective threaded openings 6274 of the planar mount pedestal 6272 of the lower surface 6270 of the frame body 6250. Thus, the blade housing 6800 is thereby secured to the frame body 6250 by having the blade housing mounting section 6802 being sandwiched between the cam plate 6950 of the cam mechanism 6900 and the planar mounting pedestal 6272 of the lower surface 6270 of the frame body 6250 as the fasteners 6990 are threaded into the threaded openings 6274 of the planar mount pedestal 6272 of the lower surface 6270 of the fame body 6250.

Because the mounting slots 6826, 6836 of the mounting section 6802 of the blade housing 6800 are oval shaped in top plan view, the mounting slots 6826, 6836 are longer, as viewed along the length of the respective slots 6826, 6836, than a diameter of the shanks of the threaded fasteners 6990 of the cam mechanism 6900. Advantageously, as the blade housing 6800 is moved by the cam mechanism 6900, the diameter of the blade support section 6850 between the first blade supporting position 6898, having a smaller diameter of the blade support section 6850, and the second blade changing position 6899, having a larger diameter of the blade support section 6850, the blade housing 6800 remains secured to the frame body 6250 by the sandwiching or bearing action of the cam plate 6950 bridging and bearing against the blade housing mounting section 6802 and urging the blade housing mounting section against the planar mounting pedestal 6272 of the frame body 6250. Stated another way, because the mounting slots 6826, 6836 of the blade housing mounting section 6802 are longer in extent than the diameter of the shanks of the threaded fasteners 6990, rotation of the cam member 6910 of the cam mechanism 6900 about its axis of rotation CMA from the first, closed position 6998 to the second, open position 6999 of the cam mechanism 6900 increases the width of the split 6801a from the first blade housing gap or split distance D1 to the second blade housing split distance D2 between opposing faces 6825, 6835 of the first and second body portions 6820, 6830 of the blade housing mounting section 6802 and thereby moves the blade housing 6800 from the first, blade supporting position 6898 to the second, blade changing position 6899 of the blade housing 6800, while the blade housing 6800 remains secured to the frame body 6250. Conversely, because the mounting slots 6826, 6836 of the blade housing mounting section 6802 are longer in extent or length than the diameter of the shanks of the threaded fasteners 6990, rotation of the cam member 6910 of the cam mechanism 6900 about its axis of rotation CMA from the second, open position 6999 to the first, closed position 6998 of the cam mechanism 6900 decreases the width of the split 6801a from the second blade housing gap or split distance D2 to the first blade housing split distance D1 between opposing faces 6825, 6835 of the first and second body portions 6820, 6830 of the blade housing mounting section 6802 and thereby moves the blade housing 6800 from the second, blade changing position 6896 to the first, blade supporting position 6898 of the blade housing 6800, again, while the blade housing 6800 remains secured to the frame body 6250.

As can best be seen in FIGS. 16-18 and 20-24, the cam member 6910 includes the rectangular base 6912 having a generally planar upper surface 6914 and a generally planar lower surface 6916 separated by the circumferentially extending side wall 6918. A pair of opposite, diagonally spaced apart portions 6919a, 6919b of the side wall 6918 include the recessed regions 6920a, 6920b. The recessed regions 6920a, 6920b define respective ledges 6922a, 6922b which, as explained previously, receive and bear against the pair of retainer springs 6972a, 6972b of the cam plate 6950 to maintain the cam member 6910 within the recess 6964 of the cam plate 6950 as the cam member 6910 is rotated between its first and second positions 6998, 6999. The recessed regions 6920a, 6920b of the side wall 6918 of the cam member base 6912 also include respective planar or flat areas 6924a, 6924b. The planar or flat areas 6924a, 6924b of the side wall 6918 are spaced 180° apart as viewed in bottom plan view (FIG. 17), are substantially parallel and equidistant from the cam member axis of rotation CMA, and are located near respective end portions of the recessed regions 6920a, 6920b. Advantageously, in the first, closed position 6998 of blade housing 6800, the planar or flat areas 6924a, 6925b bear against respective ones of the pair of retainer springs 6972a, 6972b of the cam plate 6950 set in the outwardly bowed portions 6970a, 6970b of the side walls 6968a, 6968b of the recess 6964 in the upper surface 6952 of the cam plate 6950. When the cam member 6910 is rotated about the cam member axis of rotation CMA when the cam member 6910 is rotated to the first, closed position 6999, the bearing of the flat areas 6924a, 6924b of the side wall 6918 of the cam member 6910 against the retainer springs 6972a, 6972b causing the cam member 6910 to be set at a specific precise and repeatable rotational orientation, shown schematically, for example, in FIG. 13, with respect to the cam plate 6950 and the blade housing mounting section 6802. As explained below, the bearing of the flat areas 6924a, 6924b of the side wall 6918 of the cam member 6910 against the retainer springs 6972a, 6972b when the cam member 6910 is rotated to the first, closed position 6998 advantageously results in: a) a predetermined, consistent, reproducible and desired split distance value between opposing faces 6825, 6835 of the first and second body portions 6820, 6830 of the blade housing mounting section 6802, namely, split distance D1; and b) a predetermined, consistent, reproducible and desired blade housing diameter, namely, blade housing diameter BHD1 corresponding to the blade housing blade support configuration 6898 having a proper, desired operating or running clearance for the rotary knife blade 6300.

Extending axially from the lower surface 6916 of the cam member 6910 is the downwardly projecting boss 6934. The boss 6934 passes through the central opening 6974 of the cam plate 6950 and extends beyond the lower surface 6916 of the rectangular base 6912 of the cam member 6910. The boss 6934 includes the generally upper cylindrical portion 6935 that is received in the cam plate central opening 6974 and a lower or distal portion 6940 which defines an accessible cam actuator 6943 which allows the cam plate 6910 to be rotated between its first and second positions 6998, 6999. The lower portion 6940 of the boss 6934 extends below lower surface 6916 and, in one exemplary embodiment, is formed into a hex shaped body 6942. The hex shaped body 6942 is accessible below the cam plate 6950 and functions as the cam actuator 6943. The cam actuator 6943 may be rotated by a conventional ratchet socket or end wrench to move or rotate the cam member 6910 between its first, closed position 6998 and its second, closed position 6999. The cam actuator 6943 rotates about the cam member axis of rotation CMA and the boss 6934 is centered about the center line CLO through the central opening 6974 of the cam plate 6950. The side wall 6936 of the upper cylindrical portion 6935 of the boss 6934 includes the arcuate notch portion 6938. Viewed in bottom plan view, for example, as seen in FIGS. 21-24, rotation of the cam member 6910 in the counterclockwise direction CCW is limited, as explained previously, to the rotational path of travel RPOT by the interfit of the tab 6978 of the cam plate 6950 into the arcuate notch 6938 of the cam member boss 6934. In one exemplary embodiment, the upper surface 6914 of the cam member 6910 includes a slot 6944 to aid in the assembly of the cam mechanism 6900. Specifically, the slot 6944 allows for easy rotation of the cam member 6910 during assembly such that the cam member 6910 is appropriately seated in the seating region 6966 of the recess 6964 of the cam plate 6950 and the retainer springs 6972a, 6972b of the cam plate 6950 properly bear against the ledges 6922a, 6922b of the cam member 6910 to maintain the cam plate 6910 in place with respect to the cam plate recess 6964.

Extending axially from the planar upper surface 6914 of the rectangular base 6912 of the cam member 6910 are the pair of diagonally spaced apart first and second cam pins 6930, 6932. The first cam pin 6930 is located slightly inwardly of the cam member side wall 6918 near the recess region 6920a of the side wall 6918. The second cam pin 6932 is located slightly inwardly of the cam member side wall 6918 near the recess region 6920b of the side wall 6918. The first cam pin 6930 slidingly engages and moves within the first cam slot 6827 formed in the lower surface 6822 of the first body portion 6820 of the blade housing mounting section 6802. Specifically, the first cam pin 6930 is constrained by the first cam slot 6827 to move along the generally linear path of travel 6828a defined by the linear portion 6828 of the first cam slot 6827. As noted previously, the first cam slot 6827, if extended along the linear path of travel 6828a, would intersect the blade housing split 6801a. The first cam slot 6827 includes the first end 6827a and the second end 6827b. The second end 6827b of the cam slot 6827 is closer to the blade housing split axis BHSA than the first end 6827a and includes the offset catch portion 6829. The first cam pin 6930 slides along the first cam slot 6827 along the substantially linear path of travel 6928a as the cam member 6910 moves between its first and second positions 6998, 6999. Similarly, the second cam pin 6932 slidingly engages and moves within the second cam slot 6837 formed in the lower surface 6832 of the second body portion 6830 of the blade housing mounting section 6802. Specifically, the second cam pin 6932 is constrained by the first cam slot 6837 to move along the generally linear path of travel 6838a defined by the linear portion 6838 of the second cam slot 6837. As noted previously, the second cam slot 6837 is transverse to and, if extended along the linear path of travel 6838a, would intersect the blade housing split 6801a. The second cam slot 6837 includes the first end 6827a and the second end 6827b. The second end 6827b of the cam slot 6827 is closer to the blade housing split axis BHSA than the first end 6827a and includes the offset catch portion 6829. The second cam pin 6932 slides along the second cam slot 6837 along the substantially linear path of travel 6938a as the cam member 6910 moves between its first and second positions 6998, 6999.

In the first, closed position 6998 of the cam member 6910, the first cam pin 6930 is positioned at the first end 6827a of the first cam slot 6827 and the second cam pin 6932 is positioned at the first end 6837a of the second cam slot 6837. As the cam actuator 6943 of the cam member 6910 is rotated about the cam member axis of rotation CMA to move the cam plate from the first, closed position 6998 to the second, open position 6999 for blade removal purposes, the first cam pin 6930 moves or slides along the path of travel 6828a moving from the first end 6827a of the first cam slot 6827 to the second end 6827b and is caught and held in the offset catch portion 6829 of the first cam slot 6827. Simultaneously, as the cam actuator 6943 of the cam member 6910 is rotated about the cam member axis of rotation CMA to move the cam plate from the first, closed position 6998 to the second, open position 6999 for blade removal purposes, the second cam pin 6932 moves or slides along the path of travel 6838*a* moving from the first end 6837*a* of the second cam slot 6837 to the second end 6837*b* and is caught and held in the offset catch portion 6839 of the second cam slot 6837. Because the respective ends 6827*b*, 6837*b* are closer to the blade housing split axis BHSA, the movement of the first and second cam pins 6930, 6932 along the respective paths of travel 6828*a*, 6838*a* of the first and second cam slots 6827, 6837 spreads or moves the opposing faces 6825, 6835 of the first and second body portions 6820, 6830 of the blade housing mounting section 6802 apart thereby increasing the diameter of the inner wall 6800*a* of the blade housing 6800 and thereby increasing the split distance from split distance D1 (blade supporting position 6898) to split distance D2 (blade changing position 6899) allowing the rotary knife blade 6300 to be removed from the blade housing blade support section 6850.

Since the blade housing 6800 is fabricated of a strong and resilient material such as a hardenable grade of alloy steel or a hardenable grade of stainless steel, when moved to an expanded diameter condition (i.e., the blade changing position 6899), the natural tendency for the blade housing 6800 to revert or spring back to its unexpanded or rest position (i.e., the blade supporting position 6898). Thus, the resiliency of the blade housing 6800 would tend to force the cam member 6910 to rotate from the second, open position 6999 back to the first, closed position 6998. Advantageously, to mitigate this effect so that the operator does not have to continuously apply torque to the cam actuator 6943 of the cam member 6910 to maintain the blade housing 6800 in the second, blade changing position 6899, in the second, open position 6999 of the cam member 6910, the cam pins 6930, 6932 are positioned in and stably rest in the respect offset catch portion 6829, 6839 at the second ends 6827*b*, 6837*b* of the respective cam slots 6827, 6837. Thus, once the blade housing 6800 is in the second, blade changing position 6899, the blade housing 6800 is stable and stays in its expanded diameter condition without the application of continuous torque to the cam actuator 6943.

One of the advantages of the cam mechanism 6900 is that it provides a simple, durable and repeatable mechanical assembly which allow the operator or maintenance person, by rotating the cam member 6910 to its first, closed position 6998 to return in the diameter of the blade support section 6850 back to a predetermined, desired blade housing diameter BHD1 corresponding to the blade housing blade support configuration 6898 having a proper, desired operating or running clearance for the rotary knife blade 6300, without the need for further operator or maintenance person adjustment of the blade housing diameter. Stated another way, since the blade housing diameter and the split distance between opposing faces 6825, 6835 of the first and second body portions 6820, 6830 of the blade housing mounting section 6802 are directly proportional, setting the blade housing split distance at a desired value, e.g., the split distance D1, results in the blade support section 6850 of the blade housing 6800 having an outside diameter value that is desired, that is, the blade housing diameter BHD1.

At such time as the rotary knife blade 6300 is replaced and properly positioned in the blade support section 6850 of the blade housing 6800, the operator applies torque to the cam actuator 6943 sufficient to rotate the cam member 6910 from its second, open position 6999 to its first, closed position 6998. Advantageously, in addition to the natural resiliency of the blade housing 6800 which tends to cause the blade to return to its first, closed position 6998, the retainer springs 6972*a*, 6972*b* of the cam plate 6950 aid in returning the blade housing 6800 to the first, closed position 6998 and, more specifically, aid in returning the blade housing 6800 to a position wherein: a) the split distance value is consistently and reproducibly the desired split distance D1; and b) the blade housing diameter value is consistently and reproducibly the desired blade housing diameter BHD1. As can best be seen in FIG. 13, in one exemplary embodiment, in the first, closed position 6998 of blade housing 6800, central portions 6973*a*, 6973*b* of the retainer springs 6972*a*, 6972*b* bear against respective planar or flat areas 6924*a*, 6924*b* of the recessed regions 6920*a*, 6920*b* of the side wall 6918 of the cam member 6910. When the cam member 6910 is rotated about the cam member axis of rotation CMA when the cam member 6910 is rotated to the first, closed position 6998, the bearing of central portions 6973*a*, 6973*b* of the retainer springs 6972*a*, 6972*b* against the flat areas 6924*a*, 6924*b* of the cam member 6910 cause the cam member 6910 to be set at a specific precise and repeatable rotational orientation, as depicted schematically in FIG. 13, with respect to the cam plate 6950 and the blade housing mounting section 6802. The circumferential extent of a region of contact between the central portion 6973*a* of the retainer spring 6972*a* and the flat area 6924*a* of the cam member side wall 6918 is large. Similarly, the circumferential extent of a region of contact between the central portion 6973*b* of the retainer spring 6972*b* and the flat area 6924*b* of the cam member side wall 6918 is also large. These large circumferential regions of contact advantageously function to essentially firmly lock and maintain the rotational orientation of the cam member 6910 when the cam member is in the first, closed position 6998. Because of the bearing contact between the central portions 6973*a*, 6973*b* of the retainer springs 6972*a*, 6972*b* against the flat areas 6924*a*, 6924*b* of the cam member 6910, in the first, closed position 6998 of the cam member 6910, the retainer springs 6972*a*, 6972*b* are under tension and, thus, are slightly bowed or deflected. However, the limited deflection of the retainer springs 6972*a*, 6972*b* in the first, closed position 6998 of the cam member 6910 does not deform or permanently bend the retainer springs 6972*a*, 6972*b*.

Since the cam member 6910 is always set at the specific predetermined rotational orientation with respect to the cam plate 6950 and the blade housing mounting section 6802, the position of the cam member pins 6930, 6932 of the cam member 6910 are set a specific, predetermined and repeatable locations within their respective cam slots 6827, 6837. That is, because of the bearing of the central portions 6973*a*, 6973*b* of the retainer springs 6972*a*, 6972*b* in the first, closed position 6998 of the blade housing 6800 against the flat areas 6924*a*, 6924*b* of the cam member 6910, the position or location of the cam member pin 6930 at the first end 6827*a* of the cam slot 6827 of the first body portion 6920 of the blade housing mounting section or mounting portion 6802 and the position of the cam member pin 6932 at the first end 6837*a* of the cam slot 6837 of the first body portion 6930 of the blade housing mounting portion 6802 is set precisely, consistently and reproducibly each time the cam member 6910 is rotated to the first, closed position 6999. The precise and reproducible positioning of the cam member pins 6930, 6932 within their respective cam slots 6927, 6937 resulting from the engagement of the cam plate retainer springs 6972*a*, 6972*b* against the respective planar or flat areas 6924a, 6924b of the recessed regions 6920a, 6920b of the side wall 6918 of the cam member 6910 when the blade housing 6800 is in the first, blade supporting position 6898 functions to move the mounting section 6802 of the blade housing 6800 into the same position or configuration every time the cam member 6910 is rotated to its first, closed position 6998.

The bearing of the central portions 6973a, 6973b of the cam plate retainer springs 6972a, 6972b against the respective planar or flat areas 6924a, 6924b of the recessed regions 6920a, 6920b of the side wall 6918 of the cam member 6910 results in a consistent configuration of the mounting section 6802 of the blade housing 6800 and a consistent configuration of the blade support section 6850 of the blade housing 6800 when the cam member 6910 is in the first, closed position 6898. That is, when the cam member 6920 is in the first, closed position 6998, a split distance value between opposing faces 6825, 6835 of the first and second body portions 6820, 6830 of the blade housing mounting section 6802 is precise, consistent, and reproducible, namely, the desired split distance D1. The split distance D1 results in the blade support section 6850 of the blade housing 6800 having the desired diameter value, namely, blade housing diameter BHD1. That is, every time the cam member 6910 is rotated to its first, closed position 6998, the split distance value achieved is substantially identical to the desired split distance value, namely, the split distance D1 and the blade housing diameter achieved is substantially identical to the desired blade housing diameter value, namely, blade housing diameter BHD1. In this condition and configuration of the blade housing 6800, the power operated rotary knife 6000 is ready for operation without the need for further adjustment of the blade housing diameter BHD1 by the operator. Additionally, as mentioned previously, depending upon cutting conditions and maintenance of the power operated rotary knife 6000, the extended wear capability of the double axial blade-blade housing bearing structure 6550 of the assembled blade-blade housing combination 6500 advantageously allows for a "set it and forget it" mode of operation of the power operated rotary knife 6000. That is, once a new or sharpened rotary knife blade 6300 has been inserted into the blade housing blade support section 6850 of the blade housing 6800, as the cam member 6910 is moved to the first, closed position 6998, the blade housing 6800 concurrently moves to its first, blade supporting position 6898 wherein the split distance between the opposing faces 6825, 6835 of the first and second body portions 6820, 6830 of the blade housing mounting section 6802 is consistently and reproducibly is set at the predetermined, desired split distance value, namely, split distance D1 and desired blade housing diameter BHD1. This precise, reproducible positioning and configuration of the blade housing 6800 in the first, blade supporting position 6898 provides for a desired value of operating or running clearance between the annular rotary knife blade 6300 and the blade support section 6850 of the blade housing 6800. Given the extended wear capability of the double axial blade-blade housing bearing structure 6550 of the assembled blade-blade housing combination 6500 and depending on cutting conditions, maintenance of the power operated rotary knife 6000, along with other variables, there may be no need for the operator to make adjustments to blade housing diameter to change operating or running clearance during a work shift thereby allowing for greater operator efficiency and less operator downtime during the work shift, as explained previously.

In one exemplary embodiment, the rectangular base 6912 of the cam member 6910 has length and width dimensions of approximately 0.47 in. and 0.78 in. and a thickness of 0.10 in., while a center to center diagonal distance between the first and second cam pins 6930, 6932 is approximately 0.60 in. In one exemplary embodiment, a center to center distance between the first and second openings 6982a, 6982b of the first and second flanking portions 6980a, 6880b of the cam plate 6950 is approximately 1.22 in., while the thickness or depth of the cam plate 6950 in the first and second flanking portions 6980a, 6880b is approximately 0.17 in. and a diameter of the central opening 6974 of the cam plate is approximately 0.37 in. Again, as noted previously, it is understood, that these dimensions will necessarily change based on the size and configuration, characteristics and parameters of the rotary knife blade to be supported by the blade housing, the blade-blade housing bearing structure, and other parameters and characteristics of the power operated rotary knife 6000 and components thereof.

Seventh Embodiment—Power Operated Rotary Knife 7000

A seventh exemplary embodiment of a power operated rotary knife of the present disclosure is shown generally at 7000 in FIGS. 26-32. The power operated rotary knife 7000 extends between a distal or forward end 7001 and a proximal or rearward end 7002 of the power operated rotary knife 7000. The power operated rotary knife 7000 includes an elongated handle assembly 7110, a head assembly 7200, which is releasably secured to a front or distal end 7112 of the handle assembly 7110, and a drive mechanism 7600, including a gear train 7604. The handle assembly 7110 includes a central throughbore 7115 that extends along a central longitudinal axis LA of the handle assembly 7110. The head assembly 7200 extends from the handle assembly 7110 along the central longitudinal axis LA in a forward or distal direction FW. The throughbore 7115 (FIG. 30) of the handle assembly 7110 receives a distal portion of a flexible drive shaft assembly (similar to the flexible drive shaft assembly 700 of the first exemplary embodiment) which rotates the drive mechanism 7600, as described in the first exemplary embodiment of the '207 application. As used herein, the forward direction FW will be a direction extending generally along or parallel to the handle assembly longitudinal axis toward the distal end 7001 of the power operated rotary knife 7000 and a rearward direction RW will be a direction extending generally along or parallel to the handle assembly longitudinal axis LA toward the proximal end 7002 of the power operated rotary knife 7000.

Figure 32:
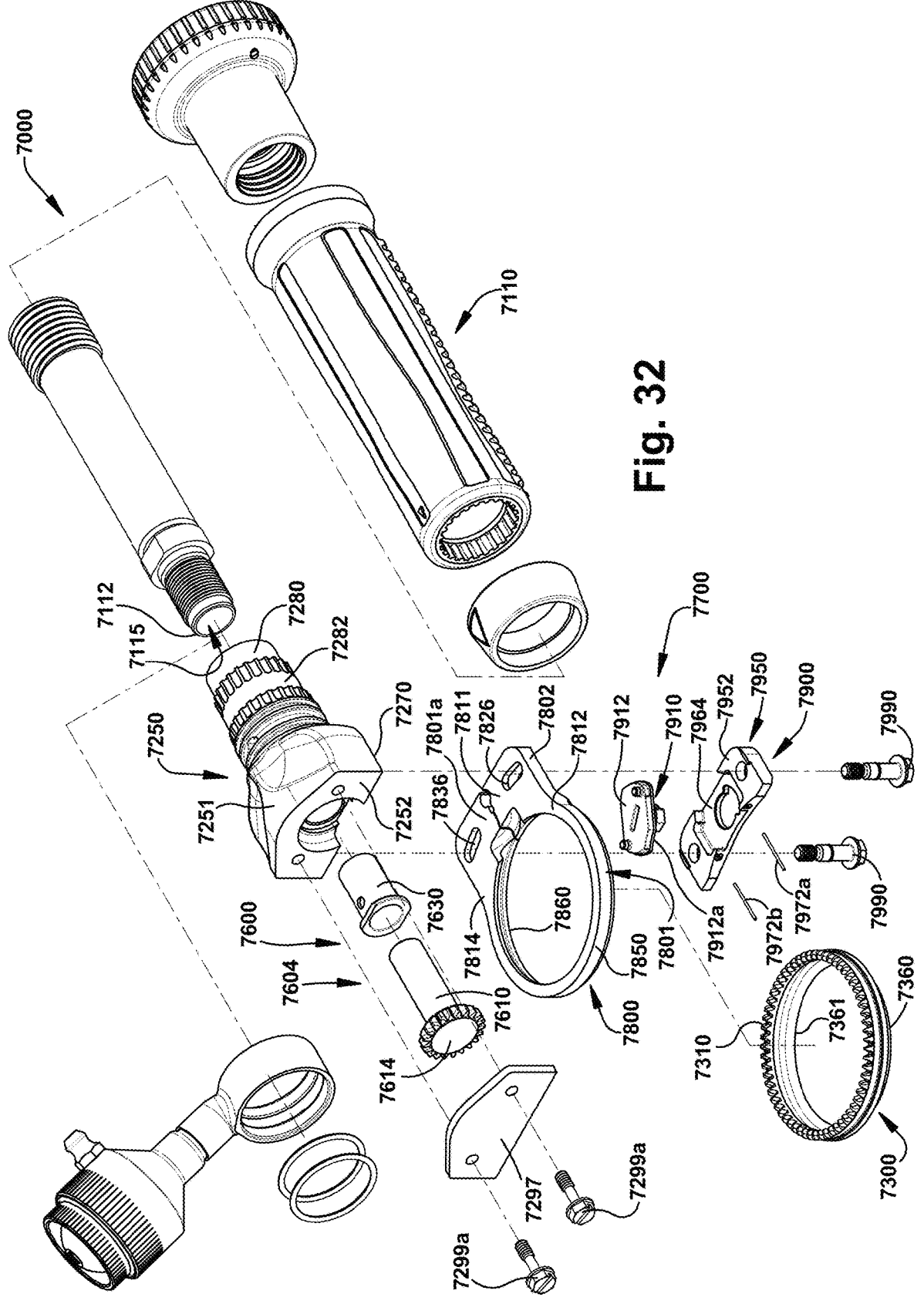
FIG. 32 is a schematic exploded, top, front perspective view of the power operated rotary knife of FIG. 26.
Figure 33:
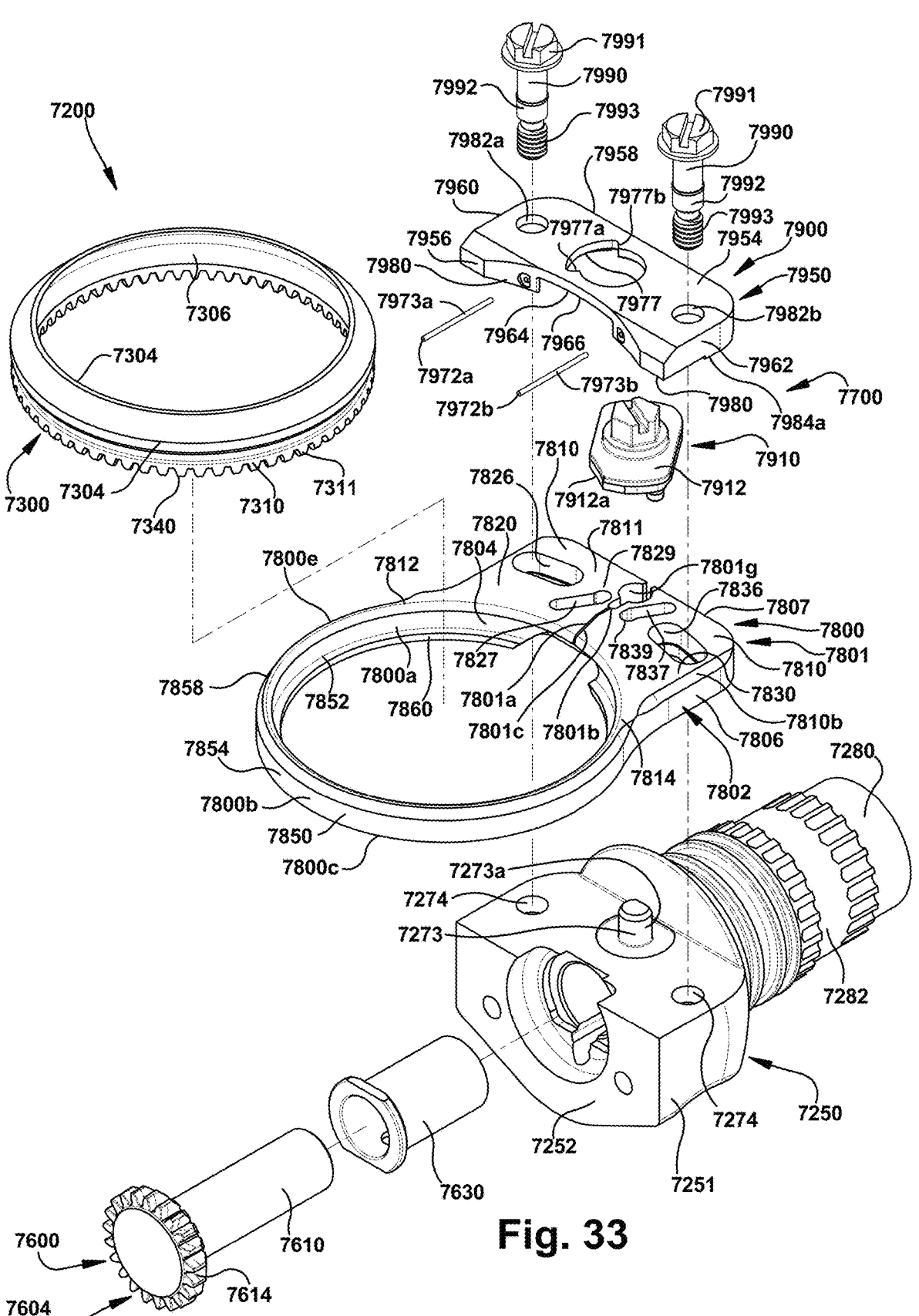
FIG. 33 is a schematic exploded, bottom, front perspective view of the head assembly of the power operated rotary knife of FIG. 26.

As best seen in FIGS. 32 and 33, the head assembly 7200 includes a frame body 7250 including a forward portion 7251 and a rearward portion 7280. The rearward portion 7280 of the frame body 7250 includes an annular boss 7282 that defines a mounting structure that receives and engages the front end 7112 of the handle assembly 7110 to secure the head assembly 7200 to the handle assembly 7110. The head assembly 7200 further includes an annular rotary knife blade 7300, substantially similar to the annular rotary knife blade 6300 of the power operated rotary knife 6000 of the sixth exemplary embodiment, as described above. The head assembly 7200 further includes a blade housing assembly 7700 including a split ring blade housing or split blade housing 7800 which supports the annular rotary knife blade 7300 for rotation about a central axis of rotation R and a cam assembly or cam mechanism 7900 which is affixed to the split blade housing 7800. The blade housing 7800 includes an annular blade support section 7850 which supports the rotary knife blade 7300 for rotation and a mounting portion or mounting section 7802, which may be considered as a tongue or projection extending radially outwardly and in a generally rearward direction RW from the annular blade support section 7850. The annular blade support section 7850 is centered about a blade housing center line or central axis CBH (schematically depicted in FIGS. 28-30), specifically, an inner wall 7852 of the blade support section 7850, which defines a bearing region 7860 of the blade housing 7800 for rotatably supporting the annular rotary knife blade 7300, is centered about the blade housing center line CBH. The blade housing center line CBH is substantially parallel to the central axis of rotation R of the rotary knife blade 7300 and, in a first, blade supporting position 7898 of the blade housing 7800, the blade housing center line CBH is substantially coincident with the rotary knife blade central axis of rotation R.

Figure 36:
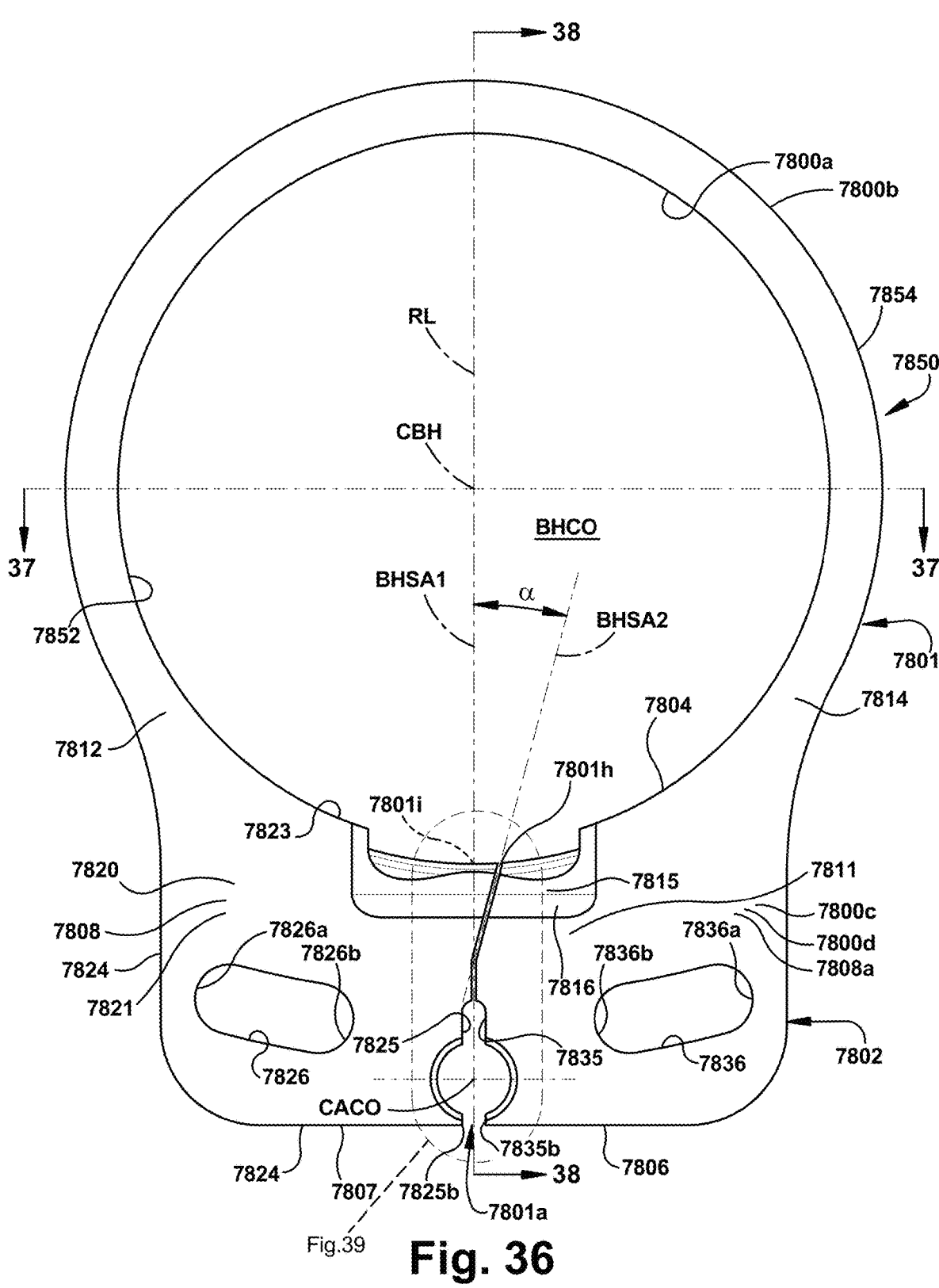
FIG. 36 is a schematic top plan view of the annular split ring blade housing of the blade housing assembly of the power operated rotary knife of FIG. 26, with the blade housing in the first, blade supporting position.
Figure 39:
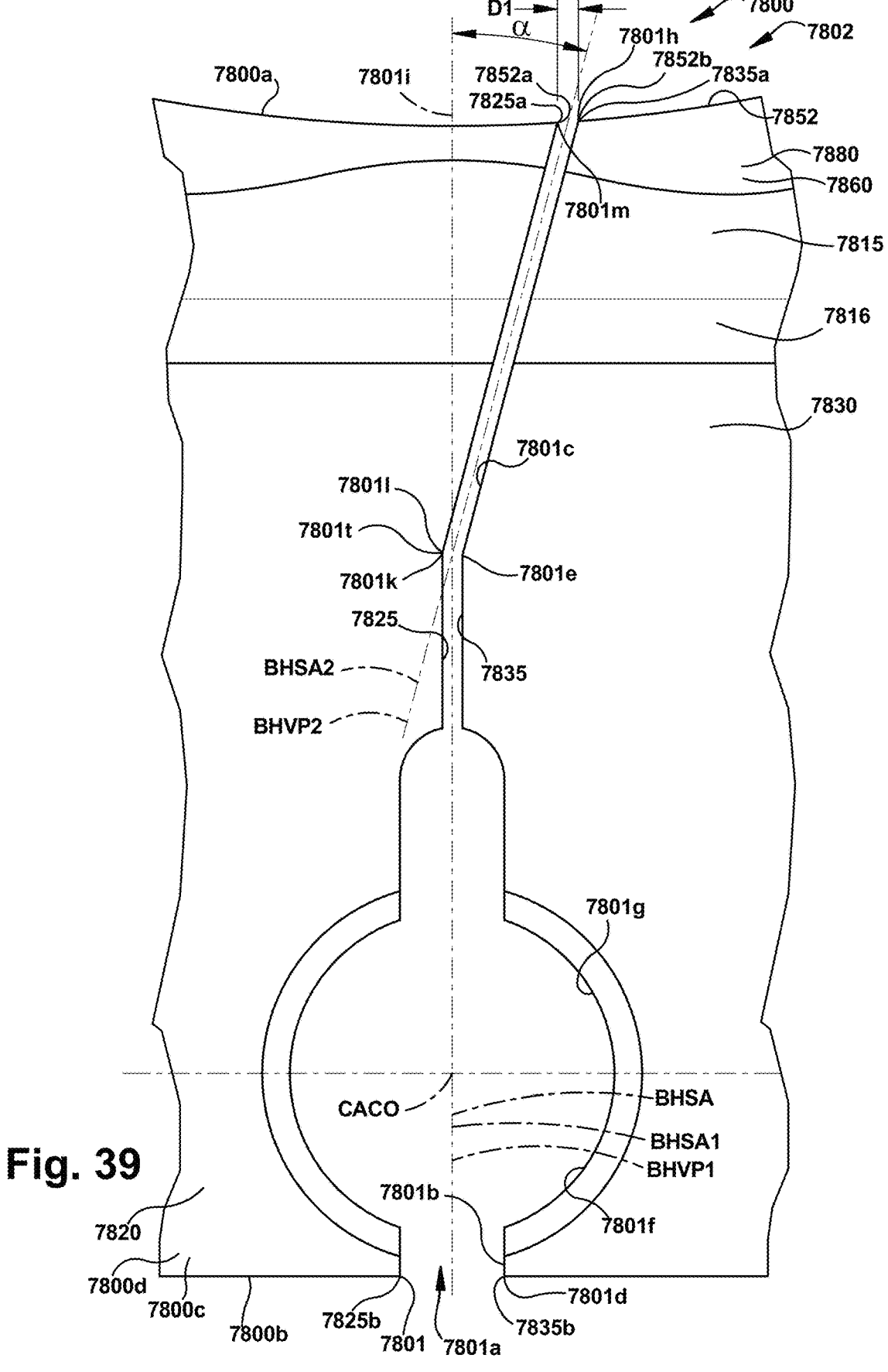
FIG. 39 is a schematic top plan view of the annular split ring blade housing of FIG. 36 which is within a circle labeled FIG. 39 in FIG. 36.

As best seen in FIGS. 36 and 39, a split 7801*a* extends through a diameter of the split ring blade housing 7800 in a region of the blade housing mounting section 7802 to allow for expansion of a circumference of the annular blade support section 7850 for purposes of removing the annular rotary knife blade 7300 from the annular blade support section 7850 and inserting a new or resharpened annular rotary knife blade 7300 into the annular blade support section 7850. With respect to the mounting section 7802, a split 7801*a* extends through and divides a central region 7811 of the mounting section 7802 defining a first body section or portion 7820 on one side of the split 7801*a* and a second body section or portion 7830 on an opposite side of the split 7801*a*. In the region of the mounting section 7802, an inner wall 7804 of the mounting section 7802 overlaps and is coincident with an inner wall 7852 of the blade support section 7850 of the split blade housing 7800. Unlike the radially extending split 6801*a* of the mounting section 6802 of the blade housing 6800 of the sixth embodiment which defines the split axis BHSA that intersects the blade housing center line CBH and bisects t mounting section 6802 into two substantially identically sized body portions 2820, 6830, the split 7801*a* of the mounting section 7802 of the blade housing 7800 of the seventh embodiment, when viewed in plan view, is a generally dog-leg shaped split having a first, radially extending split portion 7801*b* and a second, angled split portion 7801*c*, which extends from but is transverse to the first, radially extending split portion 7801*b*. Thus, when viewed in plan view, while the split 7801*a* bisects the mounting section 7802, the resulting first and second body portions 7820, 7830 are different in shape and size.

Figure 40:
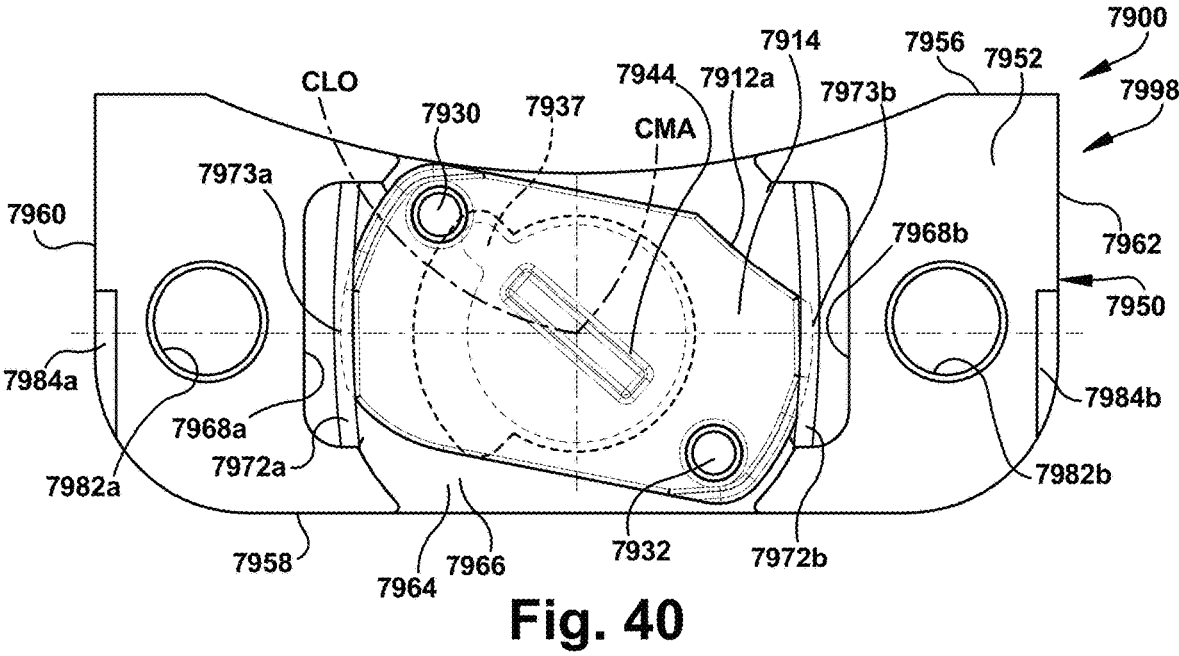
FIG. 40 is a schematic top plan view of the cam mechanism of the blade housing assembly of the power operated rotary knife of FIG. 26, with the cam mechanism in the first, closed or locked position.
Figure 42:
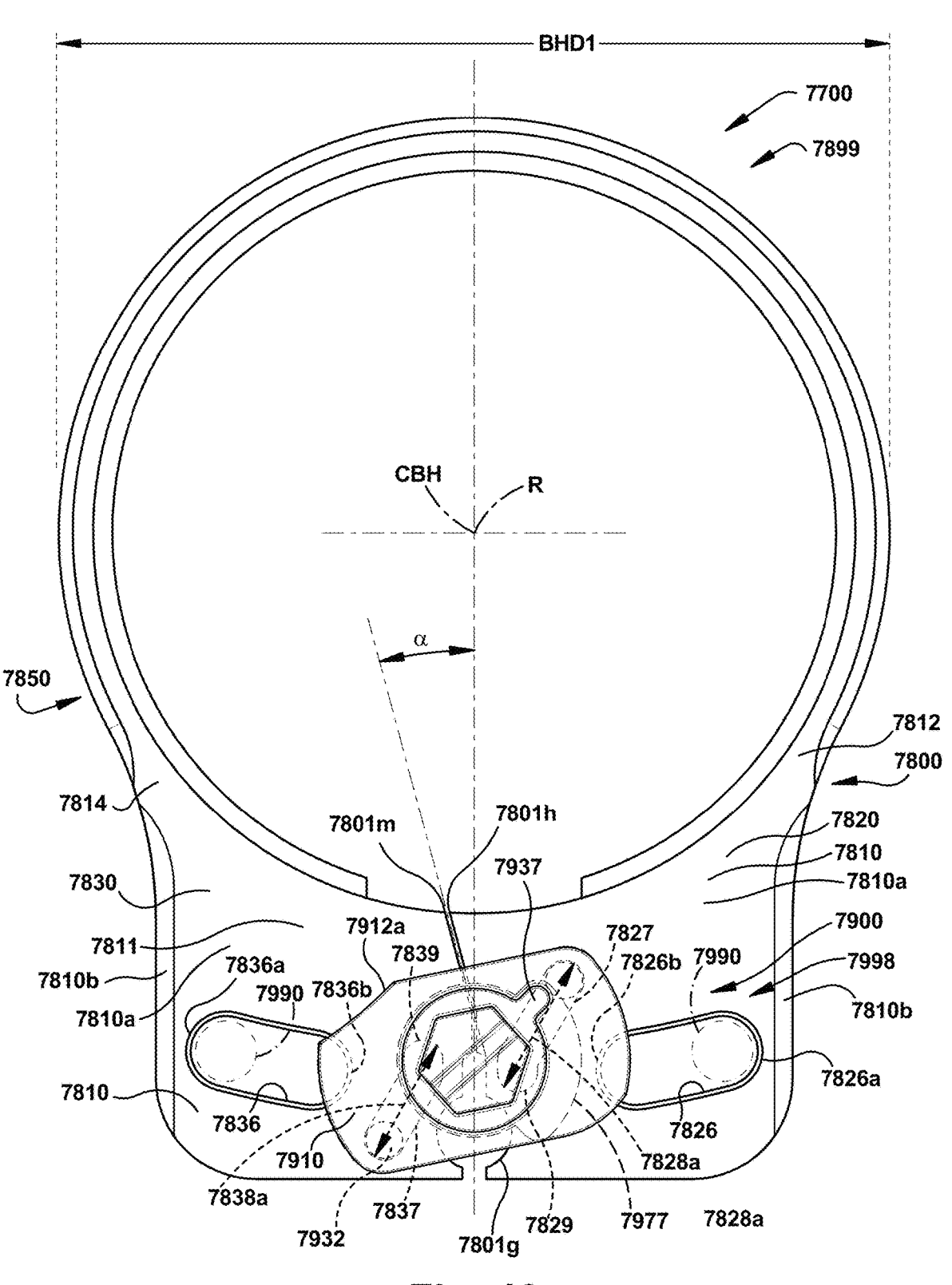
FIG. 42 is a schematic bottom plan view of the blade housing assembly of the power operated rotary knife of FIG. 26, with the cam mechanism in the first, closed or locked position first, closed or locked position and the annular split ring blade housing in the first, blade supporting position.
Figure 43:
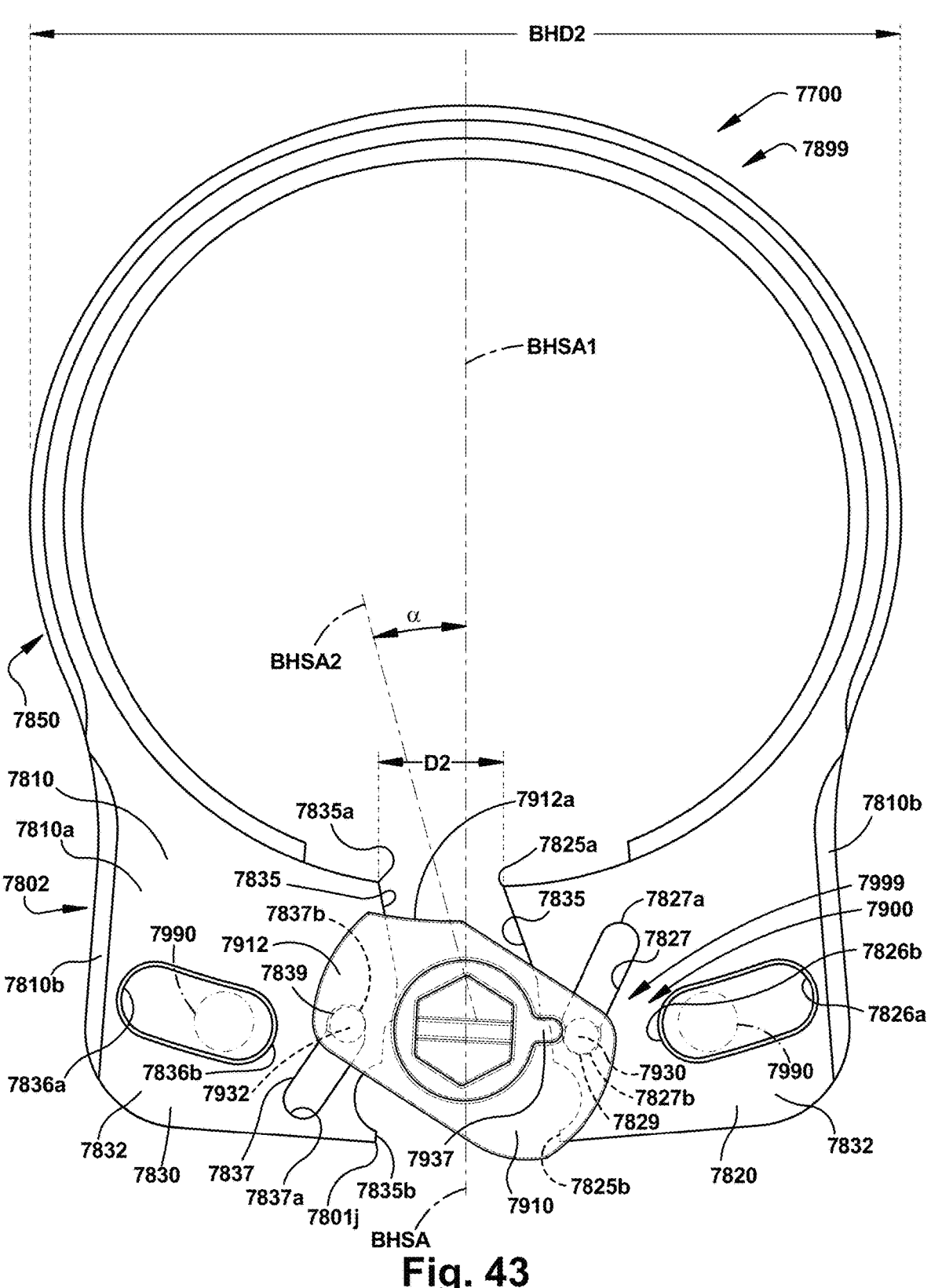
FIG. 43 is a schematic bottom plan view of the blade housing assembly of the power operated rotary knife of FIG. 26, with the cam mechanism in a second, open or unlocked position and the annular split ring blade housing in the second, blade changing position.

In a first, closed, locked or home position 7998 of the cam mechanism 7900 (shown schematically in FIGS. 40 and 42), the cam mechanism 7900 positions or secures the blade housing 7800 in the first, blade supporting position 7898, characterized by a first, unexpanded or blade supporting blade housing diameter BHD1 (depicted schematically in FIG. 42), and, in a second, open, unlocked or expanded position 7999 of the cam mechanism 7900 (shown schematically in FIGS. 41 and 43), the cam mechanism 7900 positions or secures the blade housing 7800 in a second, blade changing position 7899, characterized by a second, expanded blade housing diameter BHD2 (FIG. 43). In the first, blade supporting position 7898, as measured at the inner wall 7852 of the blade support section 7850 adjacent the split 7801*a*, there is a first width or split distance D1 (FIG. 39) between opposing faces 7825, 7835 of the first body portion 7820 and the second body portion 7830 of the central region 7811 of the mounting section 7802. In the second, blade changing support position, as measured at the inner wall 7852 of the blade support section 7850, there is a second width or split distance D2 (FIG. 43) between opposing faces 7825, 7835 of the first body portion 7820 and the second body portion 7830 of the central region 7811 of the mounting section 7802, the second split distance D2 being greater than the first split distance D1.

Figure 31:
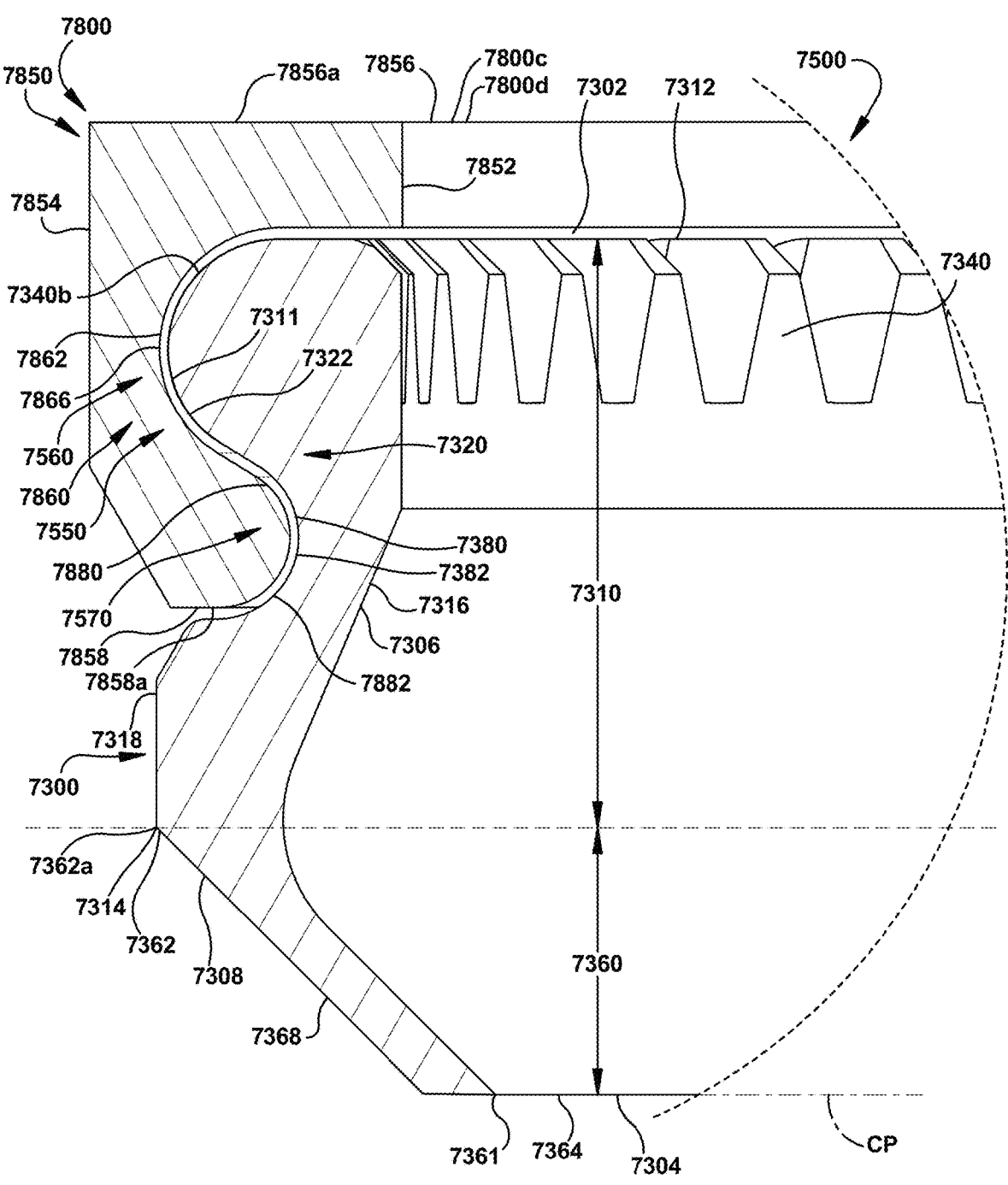
FIG. 31 is a schematic enlarged vertical section view of the power operated rotary knife of FIG. 1 which is within a circle labeled FIG. 31 in FIG. 30.

As best seen in FIG. 31, the annular rotary knife blade 7300 includes an upper body portion or upper body 7310 and a lower blade section 7360 extending from the body 7310. The annular rotary knife blade 7300 is rotatably driven by the drive mechanism 7600. The forward portion 7251 of the frame body 7250 supports the drive mechanism 7600 and positions a gear head 7614 of a pinion gear 7610 of the gear train 7604 of the drive mechanism 7600 to interface with a driven gear 7340 of the body 7310 of the rotary knife blade 7300 to thereby rotate the blade 7300 about its central axis of rotation R. As best seen in FIG. 31, an assembled blade-blade housing combination 7500, which is similar in structure and function to the assembled blade-blade housing combination 6500 of the power operated rotary knife 6000 of the sixth exemplary embodiment, includes the annular rotary knife blade 7300 and the split blade housing 7800 supporting the rotary knife blade 7300 for rotation about the annular rotary knife blade's central axis of rotation R. The assembled blade-blade housing combination 7500 includes a blade-blade housing bearing structure 7550, similar to the blade-blade housing bearing structure 2550 of the assembled blade-blade housing combination 2500 of the third exemplary embodiment of the '207 application. More specifically, the blade-blade housing bearing structure 6550 includes two axially spaced apart bearing structures, namely, a first or upper blade-blade housing bearing structure 7560 and a second or lower blade-blade housing bearing structure 7570. As used herein, the upward direction UP and downward direction DW shall be parallel to the central axis of rotation R of the rotary knife blade 7300 and in the directions shown, for example, in FIG. 29. Thus, the first blade-blade housing bearing structure 7560 is above or upward with respect to the second or lower blade-blade housing bearing structure 7570.

Various components and assemblies of the power operated rotary knife 7000 are substantially similar in structure and/or function to corresponding components and assemblies of the power operated rotary knife 6000 of the sixth exemplary embodiment, as described above, and are substantially similar in structure and/or function to corresponding components and assemblies of the power operated rotary knife 2000 of the third exemplary embodiment of the '207 application. In the interest of brevity, components and assemblies of the power operated rotary knife 7000 that are similar to the corresponding components and assemblies of the power operated rotary knife 6000 of the sixth exemplary embodiment in structure and/or function or that are similar to the corresponding components and assemblies of the power operated rotary knife 2000 of the third exemplary embodiment of the '207 application will not be fully described herein. Instead, reference is made to the description of such components and assemblies set forth above in connection with the power operated rotary knife 6000 and/or the power operated rotary knife 2000, as set forth in the '207 application. Materials/fabrication of components and assemblies of the power operated rotary knife 6000 of the sixth exemplary embodiment, as described above, are similar to materials/fabrication of corresponding components and assemblies of the power operated rotary knife 6000 and/or materials/fabrication of corresponding components and assemblies of the power operated rotary knives 100, 1000, 2000, 3000 and the blade-blade housing combination 4500, as described in the '207 application. Such descriptions of components and assemblies of the power operated rotary knife 6000 of the sixth exemplary embodiment, as described above, and the power operated rotary knives 100, 1000, 2000, 3000 and the blade-blade housing combination 4500 are hereby incorporated by reference from the '207 application in the following description of the power operated rotary knife 7000 of the seventh exemplary embodiment. Identification of axes, lines, planes and directions for the power operated rotary knife 7000, as set forth herein, will be the same as used for the description of the power operated rotary knife 6000 of the sixth exemplary embodiment and the power operated rotary knives 100, 1000, 2000, 3000 in the '207 application.

Annular Rotary Knife Blade 7300

As best seen in FIGS. 31-33, the annular rotary knife blade 7300 includes the upper body portion or upper body 7310 and the lower blade section 7360 extending from the body 7310. The blade style of the rotary knife blade 7300 is referred to as a hook blade style, contrasted with the straight blade style of the annular rotary knife blade 6300 of the sixth embodiment. Generally, differences in blade style (e.g., straight blade style, flat blade style, hook blade style and variations and combinations thereof) relate to the structure of the respective lower blade sections. While the exemplary rotary knife blade 7300 of the seventh exemplary embodiment is a hook blade style rotary knife blade, numerous other blade styles, including, but not limited to, straight and flat style blades and combinations of blade styles may be utilized, with an appropriate blade housing assembly 7700, in the power operated rotary knife 7000 of the present disclosure, as would be understood by one of skill in the art. It is the intent of the present disclosure to cover all such rotary knife blade styles and sizes and the corresponding blade housings, that may be used in the power operated rotary knife 7000.

The annular rotary knife blade 7300 is supported for rotation about the central axis of rotation R by the blade housing 7800 and the blade 7300 is generally cylindrical and extends axially between an upper end 7302 and a lower end 7304 and extends radially between an inner wall 7306 and a lower end 7308. The blade section 7360 includes a cutting edge 7361 at the lower end 7304 of the blade 7300 which defines the cutting plane CP (FIG. 30) of the rotary knife blade 7300. The cutting plane CP is substantially orthogonal to the central axis of rotation R. The blade section 7360 of the rotary knife blade 7300 includes an upper end 7362, defined by a discontinuity or knee 7362a in an outer wall 7368 of the blade section 7360, and a lower end 7364, which is coincident with the blade cutting edge 7361, the cutting plane CP and lower end 6304 of the rotary knife blade 6300.

The annular body 7310 of the blade 7300 includes the driven gear 7340 and the bearing region 7320, similar to the driven gear 6340 and bearing region 6320 of the rotary knife blade 6300 of the sixth exemplary embodiment. As best seen in FIG. 31, the body 7310 includes an upper end 7312 and an axially spaced apart lower end 7314 and an inner wall 7316 and a radially spaced apart outer wall 7318. The bearing region 7320 of the annular rotary knife blade 7300 includes a first bearing surface 7322 and an axially spaced second bearing surface 7382. The first and second bearing surfaces 7322, 7382 are both part of the outer wall 7318 of the annular rotary knife blade body 7310. The first bearing surface 7322 is defined by an upper bearing bead 7311 of the body 7310 and at least a portion of the first bearing surface 7322 is defined by an outer surface 7340b of the driven gear

7340. The second bearing surface 7382 is defined by a radially inwardly extending bearing race 7380.

Blade Housing Assembly 7700

The blade housing assembly 7700 of the head assembly 7200 of the power operated rotary knife 7000 of the seventh exemplary embodiment includes the split ring blade housing 7800 and the cam mechanism 7900 which functions to move the blade housing 7800 between the first, blade supporting position 7898 to the second, blade changing position 7899, as previously described.

The blade housing assembly 7700, while similar in function to the blade housing assembly 6700 of the head assembly 6200 of the power operated rotary knife 6000 of the sixth exemplary embodiment includes a number of structural changes to a mounting section 7802 of the split blade housing 7800 and the cam mechanism 7900 providing for various functional and operating improvements, as compared to the blade housing assembly 6700 of the power operated rotary knife 6000. Additionally, because blade housing assembly 7700 is affixed to the planar mounting pedestal 7272 of the lower surface 7270 of the forward portion 7251 of the frame body 7250, the frame body 7250 of the head assembly 7200 includes certain structural changes as compared to the frame body 6250 of the head assembly 6250 of the power operated rotary knife 6000, as described below, to accommodate certain structural features of the mounting section 7802 of the split blade housing 7800.

Blade Housing 7800

Figures 37, 38:
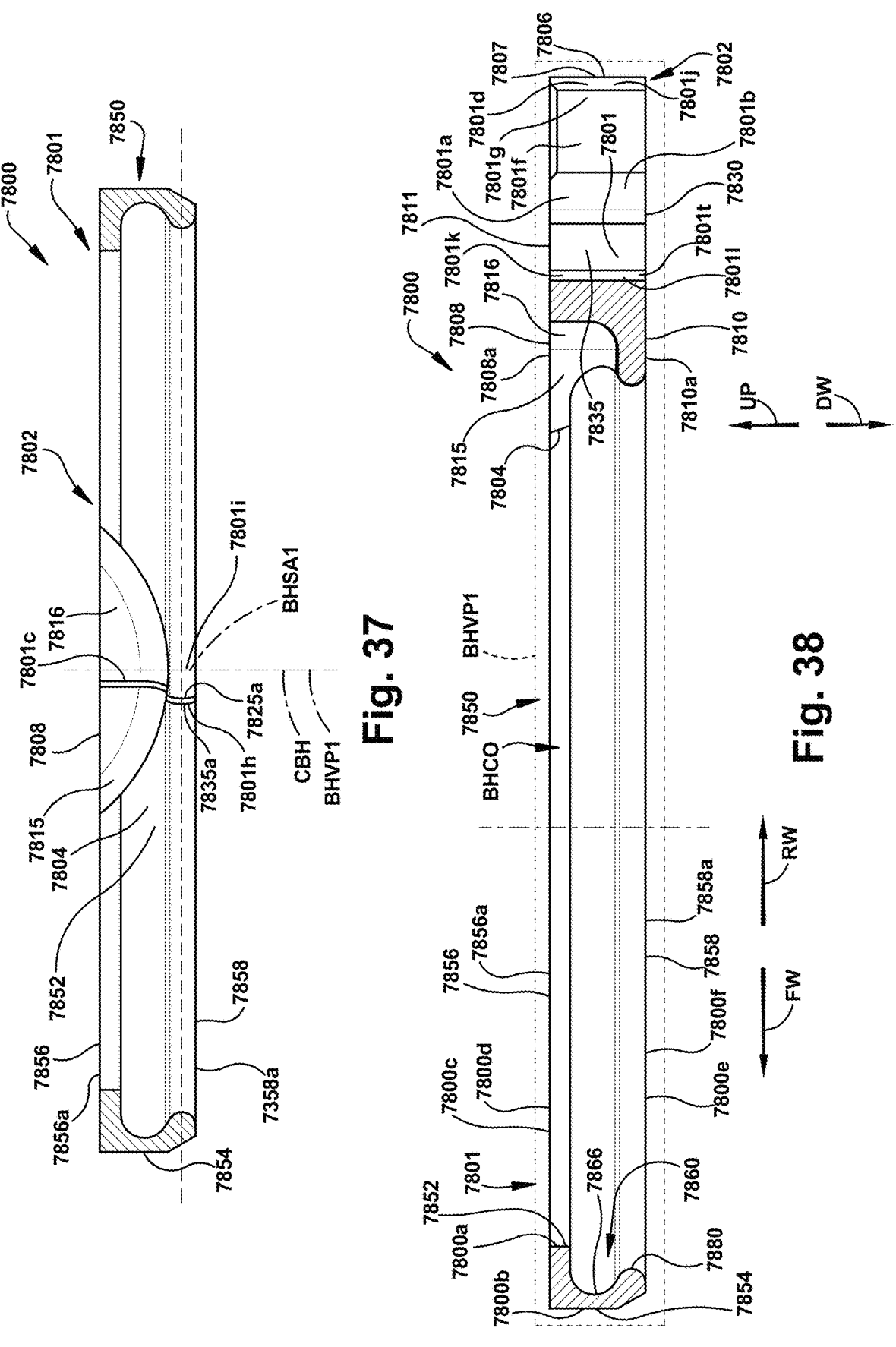
FIG. 37 is a schematic vertical section view of the annular split ring blade housing of FIG. 36, as seen from a plane indicated by the line 37-37 in FIG. 36.
FIG. 38 is a schematic longitudinal vertical section view of the annular split ring blade housing of FIG. 36, as seen from a plane indicated by the line 38-38 in FIG. 36.

The mounting section 7802 of the blade housing 7800 includes differences in the position and extent of the split 7801a, as compared to the split 6801a of the mounting section 6802 of the blade housing 6800 of the first exemplary embodiment. As discussed above, the radially extending split 6801a of the mounting section 6801 of the blade housing 6800 of the sixth exemplary embodiment which, when viewed in plan view, constituted a single split that extended substantially along a radial path or radial line between the inner and outer walls 6804, 6806 of the mounting section 6801, bisecting the first and second body portions 6820, 6830 of the blade housing mounting section 6802 and wherein the blade housing split axis BHSA of the split 6801 intersected the blade housing center line CBH. However, as best seen in FIG. 39, the split 7801a of the mounting section 7801 of the blade housing 7800 of the sixth exemplary embodiment includes the two, intersecting, non-parallel split portions 7801b, 7801c that essentially form, when viewed in plan view, a dog-leg shaped split. The split 7801a includes the first, rearward radially extending split portion 7801b, extending along a first blade split axis BHSA1, and the second, forward extending angled split portion 7801c, extending along a second angled split axis BHSA2. The first split portion 7801b extends along the first blade housing split axis BHSA1, which can be viewed as a radius line extending orthogonally from the blade housing center line CBH. The first blade housing split axis BHSA1 extends along and is centered between opposing faces 7825, 7835 of the first and second body portions 7820, 7830 of the blade housing mounting section 7802. The first blade housing split axis BHSA1 intersects and is orthogonal to the blade housing center line CBH. The first radial split axis BHSA1 of the first split portion 7801b intersects the inner wall 7852 of the blade support section 7850 at an intersection position or location 7801i. As mentioned with respect to the split 6801a of the blade housing mounting section 6802 of the blade housing 6800 of the sixth exemplary embodiment, the first blade housing split axis BHSA1 and the second blade housing split axis BHSA2 are, in reality, planes (as opposed to axis lines) that extends between opposing faces 7825, 7835 of the first and second body portions 7820, 7830 of the blade housing mounting section 7802. That is, the first split portion 7801$b$ may be considered as extending along a vertically extending, longitudinal plane BHVP1 (shown schematically in FIGS. 35, 38 and 39) of the blade housing 7800 that bisects the blade housing 7800 and specifically the central region 7811 of the blade housing mounting section 7802 and that intersects and is parallel to the blade housing center line CBH, while the second split portion 7801$c$ may be considered as extending along a vertically extending plane BHVP2 (shown schematically in FIGS. 35 and 39) that intersects and is transverse to the vertically extending, longitudinal plane BHVP1 of the blade housing 7800 and is parallel to the blade housing center line CBH. However, for sake of simplicity, reference will be made to the first and second blade housing split axes BHSA1, BHSA2.

The first split portion 7801$a$ is adjacent to and extends through an outer wall 7806 of the mounting section 7802, while the second split portion 7801$c$ is adjacent to and extends through the inner wall 7852 of the blade support section 7850 and an inner wall 7804 of the mounting section 7802. Specifically, a proximal end 7801$j$ of the first split portion 7801$a$ extends through the outer wall 7806 of the mounting section 7802 and a distal end 7801$m$ of the second split portion 7801$b$ extends through the inner wall 7852 of the blade support section 7850. The inner wall 7804 of the mounting section 7802 overlies and is coincident with the inner wall 7852 of the blade support section 7950 in the region of the mounting section 7802. Thus, the distal end 7801$m$ of the second split portion 7801$b$ similarly extends through the inner wall 7804 of the mounting section 7802.

The first split portion 7801$b$ extends between the proximal end 7801$j$ and a distal end 7801$k$ and the second split portion extends between a proximal end 78011 and the distal end 7801$m$. The distal end 7801$k$ of the first split portion 7801$b$ and the proximal end 78011 of the second split portion 7801$c$ are connected by a short angled transition region 7801$t$. Accordingly, the blade housing split 7801 may be viewed as extending along and centered about a blade housing split axis BHSA. The blade housing split axis BHSA is comprised of two intersecting axes BHSA1, BHSA2. As can best be seen in the top plan view of FIG. 36, the first, rearward radially extending split portion 7801$b$ of the split 7801$a$ extends along the first or radial split axis BHSA1. The first split axis BHSA1 extends along the radius line and the vertical longitudinal plane BHVP of the blade housing and intersects the blade housing center line CBH. The second, forward angled portion 7801$c$ of the split 7801$a$ extends along the second or linear split axis BHSA2. The second split axis BHSA2 extends along an angled line that is transverse with respect to the first split axis BHSA1. As can be seen in FIG. 36, an acute angle alpha $\alpha$ is formed between the first split axis BHSA1 of the first rearward radially extending blade housing split portion 7801$b$ of the split 7801$a$ and the second split axis BHSA2 of the second forward angled blade housing split portion 7801$c$ of the split 7801$a$. In one exemplary embodiment, when viewed in plan view, e.g. FIG. 36, the angle alpha $\alpha$ is approximately 15°.

The distal end 7801$m$ of the second split portion 7801$c$ at the inner wall 7852 of the blade support section 7850 defines the termination location 7801$h$ of the split 7801$a$. The split 7801$a$ and, more specifically, the distal portion 7801$m$ of the second split portion 7801$c$ extends though the inner wall 7804 of the mounting section 7802 and terminates at a termination location or position 7801$h$ with respect to the inner wall 7804. The termination location 7801$h$ of the second split portion 7801$c$ is circumferentially offset from the intersection location 7801$i$, that is, the circumferential location of the inner wall 7852 of the blade support section 7850 where that the first blade housing split axis BHSA of the first split portion 7801$b$ intersects the inner wall 7852 of the blade support section 7850. Recall that in the blade housing 6800 of the sixth exemplary embodiment, the split 6801$a$ extended along the blade housing split axis BHSA that in essence was a radius line that bisected the central region 6811 of the blade housing mounting section 6850 and intersected and was orthogonal to the blade housing center line CBH. As such, the blade housing split axis BHSA of the blade housing split 6801 of the blade housing 6800 of the sixth exemplary embodiment, when viewed in plan view, essentially bisected or defined a center line though the pinion gear recess 6815 and the sleeve bushing recess 7816 formed in the upper surface 6808$a$ of the upper end 7808 of the mounting section 6802. Therefore, a termination location of the split 6801$a$ was on a radius line defined by the blade housing split axis BHSA.

By contrast, in the blade housing 7800 of the seventh exemplary embodiment, the termination location 7801$h$ of the split 7801$a$ at the inner wall 7852 of the blade support section 7850 is circumferentially offset from the intersection position 7801$i$ of the first blade housing split axis BHSA1 at the inner wall 7852 of the blade support section 7850. Accordingly, as the first blade housing split axis BHSA1 of the first split portion 7801$b$ of the blade housing split 7801$a$, when viewed in plan view, bisect a pinion gear recess 7815 and a sleeve bushing recess 7816 formed in an upper surface 7808$a$ of an upper end 7808 of the mounting section 7802 of the blade housing 7800, the termination location 7801$h$ is circumferentially offset from a center line through the pinion gear recess 7815 and the sleeve bushing recess 7816.

The termination location or position 7801$h$ of the split 7801$a$ corresponds to the position of circumferential ends 7852$a$, 7852$b$ of the inner wall 7852 of the blade support section 7850. The termination location 7801$h$ of the split 7801$a$ corresponds to forward end portions 7825$a$, 7835$a$ of the facing surfaces 7825, 7835 of the first and second body portions 7820, 7830 of the blade housing mounting section 7802. When the blade housing 7800 is in the first, blade supporting position 7898, the split distance at the termination position 7801$h$ between the circumferential ends 7852$a$, 7852$b$ of the inner wall 7852 of the blade support section 7850 (and similarly between the forward end portions 7825$a$, 7835$a$ of the facing surfaces 7825, 7835) is split distance D1 and when the blade housing 7800 is in the second, blade changing position 7899, the split distance at the termination position 7801$h$ between the circumferential ends 7852$a$, 7852$b$ of the inner wall 7852 of the blade support section 7850 is split distance D2. Stated another way, in the first, blade supporting position 7898, the split width or split distance at the termination position 7801$h$ between the forward end portions 7825$a$, 7835$a$ of the facing surfaces 7825, 7835 is split distance D1 and in the second, blade changing position 7899, the split distance at the termination position 7801$h$ between the forward end portions 7825$a$, 7835$a$ of the facing surfaces 7825, 7835 is split distance D2.

As explained above, when viewed in plan view, the first blade housing split axis BHSA1 may be viewed as a center line through a circumferential extent of the pinion gear and sleeve bushing recesses 7815, 7816, that is, substantially parallel to and vertically aligned with the handle assembly longitudinal axis LA and the pinion gear axis of rotation PGR. A center line through the pinion gear recess 7815 and, more specifically, a region where the gear head 7614 of the pinion gear 7610 meshes with the driven gear 7340 of the rotary knife blade 7300 represents a gear meshing region 7817 (FIGS. 27 and 30) of the blade housing 7800. Advantageously, the circumferential offset of the termination location 7801h of the split 7801a from the intersection position 7801i defined by the first blade housing split axis BHSA1 with respect to the inner wall 7852 of the blade support section 7850 mitigates the potential migration of debris from cutting and trimming operations into the gear meshing region 7817 where the gear head 7614 of the pinion gear 7610 meshes with the driven gear 7340 of the rotary knife blade 7300. Collecting debris materials in the region 7817 of the meshing of the pinion gear 7610 and the driven gear 7340 of the rotary knife blade 7300 is undesirable because the heat generated by the driving engagement tends to "cook" the debris creating a sticky build-up on the pinion gear head 7614 and the driven gear 7340 of the rotary knife blade 7300. Such a build-up of debris may lead to increased vibration of the power operated rotary knife 7000 during operation and shorten rotary knife blade 7300 and pinion gear life, all of which are detrimental to rotary knife performance. Stated another way, the termination position 7801h of the split 7801a is advantageously: a) circumferentially offset from the region of the meshing of the pinion gear 7610 and the driven gear 7340 of the rotary knife blade 7300; b) circumferentially offset from the intersection location 7801i defined by the first blade housing split axis BHSA1 of the first split portion 7801b of the split 7801a where the first blade housing split axis BHSA1 intersects the inner wall 7852 of the blade support section 7850 and the inner wall 7804 of the mounting section 7802; c) when viewed in plan view, offset from a radius line RL (shown schematically in FIG. 36) which bisects the pinion gear and sleeve bushing recesses 7815, 7816; and d) when viewed in plan view, offset from the handle assembly longitudinal axis LA and an axis of rotation PGA of the pinion gear 7610.

Figure 34:
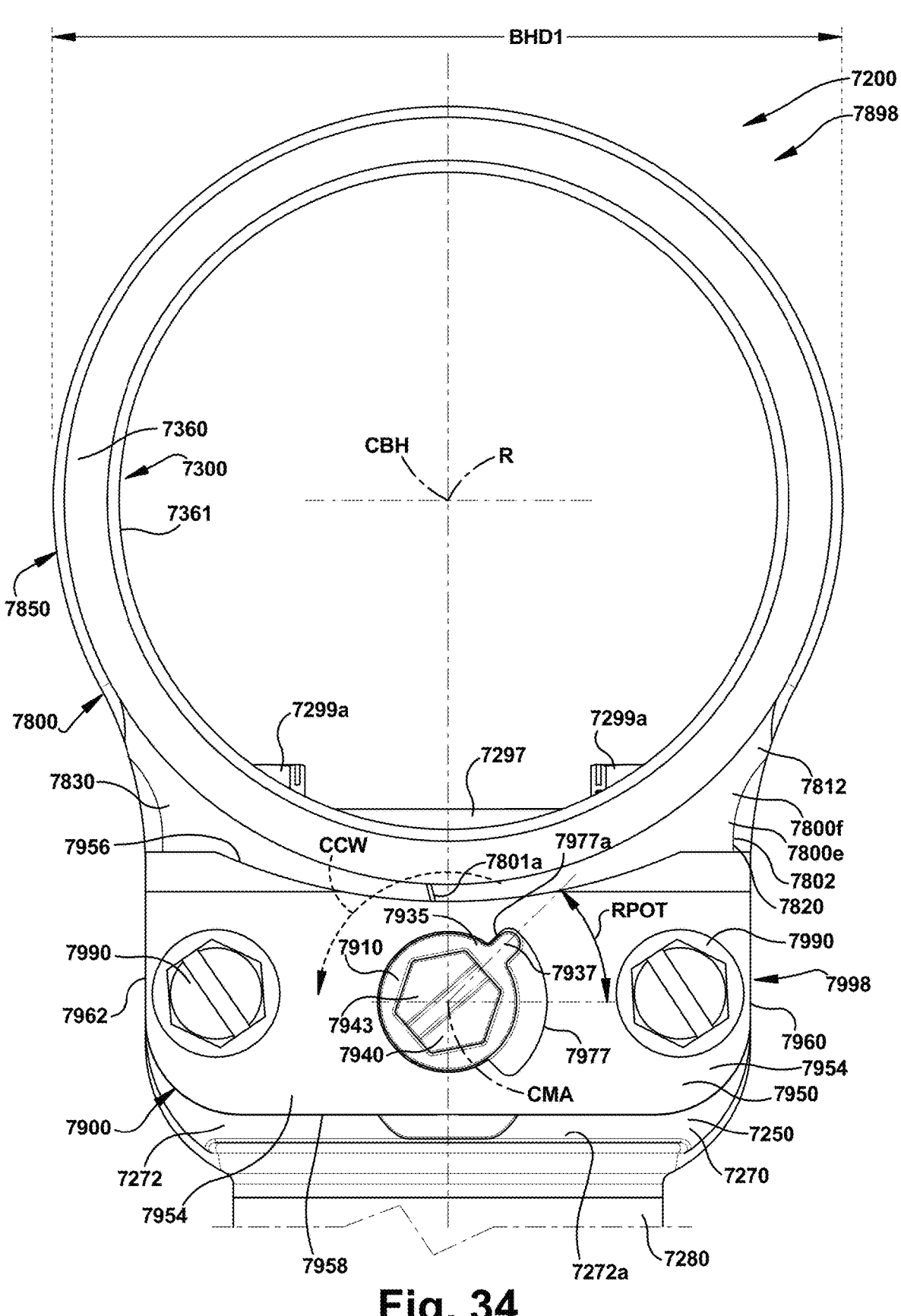
FIG. 34 is a schematic bottom plan view of the head assembly of the power operated rotary knife of FIG. 26, with the cam mechanism in a first, closed or locked position.

As best seen in FIGS. 33 and 34, the cam mechanism 7900 secures blade housing mounting section 7802 of the assembled blade-blade housing combination 7500 to the frame body mounting pedestal 7272 via a pair of threaded fasteners 7900 which extend through cam plate openings 7982a, 7882b and thread into respective threaded openings 7274 of lower surface 7270 of forward portion 7251 of the frame body 7250. The pair of fasteners 7990 pass through mounting slots 7826, 7836 of first and second body portions 7820, 7830 of the mounting section 7802 of the blade housing 7800. Essentially, the blade housing mounting section 7802 is sandwiched between the cam mechanism cam plate 7950 and the frame body mounting pedestal 7272. Additionally, as can best be seen in FIGS. 36 and 39, a rearward section 7801d of the first split portion 7801b includes a cavity 7801f adjacent the outer wall 7806 of the mounting portion or section 7802. In the region of the cavity 7801f, the distance between the facing surfaces 7825, 7835 of the first and second body portions 7820, 7830 is greater than the split distance D1, as measured at the inner wall 7852 of the blade support section 7850 adjacent the split 7801a. The cavity 7801f includes a cylindrical opening 7801g that receives a cylindrical post or cylindrical boss 7273 extending orthogonally downwardly from a planar extent of the mounting pedestal 7272 of the lower surface 7270 of the forward portion 7251 of the frame body 7250 when the assembled blade-blade housing combination 7500 is secured to the frame body 7250.

The cylindrical opening 7801g is adjacent the outer wall 7806 of the mounting portion or section 7802 and is formed in part by rearward end portions 7825b, 7835b of the facing surfaces 7825, 7835 at the outer wall 7806. The facing surface 7825 for the first body portion 7820 includes a half cylinder region 7825a and the facing surface 7835 of the second body portion 7830 includes a corresponding aligned half cylinder region 7835a, which taken together form the cylindrical opening 7801g. The cylindrical opening 7801g extends between and through the upper and lower ends 7808, 7810 of the mounting section 7802 and a central axis CACO of the cylindrical opening 7801g intersects the first blade housing split axis BHSA1 and is substantially parallel to the blade housing center line CBH. In the first, blade supporting position 7898 of the blade housing, a split distance between the rearward end portions 7825b, 7835b of the facing surfaces 7825, 7835 at the outer wall 7806 of the mounting section 7802 is greater than the split distance D1 between the forward end portions 7825a, 7835a of the facing surfaces 7825, 7835 at the inner wall 7804 of the mounting section 7802.

Figure 27:
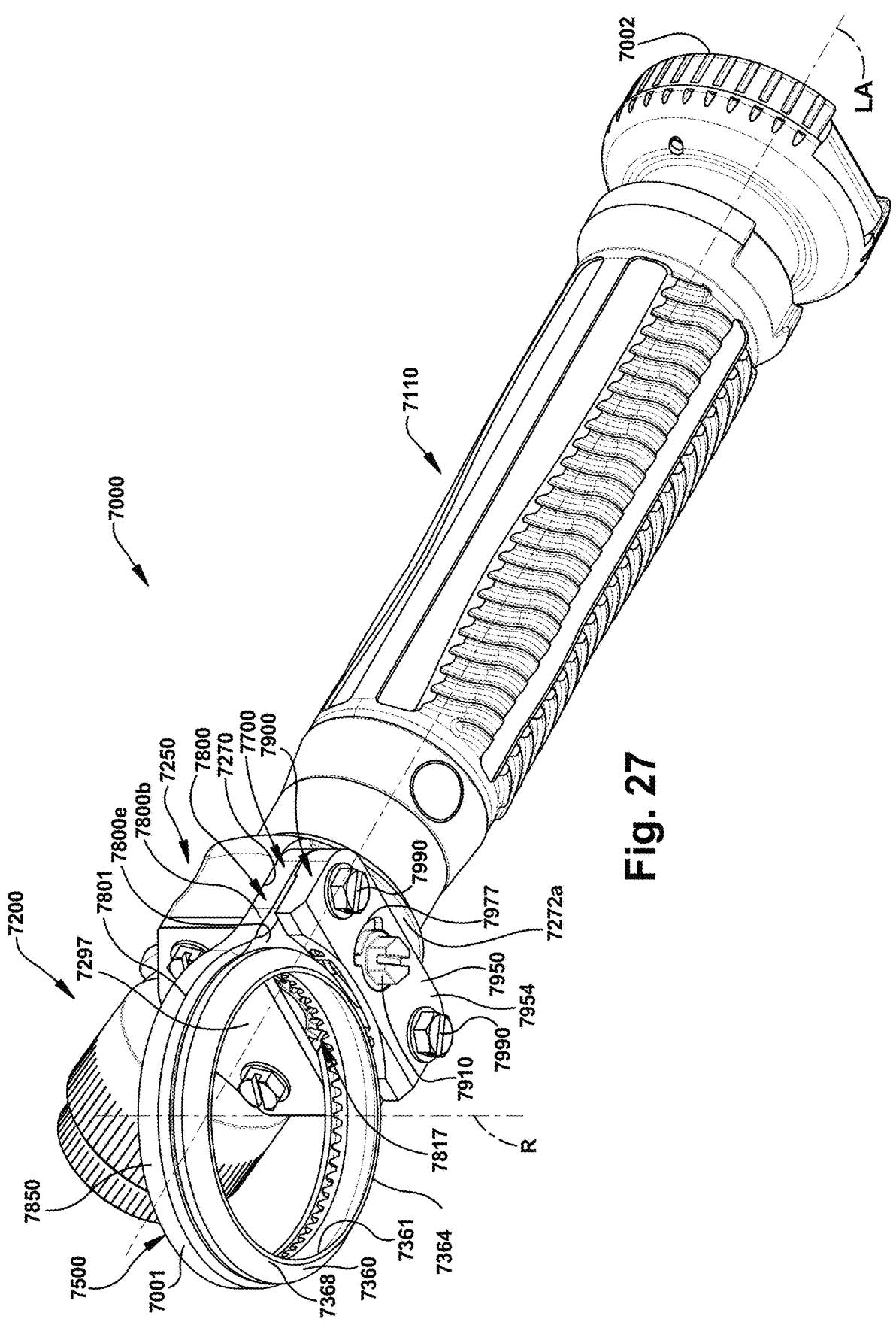
FIG. 27 is a schematic bottom, front perspective view of the power operated rotary knife of FIG. 26.
Figure 28:
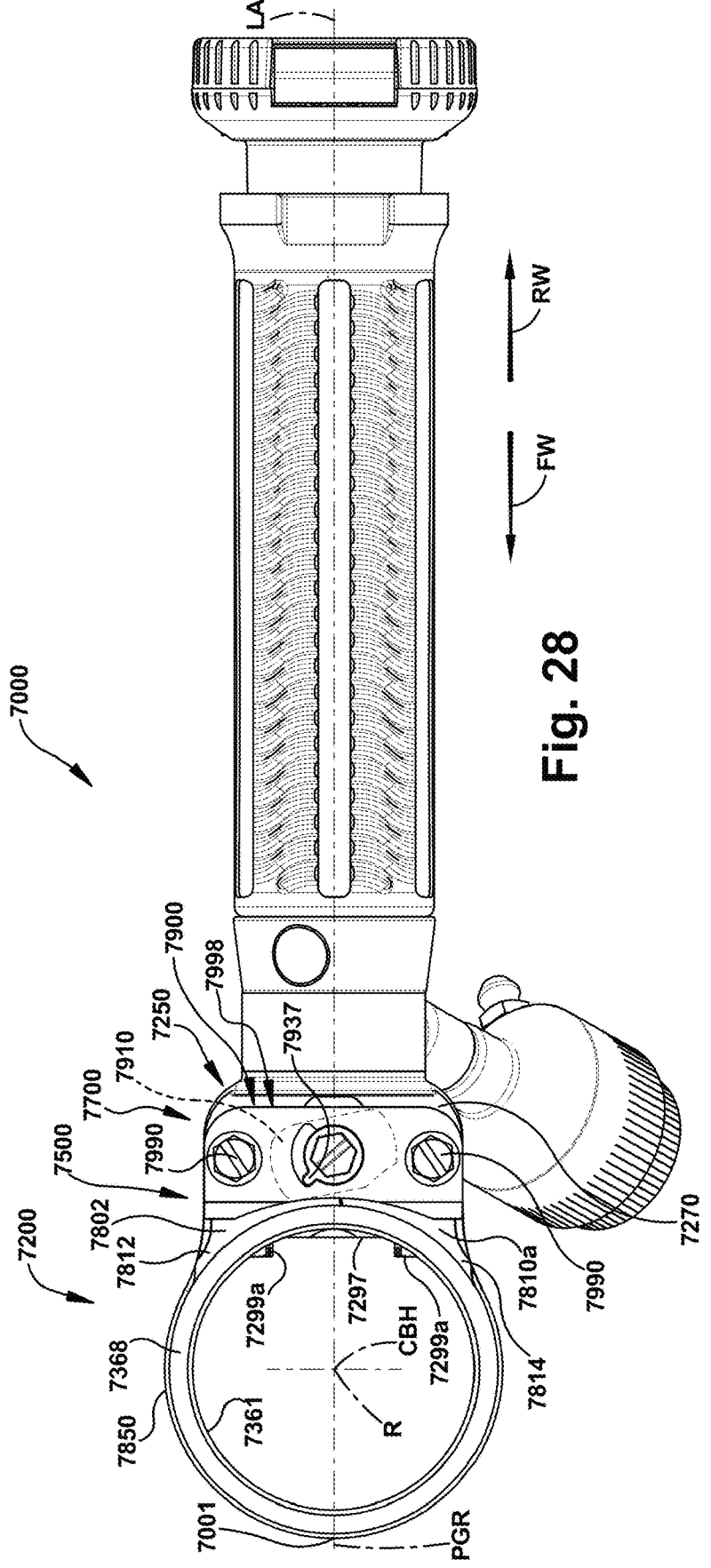
FIG. 28 is a schematic bottom plan view of the power operated rotary knife of FIG. 26.
Figure 29:
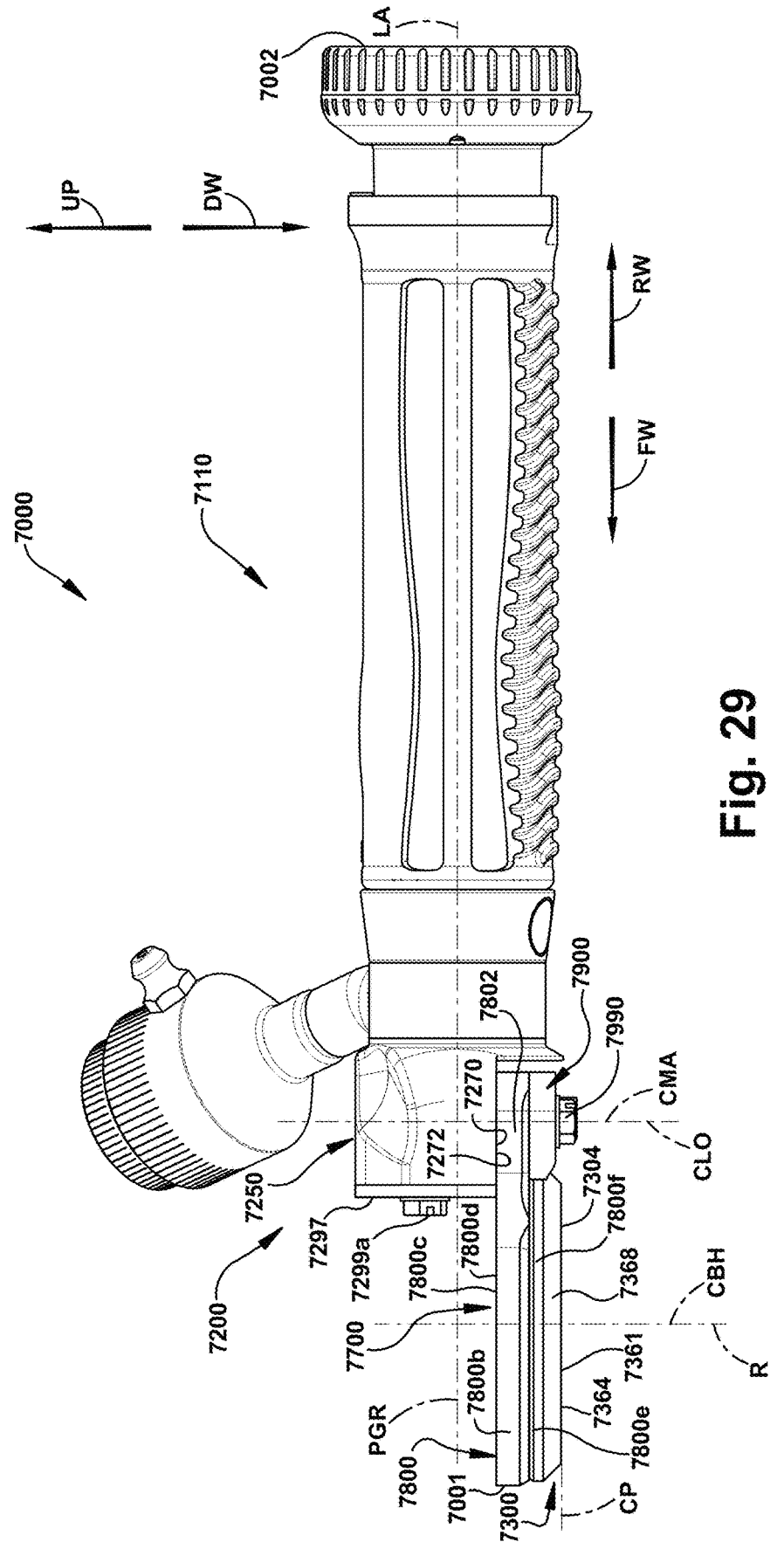
FIG. 29 is a schematic side elevation view of the power operated rotary knife of FIG. 26.
Figure 30:
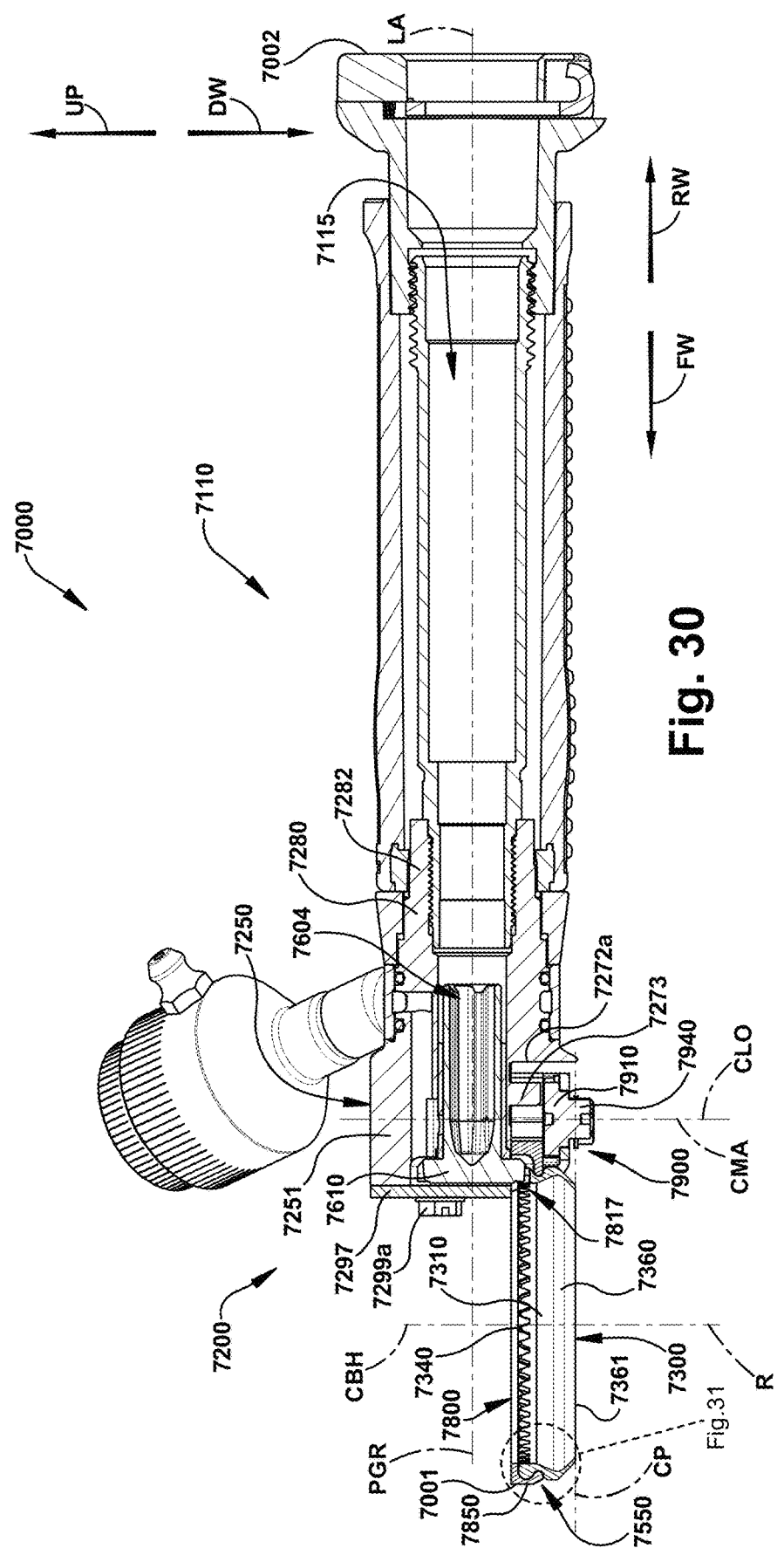
FIG. 30 is a schematic vertical section view taken along a longitudinal axis of the handle assembly of the power operated rotary knife of FIG. 26.
Figure 47:
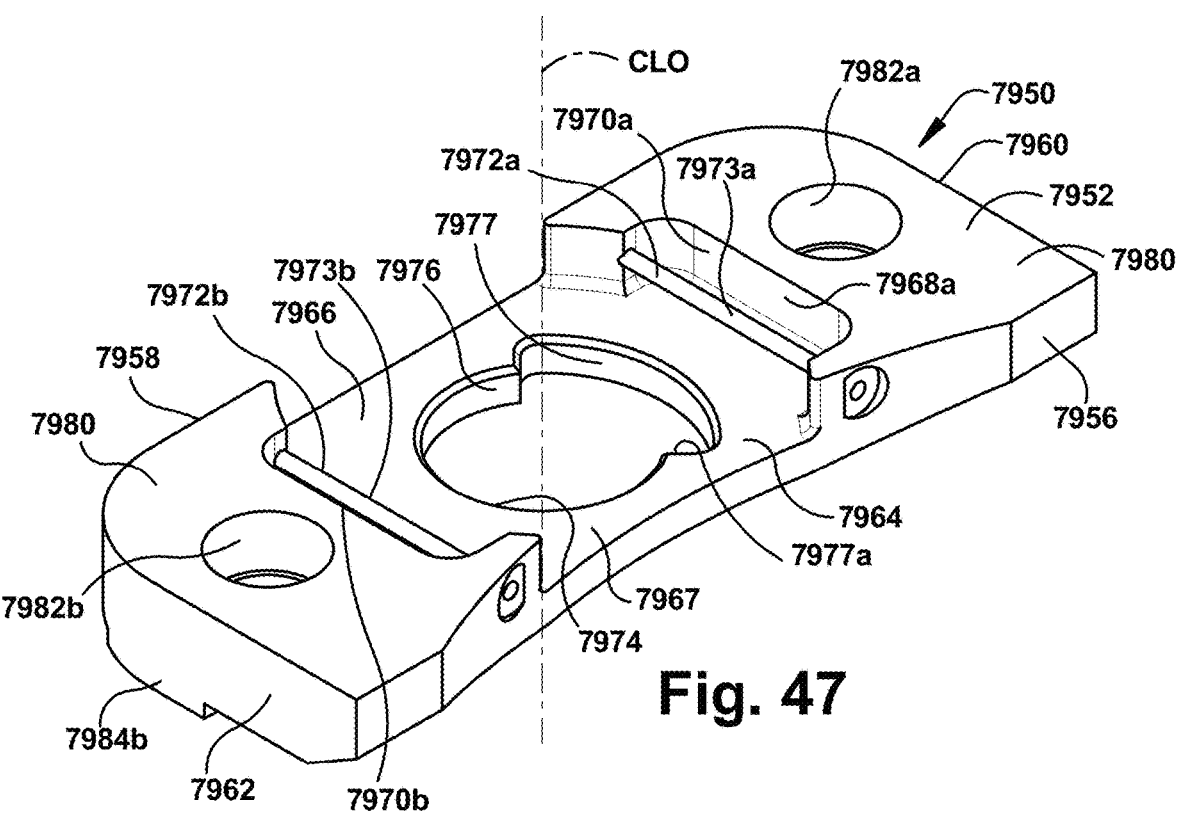
FIG. 47 is a schematic top, front perspective view of a cam plate of the cam mechanism of the blade housing assembly of the power operated rotary knife of FIG. 26.
Figure 48:
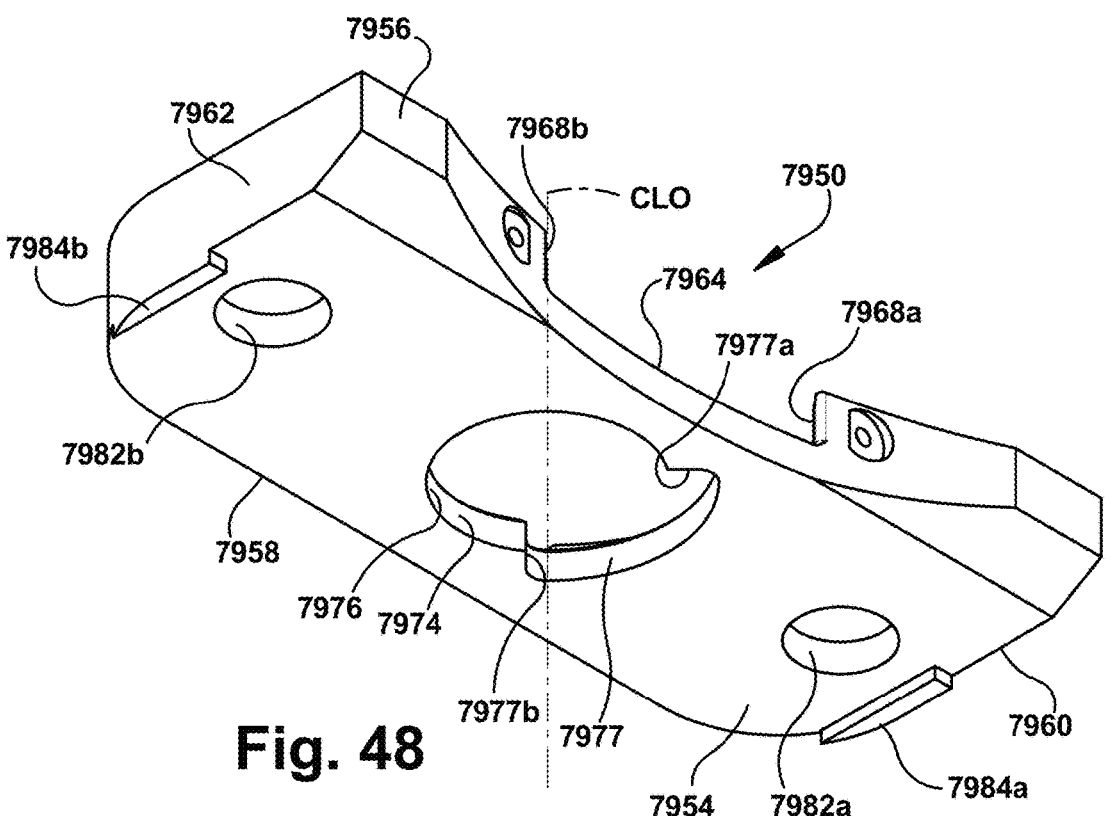
FIG. 48 is a bottom, front perspective view of the cam plate of FIG. 47.

Advantageously, the interfit of the frame body cylindrical boss 7273 and the cylindrical opening 7801g during assembly of the assembled blade-blade housing combination 7500 to the frame body 7250 insures proper alignment of the mounting section 7802 of the blade housing 7800 with respect to the frame body mounting pedestal 7272. Additionally, a cylindrical side wall 7273a of the frame body boss 7273 advantageously provides for proper circumferential alignment for the first and second body portions 7820, 7830 of the mounting section 7802 as the assembled blade-blade housing combination 7500 is secured to the frame body 7250 via the pair of threaded fasteners 7990. That is, the cylindrical side wall 7273a abuts the half cylinder region 7825a of the facing surface 7825 of the first body portion 7820 and abuts the half cylinder region 7835a of the facing surface 7835 of the second body portion 7830 thereby inhibiting the possibility of circumferential misalignment of the forward end portions 7825a, 7835a of the facing surfaces 7825, 7835 at the inner wall 7804 of the mounting section 7802. Moreover, as can best be seen in FIG. 42, a pair of longitudinally extending chamfered or angled recessed portions 7810b bridge the lower surface 7810a and the outer wall 7806 of the mounting section 7802. The first body portion 7820 of the mounting section 7802 includes one of the pair of angled recessed portions 7810b, while the second body portion 7830 includes the second of the pair of angled recessed portions 7810b. The pair of angled recessed portions 7810b of the mounting section 7802 interfit with and receive downwardly extending edges 7984a, 7984b of the cam plate 7950 (best seen in FIGS. 47 and 48). As can be seen in FIG. 27, the interfitting of the downwardly extending edges 7984a, 7984b into respective ones of the pair of angled portions 7810b insures proper alignment of the mounting section 7802 of the blade housing 7800 and the cam plate 7950, further facilitates proper alignment of the mounting section 7802 of the blade housing 7800 with respect to the frame body mounting pedestal 7272 and further mitigates the possibility of circumferential misalignment of the forward end portions 7825a, 7835a of the facing surfaces 7825, 7835 at the inner wall 7804 of the mounting section 7802.

An additional visual aid to proper alignment of the mounting section 7802 of the blade housing 7800 with respect to the frame body mounting pedestal 7272 results from the matching planar configurations a planar rearward or distal portion 7807 of the outer wall 7806 of the blade housing mounting section 7802 and the planar side wall 7272a adjacent to and extending orthogonally with respect to the planar mounting pedestal 7272 of the frame body 7250. During assembly, proper orientation of the assembled blade-blade housing combination 7500 with respect to the frame body mounting pedestal 7272 can be easily ascertained by viewing the orientation and position of the distal portion 7807 of the outer wall 7806 of the blade housing mounting section 7802 with respect to the respect to the planar side wall 7272a of the frame body 7250 adjacent the mounting pedestal 7272.

The mounting section 7802 of the blade housing 7800 includes the inner wall 6804, which overlaps and is coincident with the inner wall 7852 of the blade support section 7850 and comprises and corresponds to a portion of an inner wall 7800a of the blade housing 7800, and a radially spaced apart outer wall 7806, which defines a portion of an outer wall 7800b of the blade housing 7800, and the upper end 7808, which defines a portion of an upper end 7800c of the blade housing 7800, and an axially spaced apart lower end 7810, which defines a portion of a lower end 7800e of the blade housing 7800. The upper end 7808 of the mounting section 7802 defines the generally planar upper surface 7808a. An upper end 7856 (defining an upper planar surface 7856a) of the blade support section 7850 and the upper end 7808 (defining the upper planar surface 7808a) of the mounting section 7802 are advantageously coplanar with and together form the planar upper surface 7800d of the blade housing 7800. As noted above, there are first and second arcuate recesses 7815, 7816 formed in the planar upper surface 7808a of the upper end 7808 adjacent the inner wall 7800a of the blade housing 7800. The first arcuate recess 7815 provides clearance for the gear head 7624 of the pinion gear 7610 such that the pinion gear head 7624 is positioned to engage the mating driven gear 7340 of the rotary knife blade 7300 and the second, shallower arcuate recess 7816 is positioned radially outwardly from and aligned with the first arcuate recess 7815 and provides clearance for the sleeve bushing 7630 that supports the pinion gear 6610 for rotation about the pinion gear axis of rotation PGR.

The first body portion 7820 of the blade housing central region 7811 includes a generally planar upper surface 7821, an axially spaced apart, generally planar lower surface 7822. Because the split 7801a has a dog-leg configuration when viewed in plan view because of second forwardly extending angled split portion 7801c, the first body portion 7820 is larger than the second body portion 7830 and the first and second body portions 7820, 7830 are not symmetric about the split 7801a, as was the case in the first and second body portions 6820, 6830 of the blade housing 6800 of the sixth exemplary embodiment. The first body portion 7820 also includes an inner surface 7823 forming part of: a) the inner wall 7800a of the blade housing 7800; b) the inner wall 7804 of the mounting section 7802; and c) the coincident inner wall 7852 of the blade support section 7850, and an outer surface 7824 forming part of: a) the outer wall 7800b of the blade housing 7800; and b) the outer wall 7806 of the mounting section 7802. The second body portion 7830 of the blade housing central region 7811 includes a generally planar upper surface 7831, an axially spaced apart, generally planar lower surface 7832. The second body portion 7830 also includes an inner surface 7833 forming part of: a) the inner wall 7800a of the blade housing 7800; b) the inner wall 7804 of the mounting section 7802; and c) the coincident inner wall 7852 of the blade support section 7850, and an outer surface 7834 forming part of: a) the outer wall 7800b of the blade housing 7800; and b) the outer wall 7806 of the mounting section 7802.

As can be seen in FIG. 36, the first body portion 7820 includes the generally oval shaped first mounting slot 7826 extending between and through the upper and lower surfaces 7821, 7822, while the second body portion 7830 includes the generally oval second mounting slot 7836 extending between and through the upper and lower surfaces 7831, 7832. Unthreaded shaft portions 7992 of the pair of threaded fasteners 7990 of the cam mechanism 7900 pass through the respective mounting slots 7826, 7836 of first and second body portions 7820, 7830 of the central region 7811 of the mounting section 7802 of the blade housing 7800. As can be seen in FIGS. 27-29 and 33, the unthreaded shaft portions 7992 of the pair of threaded fasteners 7990 are captured in respective cam plate openings 7982a, 7982b of the cam plate 7950 and the enlarged heads 7991 of the pair of fasteners 7990 bear against the cam plate 7950. The unthreaded shaft portions 7992 of the pair of threaded fasteners 7990 pass through the respective mounting slots 7826, 7836 of first and second body portions 7820, 7830 and the threaded end portions 7993 of the pair of fasteners 7990 then thread into respective threaded openings 7274 of the planar mount pedestal 7272 of the lower surface 7270 of the fame body 7250 to secure the blade housing 7800 to the frame body 7250. An upper surface 7952 of the cam plate 7950 bears against the planar lower surface 7810a of the blade housing mounting section 7802, specifically, the planar lower surfaces 7822, 7832 of the first and second body portions 7820, 7830 of the blade housing mounting section 7802, to urge the planar upper surface 7808a of the mounting section 7802 against the planar mounting pedestal 7272 of the lower surface 7270 of the fame body 7250 and secure the blade housing 7800 to the frame body 7250.

Figure 35:
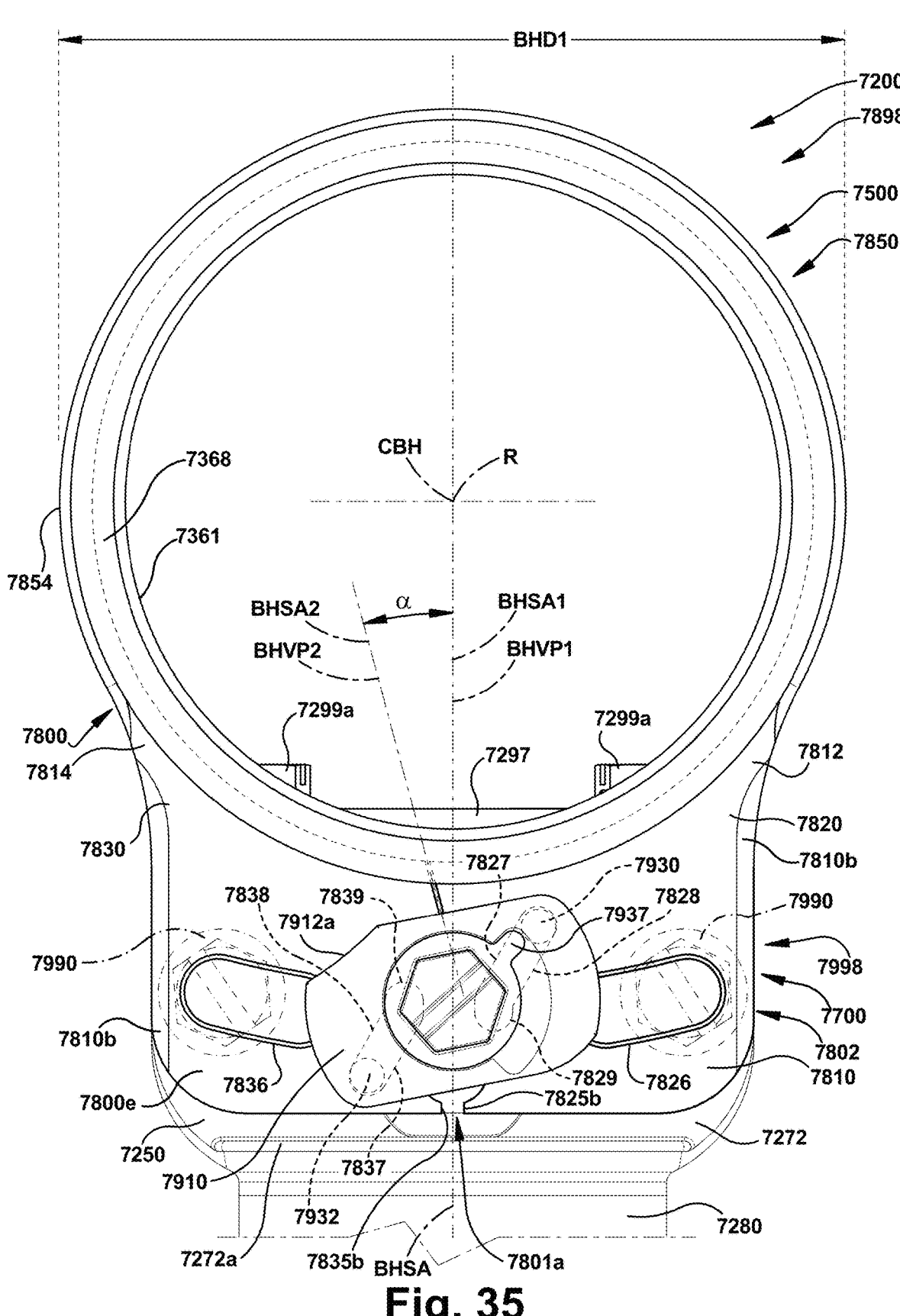
FIG. 35 is a schematic bottom plan view of the head assembly of FIG. 34 with a cam plate of the cam mechanism being removed.

As can best be seen in FIGS. 33 and 35, the lower surface 7822 of the first body portion 7820 includes a first cam slot 7827 which receives and constrains a first cam pin 7930 of the cam member 7910 of the cam mechanism 7900. The first cam slot 7827 includes a first end portion 7827a and a second end portion 7827b that is closer to the first split portion 7801c. As depicted schematically in FIGS. 35 and 42, the first cam slot 7827 includes a linear portion 7828 defining a linear path of travel 7828a for the first cam pin 7930 and an offset catch portion 7829. The first cam slot 7827 is transverse to the first blade housing split axis BHSA1 and the second blade housing split axis BHSA2 and, if extended along the linear path of travel 7828a, would intersect the blade housing split 7801a and the first and second blade housing split axes BHSA1, BHSA2. The lower surface 7832 of the second body portion 7830 includes a second cam slot 7837 which receives and constrains a second cam pin 7932 of the cam member 7910 of the cam mechanism 7900. The second cam slot 7837 includes a first end portion 7837a and a second end portion 7837b that is closer to the split 7801a. The second cam slot 7837 includes a linear portion 7838 defining a linear path of travel 7838a for the second cam pin 7930 and an offset catch portion 7829. The second cam slot 7827 is transverse to the first blade housing split axis BHSA1 and the second blade housing split axis BHSA2 and, if extended along the linear path of travel 7838a, would intersect the blade housing split 7801a and the first and second blade housing split axes BHSA1, BHSA2.

As is schematically depicted in FIG. 42, in the first, closed position 7998 of the cam mechanism 7900, the first cam pin 7930 is positioned or located nearer the first end portion 7827a of the first cam slot 7827 and the second cam pin 7932 is positioned or located nearer the first end portion 7837a of the second cam slot 7837. In one exemplary embodiment, the first cam pin 7930 is positioned at the first end portion 7827a of the first cam slot 7827 and the second cam pin 7932 is positioned at the first end portion 7837a of the second cam slot 7837. Also, in the first, closed position 7998 of the cam mechanism 7900, the unthreaded shaft portions 7992 of the pair of fasteners 7990 are positioned in proximity to or adjacent respective first ends 7826a, 7836a of the blade housing mounting slots 7826, 7836. As the cam member 7910 is rotated to the second, open position 7999, the first and second cam pins 7930, 7932 move or translate within their respective first and second cam slots 7827, 7837 along the respective linear paths of travel 7928a, 7938a to positions or locations nearer the respective second end portions 7827b, 7837b of the cam slots 7827, 7837, coming to rest in the respective offset catch portions 7829, 7839. This movement or translation of the first and second cam pins 7930, 7932 within their respective first and second cam slots 7827, 7837 from the respective first end portions 7827a, 7837a to the respective second end portions 7827b, 7837b forces, by camming action, an expansion of the blade housing diameter from the unexpanded blade housing diameter BHD1, corresponding to the first, blade supporting position 7898 of the blade housing 7800, to the expanded blade housing diameter BHD2, corresponding to the second, blade changing position 7899 of the blade housing 7800, allowing for easy removal of the annular rotary knife blade 7300 from the blade housing blade support section 7850. Further, as the first and second body portions 7820, 7830 of the blade housing mounting section 7802 move apart or spreads circumferentially along the blade housing split 7801a such that the blade housing diameter moves from the unexpanded blade housing diameter BHD1 to the expanded blade housing diameter BHD2, the unthreaded shaft portions 7992 of the pair of fasteners 7990 are now in proximity to or adjacent respective second ends 7826b, 7836b of the blade housing mounting slots 7826, 7836.

Conversely, as schematically depicted in FIG. 44, as the cam member 7910 is rotated from the second, open position 7999 to the first, closed position 7998, the first and second cam pins 7930, 7932 move or translate within their respective first and second cam slots 7827, 7837 along the respective linear paths of travel 7928a, 7938a to positions nearer the respective first end portions 7827a, 7837a. This movement or translation of the first and second cam pins 7930, 7932 within their respective first and second cam slots 7827, 7837 from the respective second end portions 7827b, 7837b to the respective first end portions 7827a, 7837a allows the blade housing 7800, which is resiliently deformable and has the unexpanded blade housing diameter BHD1 as its natural, undeformed condition, by camming action, to return from the expanded blade housing diameter BHD2 to the unexpanded blade housing diameter BHD1. Further, as the blade housing mounting section 7802 moves circumferentially to return to its unexpanded blade housing diameter BHD1, the unthreaded shaft portions 7992 of the pair of fasteners 7990 are once again in proximity to or adjacent respective first ends 7826a, 7836a of the blade housing mounting slots 7826, 7836. Further, as explained above with respect to the cam mechanism 6900 of the sixth exemplary embodiment, since the cam member 7910 is always set at the specific predetermined rotational orientation with respect to the cam plate 7950 and the blade housing mounting section 7802, the position of the cam member pins 7930, 7932 of the cam member 7910 are set a specific, predetermined and repeatable locations within their respective cam slots 7827, 7837. That is, because of the bearing of central portions 7973a, 7973b of the retainer springs 7972a, 7972b in the first, closed position 7998 of the blade housing 7800 against respective flat areas 7924a, 7924b of the cam member 7910, the position or location of the cam member pin 7930 at the first end 7827b of the cam slot 7827 of the first body portion 7920 of the blade housing mounting section or portion 7802 and the position of the cam member pin 7932 at the first end 7837b of the cam slot 7837 of the first body portion 7930 of the blade housing mounting section 7802 is set precisely, consistently and reproducibly each time the cam member 7910 is rotated to the first, closed position 7999. The precise and reproducible positioning of the cam member pins 7930, 7932 within their respective cam slots 7927, 7937 resulting from the engagement of the cam plate retainer springs 7972a, 7972b against the respective planar or flat areas 7924a, 7925b of the recessed regions 7920a, 7920b of the side wall 7918 of the cam member 7910 when the blade housing 7800 is in the first, blade supporting position 7898 functions to move the mounting section 7802 of the blade housing 7800 into the same position or configuration every time the cam member 7910 is rotated to its first, closed position 7998.

The blade support section 7850 of the blade housing 7800 is similar and function to the blade support section 6850 of the blade housing 6800 of the sixth exemplary embodiment. The inner wall 7852 of the blade support section 7850 defines the bearing region 7860 of the blade housing 7800. The bearing region 7860 of the blade support section 7850 includes a bearing race 7866 comprising the arcuate first bearing surface 7862 and a bearing bead 7880 comprising a second bearing surface 7882 of the bearing region 7860. The bearing region 7860 of the blade housing 7800 engages a bearing region 7320 of the body 7310 of the rotary knife blade 7300 to support the blade 7300 for rotation about the central axis of rotation R. The inner wall 7852 of the blade support section 7850 defines a blade housing central opening BHCO (FIG. 36) and is centered about and defines the blade housing center line CBH. The blade housing center line CBH, in the first, blade supporting position 7898 of the blade housing 7800, is substantially coincident with the blade central axis of rotation R. In the second, blade changing position 7899 of the blade housing 7800, the inner wall 7852 of the blade support section 6850 takes on a very slight oval or egg-shaped configuration because of the larger split distance D2.

In one exemplary embodiment, the thickness or depth of the blade housing 7800 is substantially uniform (ignoring the pinion gear and sleeve bushing recesses 7815, 7816 and the first and second cam slots 7827, 7837) along the entirety of the blade housing 7800 and is approximately 0.21 in. In one exemplary embodiment, a longitudinal extent of the mounting section 7802, as measured along the first blade housing split axis BHSA1, is approximately 0.53 in. A total width of the central region of the mounting section 7802, in the blade supporting position 7898 of the blade housing 7800, in one exemplary embodiment, is approximately 1.59 in. In one exemplary embodiment, the blade housing split distance D1 corresponding to the first, blade supporting position 7898 of the blade housing 7800, as measured at the inner wall 7852 of the blade support section 7850 in a direction parallel to the first blade housing split axis BHSA1 and the radius line RL and as shown in FIG. 36, is approximately 0.01 in., while the blade housing split distance D2 corresponding to the second, blade changing position 7899 of the blade housing 7800 is approximately 0.36 in. (FIG.

43). As best seen in the plan view of FIGS. 36 and 39, it should be understood that a split perpendicular width or split width, as measured orthogonally or perpendicularly with respect to the split axis BHSA between opposing faces 7825, 7835 will vary in other portions of the split 7801a. For example, in the first radial split portion 7801b, as measured orthogonally with respect to the first split axis BHSA1, the split perpendicular width between opposing faces 7825, 7835 is variable in moving along the first split axis BHSA1 from the rearward portion 7801d to the forward portion 7801e of the first radial split portion 7801b. In the second angled split portion 7801c, a split perpendicular width or split width, as measured orthogonally or perpendicularly with respect to the second split axis BHSA2, between opposing faces 7825, 7835 is both small and substantially constant or uniform in moving along the second split axis BHSA2 from the rearward portion 78011 to the forward portion 7801m of the second angled split portion 7801c. The annular rotary knife blade 7300, when viewed in top plan view (e.g., FIG. 36), rotates in a counterclockwise direction. Advantageously, in the blade supporting position 7898 of the blade housing 7800 and given the rotational direction of the rotary knife blade 7300: a) the small value of the split distance D1 at the inner wall 7852 of the blade support section 7850; b) the small and constant value of the split width of the second, angled split portion 7801c between opposing faces 7825, 7835; and c) the angled orientation of the second, angled split portion 7801c as it extends though the blade support section inner wall 7852, combine to inhibit the entry of debris (resulting from cutting and trimming operations) into the second, angled split portion 7801c at the termination location 7801h and mitigate potential migration of debris rearwardly along the split 7801a. In one exemplary embodiment, the blade housing outer diameter BHD1 corresponding to the first, blade supporting position 7898 of the blade housing 6800 is approximately 2.08 in., while the blade housing outer diameter BHD2 corresponding to the second, blade changing position 7899 of the blade housing is approximately 2.17 in. As noted previously, it is understood, that these dimensions will necessarily change based on the size and configuration, characteristics and parameters of the rotary knife blade to be supported by the blade housing, the blade-blade housing bearing structure, and other parameters and characteristics of the power operated rotary knife 7000 and components thereof.

Cam Mechanism 7900

As best seen in FIGS. 40-41 and 44-48, the cam mechanism 7900 includes a cam member 7910 and a cam plate 7950 that support the cam member 7910 for rotation about a cam member axis of rotation CMA, which is substantially parallel to the blade housing center line CBH. As noted previously, advantageously, the cam mechanism 7900 functions both to: a) secure the assembled blade-blade housing combination 7500 to the frame body 7250; and b) as desired, allows an operator or maintenance person to selectively change the diameter of the blade support section 7850 of the blade housing 7800 between the first, unexpanded blade housing diameter BHD1 (for purposes of supporting the rotary knife blade 7300 for rotation about the central axis of rotation R during use of the power operated rotary knife 7000) and the second, expanded blade housing diameter BHD2 (for purposes of removing the rotary knife blade 7300 from the blade housing 7800 for purposes of sharpening, blade changing, cleaning and/or maintenance of the power operated rotary knife 7000).

As compared to the cam mechanism 6900 of the blade housing assembly 6700, the cam mechanism 7900 of the blade housing assembly 7700 has changes to both the cam member 7910 and the cam plate 7950. The cam mechanism 7900 is intended to be used with a range of split blade housings sizes and a range of rotary knife blade housing sizes. That is, the same cam mechanism 7900 may be utilized with smaller diameter split blade housings suitable for rotatably supporting rotary knife blades that are of smaller diameter, e.g., 2 inches in outer diameter, as well as utilized with larger diameter split blade housings suitable for rotatably supporting rotary knife blades that are of larger diameter, e.g., 7 inches in outer diameter. Specifically, with respect to the cam member 7910, the cam member 7910 comprises a generally rectangular base 7912 defined by a side wall 7918 and generally planar upper and lower surfaces 7914, 7916. In the rectangular base 6912 of the cam member 7910, each of the four corners formed by the side wall 6918 were substantially identical, rounded corners. However, to provide additional clearance necessary for use of the cam mechanism with larger diameter rotary knife blades and corresponding larger diameter blade housings, a corner region 7912a of the rectangular base 7912 is truncated or angled, as best seen in FIGS. 35, 42 and 43 thereby providing for additional clearance between the truncated corner region 7912a and the rotary knife blade 7300 when the cam member 7910 is rotated to the second, unlocked position 7999 of the cam mechanism 7900.

Additionally, to improve manufacturing efficiency and manufacturability of the cam mechanism 7900, in the cam mechanism 7900 of the seventh exemplary embodiment, the rotation limitation tab 7937 is formed on the cam member 7910 and the interfitting arcuate slot 7977 which receives the tab 7937 is formed on the cam plate 7950. In the cam mechanism 6900 of the sixth exemplary embodiment, the tab 6978 of the cam plate 6950 extended into the arcuate notch 6938 of the boss 6934 of the cam member 6910. Thus, an arcuate or rotational path of travel RPOT of the cam member 6920 with respect to the cam plate 6950 was necessarily limited by the arcuate or circumferential extent of the arcuate notch 6938. In the cam mechanism, the same rotation limitation functionality exits, however, manufacturing efficiency favors fabrication of the rotation limitation tab 7937 on the cam member 7910 and fabrication of the arcuate slot 7977 on the cam plate 7950, as described below.

Figure 41:
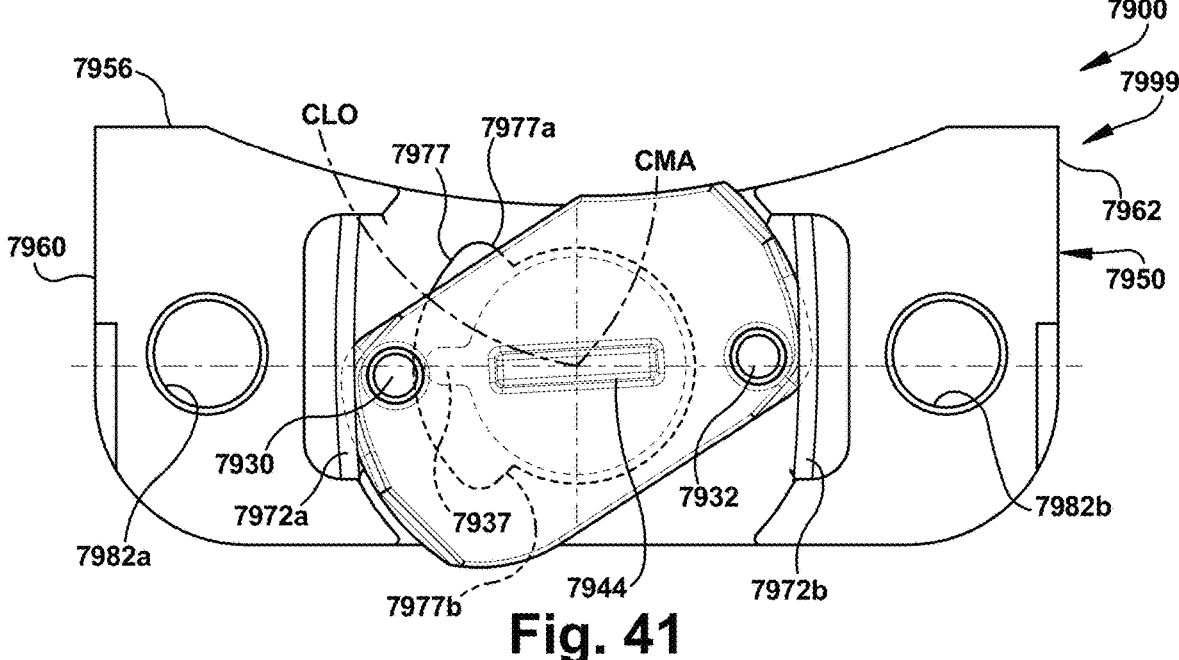
FIG. 41 is a schematic top plan view of the cam mechanism of the blade housing assembly of the power operated rotary knife of FIG. 26, with the cam mechanism in a second, open or unlocked position.

As best seen in FIGS. 39 and 41, the cam plate 7950 of the cam mechanism 7900 is generally rectangular in plan view and includes an upper surface 7952 and a spaced apart generally planar lower surface 7954. The upper and lower surfaces 7952, 7954 are spaced apart by a front side 7956, facing toward the annular rotary knife blade 7300, and a back side 7958, facing toward the handle assembly 7110. Extending between the front and back sides 7956, 7958 of the cam plate 7950 are first and second lateral sides 7960, 7962. The upper surface 7952 of the cam plate 7950 includes generally rectangular recess 7964 that receives and supports the cam member 7910. Positioned on either side of the recess 7964 are flanking portions 7980 of the cam plate 7950 that extend a full width or distance between the upper and lower surfaces 7952, 7954. The upper surface recess 7964 defines a seating region 7966 for the cam member 7910. The recess 7964 extends through the front and back sides 7956, 7958 of the cam plate 7950. The recess 7964 is defined by a planar lower wall 7967 and two side walls 7968a, 7968b that extend from the front side 7956 to the back side 7958 of the cam plate 7950. The planar lower wall 7967 of the recess 7964 is generally parallel to and intermediate between the upper and lower surfaces 7952, 7954 of the cam plate. A centrally located opening 7974 extends through lower surface 7954 of the cam plate 7950 and intersects the recess 7964, passing though the planar lower wall 7967 of the recess 7964. As explained above and as best seen in FIGS. 47 and 48, the lower surface 7954 of the cam plate 7950 adjacent the lateral sides 7960, 7962 includes downwardly extending edges 7984a, 7984b which interfit into respective angled recessed portions 7810b of the blade housing mounting section 7802.

As best seen in FIGS. 44-46, the cam member 7910 includes a generally rectangular base 7912 having a generally planar upper surface 7914 and a generally planar lower surface 7916 separated by the circumferentially extending side wall 7918. The upper surface 7914 includes a slot 7944 which aids in the assembly of the cam mechanism 7900 by allowing for easy rotation of the cam member 7910 during assembly. A pair of opposite, diagonally spaced apart portions 7919a, 7919b of the side wall 7918 include recessed regions 7920a, 7920b. The recessed regions 7920a, 7920b define respective ledges 7922a, 7922b which receive and bear against the pair of retainer springs 7972a, 7972b of the cam plate 7950 to maintain the cam member 7910 within the recess 7964 of the cam plate 7950 as the cam member 7910 is rotated between its first and second positions 7998, 7999. The recessed regions 7920a, 7920b of the side wall 7918 of the cam member base 7912 also include respective planar or flat areas 7924a, 7924b. The planar or flat areas 7924a, 7924b of the side wall 7918 are spaced 180° apart as viewed in bottom plan view (FIG. 41), are substantially parallel and equidistant from the cam member axis of rotation CMA, and are located near respective end portions of the recessed regions 7920a, 7920b. Advantageously, in the first, closed position 7998 of blade housing 7800, the planar or flat areas 7924a, 7924b bear against respective ones of the pair of retainer springs 7972a, 7972b of the cam plate 7950 set in outwardly bowed portions 7970a, 7970b of the side walls 7968a, 7968b of the recess 7964 in the upper surface 7952 of the cam plate 7950. As noted previously, as the cam member 7910 is rotated about the cam member axis of rotation CMA to the first, closed position 7999 (show schematically in FIG. 40), the bearing of the flat areas 7924a, 7924b of the side wall 7918 of the cam member 7910 against the retainer springs 7972a, 7972b causes the cam member 7910 to be set at a specific precise and repeatable rotational orientation and, therefore, the mounting section 7802 of the blade housing 7800 is precisely and repeatably moved to the same position or configuration in the first, blade supporting position 7898 such that the split distance at the termination position 7801h is split distance D1.

As can be seen in FIG. 44-48, the central opening 7974 of the recess 7964 of the cam plate 7950 receives an upper cylindrical portion 7935 of a downwardly extending boss 7934 of the cam member 7910. A center line CLO through the central opening 7974 defines and is coincident with the cam member axis of rotation CMA. An inner wall 7976 defines the central opening 6974 of the cam plate 7950 and includes an arcuate notch 7977. The cam member 7910 includes a radially outwardly extending rotation limitation tab 7937 that interfits within the arcuate notch 7977 of the inner wall 7976 to limit rotation of the cam member 7910 with respect to the cam plate 7950. Specifically, the upper cylindrical portion 7935 of the downwardly extending boss 7934 of the cam member 7910 includes the radially outwardly extending rotation limitation tab 7937.

Advantageously, the rotation limitation tab 7937 of the cam member 7910 is received in the cut out or arcuate notch 7977 in the inner wall 7976 of the cam plate 7950 to limit rotation of the cam member 6910 with respect to the cam plate 6950. That is, because the tab 7937 of the cam member 7910 extends into the arcuate notch 7877 of the cam plate 7950, an arcuate or rotational path of travel RPOT of the cam member 7910 with respect to the cam plate 7950 is necessarily limited by the arcuate or circumferential extent of the arcuate notch 7877 of the cam plate 7950. When viewed in bottom plan view as shown, for example, in FIGS. 34-35, 43 and 44, rotation of the cam member 6910 in the counterclockwise direction CCW (FIG. 34) (which would be a clockwise direction if viewed in top plan view, e.g., FIG. 36) is limited by the abutment of the first end 7877a of the arcuate notch 7977 of the cam plate 7950 and the protruding tab 7937 of the cam member 7910. Accordingly, in rotating the cam member 7910 from the second, open position 7999 (FIG. 41) to the first, closed position 7998 (FIG. 40), the engagement of the tab 7937 and the first end 7877a of the arcuate notch 7877 prevents over rotation of the cam member 7910. Rotation of the cam member 7910 in the clockwise direction from the first, closed position 7998 (FIG. 40) to the second, open position 7999 (FIG. 41) is limited by: a) the engagement of the first and second cam pins 7930, 7932 within the respective offset catch portions 7829, 7839 of the first and second cam slots 7827, 7837 of the first and second body portions 7920, 7930 of the blade housing mounting section 7802; and/or b) the abutment of the first and second fasteners 7990 of the cam mechanism 7900 with the second end portions 7826b, 7836b of the blade housing mounting slots 7826, 7836. During assembly of the cam member 7910 to the cam plate 7910 or disassembly of the cam member 7910 from the cam plate 7910, the abutment of the opposite or second end 7977b of the notch 7977 of the cam plate 7950 and the protruding tab 7937 of the cam member 7910 advantageously prevent over rotation of the cam member 7910 in the clockwise direction. Over rotation of the cam member 7910 with respect to the cam plate 7950 in the clockwise direction during assembly could result in the cam member rectangular base 7912 pushing against and permanently bending or deforming the pair of retainer springs 7972a, 7972b of the cam plate 7950. In one exemplary embodiment, the rotational path of travel RPOT of the cam member 6930 in moving between the first, closed position 7998 and the second, open position 7999 is approximately 45°.

Frame Body 7250

The frame body 7250 of the head assembly 7200 of the power operated rotary knife 7000 is similar in structure and function to the frame body 6250 of the head assembly 6200 of the power operated rotary knife 6000 of the sixth embodiment. As noted above and as best seen in FIGS. 26-30 and 32-35, the frame body 7250 includes the forward or distal portion 7251, which supports the blade housing assembly 7700, and the rearward or proximal portion 7280, extending in the rearward direction RW toward the handle assembly 7110. The forward portion 7251 of the frame body 7250 includes the mounting pedestal 7272 of the lower surface 7270 which, as explained previously, functions as a mounting surface for the blade housing mounting section 7802 and includes the pair of threaded openings 7274 that receive respective ones of the threaded fasteners 7990 of the cam mechanism 7900 thereby urging the cam plate 7950 against the planar lower surface 7810a of the lower end 7810 of the mounting section 7802. This secures the blade housing mounting section 7802 to the mounting pedestal 7272 of the frame body 7250 and thereby secures the blade-blade housing combination 7500, including the cam mechanism 7900 which is part of the blade housing assembly 7700, to the frame body 7250. The forward portion 7251 of the frame body 7250 additionally receives and removably supports a pinion gear shield 7297. The pinion gear shield 7297 helps locate the pinion gear 7610 and the sleeve bushing 7630 of the drive mechanism 7600 such that the pinion gear 7610 operatively engages the driven gear 7340 of the annular rotary knife blade 7300 to rotate the knife blade 7300 with respect to the blade housing 7800 about the axis of rotation R in the gear meshing region 7817. The pinion gear shield 7297 is secured to a planar mounting surface 7252*a* of a forward wall 7252 of the forward portion 7251 of the frame body 7250 by a pair of threaded fasteners 7299*a*.

As explained above, to improve and facilitate alignment during the assembly of the blade-blade housing combination 7500 to the planar mounting pedestal 7272, the mounting pedestal 7272 includes the cylindrical post or cylindrical boss 7273 extending orthogonally from a planar extent of the mounting pedestal 7272. The cylindrical boss 7272 is received in the cylindrical opening 7801*g* in the first, rearward radial split portion 7801*b* of the blade housing expansion split 7801*a* in the mounting section 7802 of the split blade housing 7800. The cylindrical opening 7801*g* is disposed between facing surfaces 7825, 7835 of the first and second body portions 7820, 7830 adjacent the rearward end portions 7825*b*, 7835*b* of the facing surfaces 7825, 7835 and the outer wall 7806 of the mounting section 7802, as explained previously. Additionally, as explained above, adjacent to and extending orthogonally with respect to the planar mounting pedestal 7272 of the frame body 7250 is the planar side wall, which aids in alignment due to matching planar configurations of the planar distal portion 7807 of the outer wall 7806 of the blade housing mounting section 7802.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. An annular blade housing for supporting an annular rotary knife blade for rotation in a power operated rotary knife, the annular blade housing comprising:
   a blade support section centered about a blade housing center line and a mounting section extending from the blade support section,
   the blade support section including an inner wall and a radially spaced apart outer wall, an upper end and an axially spaced apart lower end, the inner wall including:
   a first concave bearing surface and an axially spaced apart second convex bearing surface,
   a bearing race extending radially into the inner wall and including the first concave bearing surface, and
   a radially protruding bearing bead including the second convex bearing surface,
   the first concave bearing surface being concave and the second convex bearing surface being convex, as viewed in a vertical section view along a vertical plane including the blade housing center line,
   the bearing race being closer to the upper end of the blade support section and the radially protruding bearing bead being closer to the lower end of the blade support section.

2. The annular blade housing of claim 1 wherein the first concave bearing surface defines a constant radius of curvature and the second convex bearing surface defines a constant radius of curvature.

3. The annular blade housing of claim 1 wherein the inner wall further includes a generally vertical upper portion adjacent to the upper end of the blade support section.

4. The annular blade housing of claim 1 wherein the first concave bearing surface is an arcuate surface.

5. The annular blade housing of claim 1 wherein the first concave bearing surface comprises an upper bearing face and a lower bearing face.

6. The annular blade housing of claim 1 wherein the second convex bearing surface is an arcuate surface.

7. The annular blade housing of claim 1 wherein the second convex bearing surface comprises an upper bearing face and a lower bearing face.

8. The annular blade housing of claim 1 wherein at least a portion of the first concave bearing surface is non-orthogonal and non-parallel to the blade housing center line, as viewed in a vertical section view along a vertical plane including the blade housing center line.

9. The annular blade housing of claim 1 wherein the radially protruding bearing bead extends radially from the inner wall and is spaced axially from the bearing race by a transition portion of the inner wall of the blade support section.

10. A combination of an annular rotary knife blade and an annular blade housing for use in a power operated rotary knife, the combination comprising:
    the annular blade housing including:
    a blade support section centered about a blade housing center line and a mounting section extending from the blade support section,
    the blade support section including an inner wall and a radially spaced apart outer wall, an upper end and an axially spaced apart lower end,
    the inner wall including:
    a first concave bearing surface and an axially spaced apart second convex bearing surface,
    a bearing race extending radially into the inner wall and including the first concave bearing surface,
    a radially protruding bearing bead including the second convex bearing surface,
    the first concave bearing surface being concave and the second convex bearing surface being convex, as viewed in a vertical section view along a vertical plane including the blade housing center line,
    the bearing race being closer to the upper end of the blade support section and the radially protruding bearing bead being closer to the lower end of the blade support section; and the annular rotary knife blade supported by the blade support section of the annular blade housing for rotation about a central axis of rotation.

11. A split blade housing assembly for supporting an annular rotary knife blade for rotation in a power operated rotary knife, the split blade housing assembly comprising:

a split blade housing including:

a blade support section centered about a blade housing center line, a mounting section extending from the blade support section, the mounting section including a split through the mounting section, the blade support section including an inner wall and a radially spaced apart outer wall, an upper end and an axially spaced apart lower end, the inner wall including:

a first concave bearing surface and an axially spaced apart second convex bearing surface, a bearing race extending radially into the inner wall and including the first concave bearing surface, a radially protruding bearing bead including the second convex bearing surface, the first concave bearing surface being concave and the second convex bearing surface being convex, as viewed in a vertical section view along a vertical plane including the blade housing center line, the bearing race being closer to the upper end of the blade support section and the radially protruding bearing bead being closer to the lower end of the blade support section.

12. The blade housing assembly of claim 11 further including a cam mechanism bridging the split through the mounting section of the split blade housing for moving the split blade housing between a first blade supporting position and a second blade changing position, the cam mechanism including:

a cam plate including a first surface and a second surface spaced apart by a front side, a back side and first and second lateral sides extending between the first and second surfaces, the first surface of the cam plate including a recess; and a cam member received in the recess of the first surface of the cam plate and supported by the cam plate for rotation about a cam member axis of rotation, the cam member rotating between a first, closed position and a second, open position, in the first, closed position of the cam member, the split blade housing being in the first blade supporting position and in the second, open position of the cam member, the blade housing being in the second blade changing position.

13. The split blade housing assembly of claim 11 wherein the first concave bearing surface of the inner wall of the blade support section of the split blade housing is an arcuate surface.

14. The split blade housing assembly of claim 11 wherein the first concave bearing surface of the inner wall of the blade support section of the split blade housing comprises an upper bearing face and a lower bearing face.

15. The split blade housing assembly of claim 11 wherein the second convex bearing surface of the inner wall of the blade support section of the split blade housing is an arcuate surface.

16. The split blade housing assembly of claim 11 wherein the second convex bearing surface of the inner wall of the blade support section of the split blade housing comprises an upper bearing face and a lower bearing face.

17. The split blade housing assembly of claim 11 wherein the first concave bearing surface of the inner wall of the blade support section of the split blade housing defines a constant radius of curvature and the second convex bearing surface of the inner wall of the blade support section of the split blade housing defines a constant radius of curvature.

18. The split blade housing assembly of claim 11 wherein the inner wall of the blade support section of the split blade housing further includes a generally vertical upper portion adjacent to the upper end of the blade support section.

19. The split blade housing assembly of claim 12 wherein the mounting section of the split blade housing includes a first body portion and a second body portion on opposite sides of the mounting section split and further wherein the first surface of the cam plate of the cam mechanism adjacent the first and second lateral sides including first and second extending edges extending upwardly in a direction away from the second surface of the cam plate, the first extending edge of the first surface of the cam plate engaging the first body portion of the mounting section of the split blade housing and the second extending edge of the first surface engaging the second body portion of the mounting section of the split blade housing.

20. The split blade housing assembly of claim 11 wherein the mounting section split of the split blade housing includes a first split portion adjacent an outer wall of the mounting section and a second split portion adjacent an inner wall of the mounting section, the second split portion extending transversely with respect to the first split portion, the first split portion of the split extends along a first blade housing split axis which intersects the blade housing center line and the second split portion of the split extends along a second blade housing split axis, the first and second blade housing split axes intersecting, the second split portion extending through the inner wall of the mounting section and the inner wall of the blade support section.

21. A split blade housing for supporting an annular rotary knife blade for rotation in a power operated rotary knife, the split blade housing comprising:

a blade support section centered about a blade housing center line;

a mounting section extending from the blade support section, the mounting section including an inner wall, an outer wall, and a split through the mounting section;

the blade support section including an inner wall and a radially spaced apart outer wall, an upper end and an axially spaced apart lower end, the inner wall of the blade support section including:

a first concave bearing surface, a bearing race extending radially into the inner wall and including the first concave bearing surface, the first concave bearing surface being concave, as viewed in a vertical section view along a vertical plane including the blade housing center line, and the split of the mounting section including:

a first split portion extending through the outer wall of the mounting section and a second split portion extending through the inner wall of the mounting section and the inner wall of the blade support section, the second split portion extending transversely from the first split portion, the first split portion of the split extending along a first blade housing split axis which intersects the blade housing center line and the second split portion of the split extending along a second blade housing split axis, the first and second blade housing split axes intersecting.

22. The split blade housing of claim 21 wherein the first concave bearing surface defines a constant radius of curvature.

23. The split blade housing of claim 21 wherein the inner wall of the blade support section further includes a generally vertical upper portion adjacent to the upper end of the blade support section.

24. The split blade housing of claim 21 wherein the first concave bearing surface is an arcuate surface.

25. The split blade housing of claim 21 wherein the first concave bearing surface comprises an upper bearing face and a lower bearing face.

26. The split blade housing of claim 21 wherein at least a portion of the first concave bearing surface is non-orthogonal and non-parallel to the blade housing center line, as viewed in a vertical section view along a vertical plane including the blade housing center line.

27. The split blade housing of claim 21 wherein the inner wall of the blade support section further includes a second convex bearing surface axially spaced apart from the first concave bearing surface.

28. The split blade housing of claim 27 wherein the second convex bearing surface of the inner wall of the blade support section is convex, as viewed in a vertical section view along a vertical plane including the blade housing center line.

29. The split blade housing of claim 27 wherein the inner wall of the blade support section further includes a radially protruding bearing bead including the second convex bearing surface.

30. The split blade housing of claim 29 wherein the bearing race of the inner wall of the blade support section is closer to the upper end of the blade support section and the radially protruding bearing bead of the inner wall of the blade support section is closer to the lower end of the blade support section.

31. The split blade housing of claim 27 wherein the second convex bearing surface defines a constant radius of curvature.

32. The split blade housing of claim 27 wherein the second convex bearing surface is an arcuate surface.

33. The split blade housing of claim 27 wherein the second convex bearing surface comprises an upper bearing face and a lower bearing face.

* * * * *